(12) United States Patent
Kumashiro et al.

(10) Patent No.: US 6,301,692 B1
(45) Date of Patent: Oct. 9, 2001

(54) METHOD FOR DESIGNING LAYOUT OF SEMICONDUCTOR INTEGRATED CIRCUIT, SEMICONDUCTOR INTEGRATED CIRCUIT OBTAINED BY THE SAME METHOD, AND METHOD FOR VERIFYING TIMING THEREOF

(75) Inventors: Shinichi Kumashiro; Hiroshi Mizuno; Yasuhiro Tanaka; Toshiyuki Moriwaki; Youichirou Mae, all of Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/153,063

(22) Filed: Sep. 15, 1998

Related U.S. Application Data

(62) Division of application No. 08/732,808, filed on Oct. 15, 1996, now Pat. No. 5,923,569.

(30) Foreign Application Priority Data

Oct. 17, 1995 (JP) .................................................. 7-268701
May 31, 1996 (JP) .................................................. 8-138535

(51) Int. Cl.$^7$ .................................................. G06F 17/50
(52) U.S. Cl. .................................................. 716/10; 716/2
(58) Field of Search .................................................. 716/1, 2, 8, 11, 716/12, 18

(56) References Cited

U.S. PATENT DOCUMENTS 5,341,309   8/1994  Kawata ................................. 364/489
5,473,547  12/1995  Muroga ................................. 364/489

(List continued on next page.)

OTHER PUBLICATIONS

Baha et al., "GALSY, An Automatic Layout Generator of Symbolic Layouts From MOS Circuit Schematics," IEEE pp. 296–300, 1991.*
LAU, "Implementation of Digital IC Functions w/Pass Transistor Switching Circuits," IEEE Trans. on Consumer Electronics, vol. 34, No. 2, pp. 318–320, 1988.*
Oklobdzija et al., "Logic Synthesis for Pass–Transistor Design," 4$^{th}$ Intl Conference on Solid–State + IC Technology, pp. 103–105, 1995.*

(List continued on next page.)

Primary Examiner—Matthew Smith
Assistant Examiner—Leigh Marie Garbowski
(74) Attorney, Agent, or Firm—McDermott, Will & Emery

(57) ABSTRACT

First of all, a given logic circuit is divided into a combinational circuit portion and a register portion. The combinational circuit portion obtained by division is divided into a plurality of partial circuits having high connectivity. Each partial circuit is converted into a circuit having the transistor level. Then, a layout cell of the partial circuit having the transistor level is generated. Thereafter, arrangement and wiring are performed by using, as unit cells, a layout cell which corresponds to each register included in the register portion and the layout cell for each partial circuit in the combinational circuit so that a block layout is created. Accordingly, a layout having excellent characteristics can be created by a few kinds of cells in both circuits having the CMOS logic and the pass-transistor logic. In particular, the partial circuits having high connectivity are arranged in a cell in the circuit using the pass-transistor logic. Consequently, the optimum driving capability can be obtained and the layout having stable characteristics can be created. In addition, it is possible to ensure the superiority such as a reduction in area, the low consumed power, high-speed operation and the like.

27 Claims, 46 Drawing Sheets

U.S. PATENT DOCUMENTS

| | | | |
|---|---|---|---|
| 5,493,506 | 2/1996 | Sakashita et al. | 364/489 |
| 5,517,132 | 5/1996 | Ohara | 326/41 |
| 5,519,627 | 5/1996 | Mahmood et al. | 364/488 |
| 5,530,843 | 6/1996 | Koyama | 395/500 |
| 5,537,580 | 7/1996 | Giomi et al. | 395/500 |
| 5,544,066 | 8/1996 | Rostoker et al. | 364/489 |
| 5,633,807 | 5/1997 | Fishburn et al. | 364/491 |
| 5,666,288 | 9/1997 | Jones et al. | 364/490 |
| 5,734,572 | 3/1998 | Guignet | 364/468.03 |

OTHER PUBLICATIONS

Pasternak et al., "Differential Pass–Transistor Logic," Circuits + Devices, pp. 23–28, 1993.*

Sasaki et al., "Multi–Level Pass–Transistor Logic for Low Power ULSIs", IEEE, pp 14–15, 1995.*

Smith, "CMOS TSPC Latch Circuits For Pass–Transistor Logic," IEEE, pp 33–37, Proc. of $37^{th}$ Midwest Symposium on Circuits + Systems, 1995.*

Yano et al., "Top–Down Pass–Transistor Logic Design," IEEE Journal of Solid–State Circuits, vol. 31, No. 6, pp. 792–803, 1996.*

IEEE Journal of Solid–State Circuits "A 3.8–ns CMOS 16X16–b Multiplier Using Complementary Pass–Transistor Logic", K. Yano, T. Yamanaka, T. Nishida, M. Saito, K. Shimohigashi and A. Shimizu. pp. 388–395, vol. 25, No. 2, Apr., 1990.

IEEE 1994 Custom Integrated Circuits Conference "A High Speed, Low Power, Swing Restored Pass–Transistor Logic Based Multiply And Accumulate Circuit For Multimedia Applications" A. Parameswar, H. Hara, T. Sakurai, pp. 278–281.

IEEE 1994 Custom Integrated Circuits Conference "Lean Integration: Achieving A Quantum Leap In Performance And Cost Of Logic LSIs" K. Yano, Y. Sasaki, K. Rikino, and K. Seki, pp. 603–606.

1995 Symposium on VLSI Circuits Digest of Technical Papers "Pass Transistor Based Gate Array Architecture", Y. Sasaki, K. Yano, M. Hiraki, K. Rikino, M. Miyamoto, T. Matsuura, T. Nishida, and K. Seki, pp. 123–124.

* cited by examiner

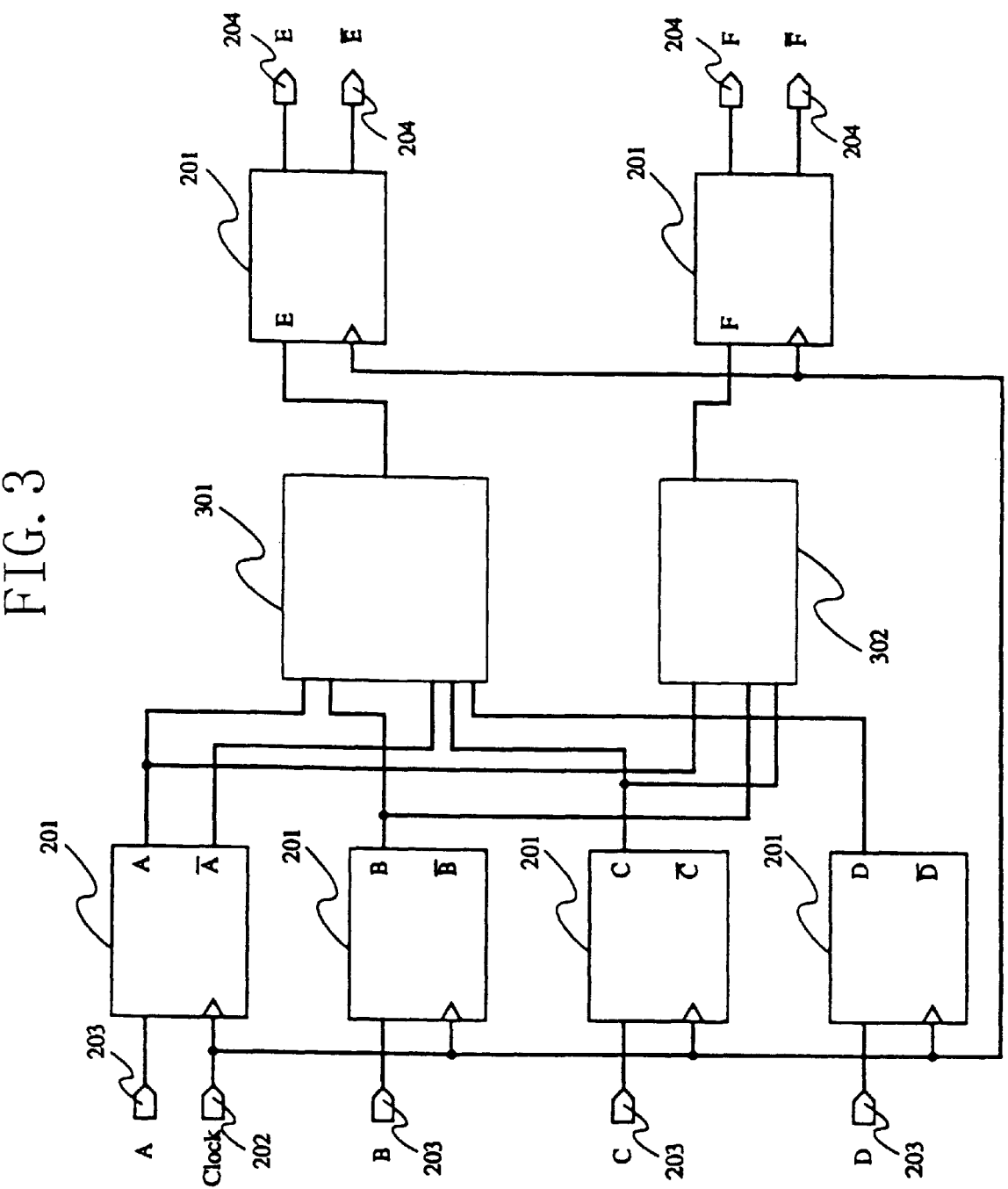

METHOD FOR DESIGNING LAYOUT OF SEMICONDUCTOR INTEGRATED CIRCUIT, SEMICONDUCTOR INTEGRATED CIRCUIT OBTAINED BY THE SAME METHOD, AND METHOD FOR VERIFYING TIMING THEREOF

This is a divisional application of Ser. No. 08/732,808, filed Oct. 15, 1996 now U.S. Pat. No. 5,923,569, issued Jul. 13, 1999.

BACKGROUND OF THE INVENTION

1. Technical Field

The present invention relates to the improvement of a method for designing a layout of a semiconductor integrated circuit by the cell-based automatic arrangement and wiring and a method for verifying the timing of the designed semiconductor integrated circuit, and more particularly to a layout designing method and a timing verifying method which are also suitable for circuits using the pass-transistor logic as well as the CMOS logic, a semiconductor integrated circuit in which a circuit using the pass-transistor logic and a circuit using the CMOS logic are provided together, a layout designing method which utilizes the cell-based automatic arrangement and wiring of the semiconductor integrated circuit, and a semiconductor integrated circuit which is the most suitable for a reduction in voltage.

2. Background of the Art

In the prior art, the cell-based layout technique has been used as a method for designing the layout of a semiconductor integrated circuit and a method for verifying a timing. For the same cell-based layout technique, there are methods which are referred to as a gate array and a standard cell. In these methods, layouts having high density which are manually created are prepared for individual cells in advance, the connection between the cells is defined, and arrangement and wiring are performed on the cell level according to the connection so that the desired block layout of a logic circuit is created.

Referring to the timing verifying technique for the layout created on the cell base, a delay value for each cell is obtained by a circuit simulator or the like in advance, and is assigned to each logic gate to verify a timing.

In the cell-based designing technique according to the prior art described above, a cell which is based on a CMOS circuit is used very often for the following reason. In the CMOS circuit, the input signal of the cell is sent to only the gate terminal of a MOS transistor, and the gate terminal is divided into a source terminal and a drain terminal on a current basis. Consequently, the CMOS circuit is easily operated independently on a cell unit as electrical characteristics. Accordingly, the electrical characteristics can be held on the cell unit when performing layout design and timing verification.

Recently, a circuit using the pass-transistor logic which performs logical operation by sending an input signal to the drain terminal of a MOS transistor as well as the gate terminal thereof has been used in place of a complete CMOS circuit. In some cases, the circuit having the pass-transistor logic is superior to the complete CMOS circuit in respect of a decrease in area, a reduction in consumed power, an increase in speed and the like. These cases have been disclosed in Document 1: K. Yano, et al., "A 2.8-ns CMOS 16×16-b Multiplier Using Complementary Pass-Transistor Logic" (IEEE Journal of Solid-State Circuits, Vol. 25, No. 2, pp. 388–395, April 1990), and Document 2: A. Parameswar, et al., "A High Speed, Low Power, Swing Restored Pass-Transistor Logic Based Multiply and Accumulate Circuit for Multimedia Applications" (Proceeding of IEEE 1994 Custom Integrated Circuits Conference, pp. 278 to 281) and the like.

The technique for designing the layout of the circuit using the pass-transistor logic has been disclosed in Document 3: K. Yano, et al., "Lean Integration: Achieving a Quantum Leap in Performance and Cost of Logic LSIs" (Proceeding of IEEE 1994 Custom Integrated Circuits Conference, pp. 603–606), Document 4: Y. Sasaki, et al., "Pass Transistor Based Gate Array Architecture" (1995 Symposium on VLSI Circuits Digest of Technical Papers, pp. 123–124), and the like. The designing method which has been proposed in the Document 3 utilizes the cell-based layout designing technique according to the prior art. More specifically, three kinds of cells of circuits using the pass-transistor logic which have a plurality of input pins are prepared, the assignment of each input pin (the form of signal application) is changed in the cell of each circuit using the pass-transistor logic to generate a lot of logics therein. The logics of the circuits which are given are assigned to the cells to be arranged and wired by an automatic arrangement and wiring tool according to the prior art. Thus, a block layout is obtained. The technique which has been proposed in the Document 4 uses the gate array technique. A pair of P- and N-channel type MOS transistors are laid all over the gate array according to the prior art. On the other hand, a substrate cell is used in which the number of N-channel type MOS transistors is greater than that of P-channel type MOS transistors based on the average pass-transistor logic, and the numbers of N- and P-channel type MOS transistors which are required for the amplifier of an output portion and a memory cell.

However, the layout designing technique of the circuit using the pass-transistor logic which has been disclosed in the Document 3 utilizes plural kinds (three kinds) of unit cells in which a small number of transistors form a cell. Consequently, various kinds of logics can be generated by the combination of the plural kinds of unit cells so that the degree of freedom of a logic type can be enhanced. However, the type of the unit cell is restricted to plural kinds (three kinds). For this reason, there is a case where the driving capability, the area and the like which are suitable for the circuit cannot be obtained when completing the layout so that circuit characteristics become unstable and the superiority such as a decrease in area, a reduction in consumed power, an increase in speed or the like of the pass-transistor logic is impeded.

It can be supposed that a lot of transistors form a cell so as to ensure the stabilization of the circuit characteristics and the superiority of the pass-transistor logic, for example. In this case, there is a defect that many kinds of cells should be prepared in advance so as to enhance the degree of freedom of the logic type. Not only the circuit using the pass-transistor logic but also the logic circuit using the complete CMOS circuit has the defect that many kinds of cells should be prepared. In other words, many kinds of cells should be prepared for the driving capability and the logic classification to create the optimum layout in the cell-based layout design of the logic circuit using the complete CMOS circuit.

In the logic circuit using the pass-transistor logic, when the load capacity in the circuit is changed depending on the self cell state, the delay characteristics of the circuit are varied. Furthermore, when the source and drain terminals of the transistor are connected to other cells through signal paths respectively, the delay characteristics of the circuit are varied depending on the state of the other cells.

According to the circuit using the pass-transistor logic, consequently, in the case where it is verified whether or not the created block layout satisfies the desired timing characteristics, correct timing verification cannot be performed even though the delay characteristics for each cell are given to the logic timing verifying circuit having the gate level according to the prior art so as to perform verification. On the other hand, in the case where the created layout is wholly verified by a circuit simulation, a very long computation time and a very large storage region are necessary, which is not practical.

The semiconductor integrated circuits using the pass-transistor logic according to the prior art which have been described in the Document 1 and the Document 2 are applied to specific arithmetic units such as an adder, a multiplier and the like so as to create a layout by manual design (custom design). Consequently, it is difficult to automatically design the random logic by using general logic synthesis and the like.

By the layout designing technique which has been disclosed in the Document 3 and the Document 4, the random logic can automatically be designed. However, in the case where all circuits are designed based on the pass-transistor logic by using the layout designing technique according to the prior art, the following defects are caused. In the pass-transistor logic, a signal is propagated between the drain and the source of the transistor. Consequently, a voltage drop which is equivalent to the threshold voltage of the transistor is generated. For this reason, it is necessary to use an amplifier for signal amplification which amplifies the signal having a voltage drop so as to have an original voltage. It is desirable that the amplifier should be formed by a small number of transistors. On the other hand, in the case where the basic logic such as an AND circuit, an OR circuit or the like is provided to enhance the degree of freedom of the logic, the following defect is caused. More specifically, if the cell having the basic logic is formed by the circuit using the pass-transistor logic, the amplifier for signal amplification is added every basic logic to form a cell so that the number of transistors which form the cell and the area are increased. Consequently, the superiority in area to the cell having the CMOS logic is eliminated. In the case where the composite logic which is obtained by combining a plurality of AND circuits, a plurality of OR circuits and the like forms a cell so as to increase the number of the transistors using the pass-transistor logic for an amplifier for signal amplification and to reduce the overhead of the amplifier for signal amplification, the degree of freedom of the logic is lowered.

As a result, many kinds of cells should be prepared in advance in order to obtain a desired semiconductor integrated circuit.

SUMMARY OF THE INVENTION

It is a first object of the present invention to provide a layout designing method capable of implementing a layout having optimum delay characteristics with a smaller number of cell types for a circuit using the pass-transistor logic as well as the CMOS logic, and more particularly to provide a layout designing method capable of ensuring the stable circuit characteristics and superiority such as a decrease in area, a reduction in consumed power and an increase in speed for the circuit using the pass-transistor logic.

It is a second object of the present invention to provide a timing verifying method on the gate level which can accurately perform processings with high precision at high speed also for the layout of the circuit using the pass-transistor logic which is created.

It is a third object of the present invention to perform logic synthesis of a circuit using the pass-transistor logic and automatic layout design while ensuring the superiority in speed, area and consumed power by a circuit structure using the pass-transistor logic for a circuit using the random logic and the like as well as a specific arithmetic unit, and to perform automatic design in which the CMOS logic and the pass-transistor logic are used together for a circuit having no superiority in area, delay and consumed power which uses only the pass-transistor logic.

It is a fourth object of the present invention to suppress a degradation in the signal which is propagated in a circuit using the pass-transistor logic.

In order to accomplish the first object, the present invention employs two structures. A first structure will be briefly described below. A combinational circuit portion forming a semiconductor integrated circuit is divided into a plurality of circuit portions having high connectivity in which signal paths are connected. A layout is generated for each circuit portion. Each layout is used as a unit cell to generate the block layout of a logic circuit. A second structure will be briefly described below. For example, there are prepared plural kinds of subcells which have a smaller number of transistors than in the cell of the circuit using the pass-transistor logic described in the Document 4 according to the prior art. These subcells are combined to form the cell of the circuit using the pass-transistor logic and the like. Thus, a proper layout is designed with a fewer kinds of cells.

In order to accomplish the second object, the present invention employs two structures. A first structure will be briefly described below. The delay characteristics are obtained every plural circuit portions having high connectivity in which signal paths are connected in the combinational circuit portion. Consequently, proper delay characteristics can be obtained also in the circuit using the pass-transistor logic. According to a second structure, minimum and maximum delay values are obtained in the circuit using the pass-transistor logic in consideration of a variation in the delay characteristics. Thus, the timing conditions given by using both limit delay values are examined.

In order to accomplish the third object, the present invention employs three structures. A first structure will be briefly described below. The basic logic of an inverter, a NAND circuit and the like which are suitable for the CMOS logic is assigned to a CMOS logic layout cell, while a composite gate and an arithmetic unit having the superiority in the area and the speed are assigned to a pass-transistor logic layout cell. These cells are arranged and wired together. A second structure will be briefly described below. A plurality of basic pass-transistor logic layout cells are combined to form a composite pass-transistor logic layout cell. The composite pass-transistor logic layout cell and the CMOS logic layout cell are arranged and wired together. According to a third structure, a predetermined graph is made for the circuit using the pass-transistor logic. Thus, the number of wiring tracks is minimized to obtain a layout with high density.

In order to accomplish the fourth object, the present invention employs two structures. A first structure will be briefly described below. A circuit using the pass-transistor logic is formed by using a transistor having a threshold voltage which is lower than that of a transistor forming a circuit using the CMOS logic. A second structure will be briefly described below. An inverter for signal amplification is provided on the output portion of the circuit using the pass-transistor logic. The threshold voltages of two transistors which form the inverter are properly set, respectively. Consequently, a degradation in the signal can be suppressed.

A first specific structure of the present invention which accomplishes the first object is a method for designing the layout of a semiconductor integrated circuit, comprising a circuit dividing processing of dividing a given logic circuit into a combinational circuit portion and a register portion, a transistor circuit converting processing of grasping a partial circuit in which signal paths are connected to each other except for signal paths connected to the output of the register portion in the combinational circuit portion, and converting the partial circuit into a circuit having the transistor level, a partial circuit layout generating processing of generating the layout cell of each partial circuit having the transistor level which is obtained by conversion, and a layout arranging and wiring processing of performing the arrangement and wiring of a cell-based layout by using, as unit cells, the layout cell generated for each partial circuit of the combinational circuit portion and each register included in the register portion respectively, and creating the block layout of the given logic circuit.

A second specific structure of the present invention which accomplishes the first object is the method for designing the layout of a semiconductor integrated circuit, wherein the layouts of a plurality of subcells is prepared as a subcell library, the subcells being formed by at least one transistor in advance, the method further comprising a main cell generating processing of arranging and wiring some of the subcells adjacently to each other to create the layout of a new cell, and registering the layout of the new cell as a main cell in a main cell library, and a layout arranging and wiring processing of arranging and wiring the cell-based layout by using the subcell library and the main cell library as cell libraries, and creating the block layout of a given logic circuit.

A first structure of the present invention which accomplishes the second object is a method for verifying the timing of a semiconductor integrated circuit including a combinational circuit portion and a register portion wherein the combinational circuit portion has a plurality of partial circuits, each partial circuit having signal paths connected to each other except for signal paths connected to the output of the register portion, and a layout is created by using, as unit cells, a layout cell generated for each partial circuit and each register included in the register portion, comprising the delay characteristics which are obtained in advance for each register included in the register portion being stored in a first delay characteristic library, the method comprising a partial circuit delay analyzing processing of analyzing a S circuit based on each layout generated for each partial circuit to obtain delay characteristics after the layout of the semiconductor integrated circuit is generated for the generated layout cell of each partial circuit, and storing the delay characteristics in a second delay characteristic library, and a timing verifying processing of verifying the timing of the whole semiconductor integrated circuit whose layout is created by using, as unit gates, the register and the partial circuit based on the first and second delay characteristic libraries.

A second structure of the present invention which accomplishes the second object is a method for verifying the timing of a semiconductor integrated circuit including a gate in which the load capacity of an input pin is varied depending on the state of another input pin or the internal state, comprising the steps of obtaining, in advance, minimum and maximum capacity values which are taken in all the state for the input pin of each gate, obtaining minimum and maximum delay values based on the minimum and maximum capacity values of the input pins of all the gates which are connected to each output pin of each gate, and defining the minimum and maximum delay values for each gate and examining on the gate level whether or not given timing conditions are satisfied by static timing analysis.

A first specific structure of the present invention which accomplishes the third object is a method for designing a semiconductor integrated circuit, comprising the steps of storing, in advance, a pass-transistor logic layout cell in which at least one of the area, the delay and the consumed power is reduced more than in a CMOS logic layout cell, storing, in advance, a CMOS logic layout cell in which at least one of the area, the delay and the consumed power is reduced more than in a pass-transistor logic layout cell, inputting a net list from the outside when designing a semiconductor integrated circuit, and arranging and wiring the pass-transistor logic layout cell and the CMOS logic layout cell together based on the input net list.

A second specific structure of the present invention which accomplishes the third object is a method for designing a semiconductor integrated circuit, comprising the steps of preparing, in advance, a basic pass-transistor logic layout cell including two pairs of transistors, each transistor pair having two transistors whose sources are connected to each other, and a CMOS logic layout cell including one or more transistors, arranging and wiring two or more basic pass transistor logic layout cells adjacently to each other to form a composite pass-transistor logic layout cell, and arranging and wiring the composite pass-transistor logic layout cell and the CMOS logic layout cell together to create a desired block layout.

A third specific structure of the present invention which accomplishes the third object is a method for designing a semiconductor integrated circuit including a circuit using the pass-transistor logic that is expressed by a transistor pair having two transistors whose sources are connected to each other, the method comprising the steps of inputting a net list having the transistor level of the circuit using the pass-transistor logic, making a graph in which the wiring between apexes corresponds to a branch, each transistor pair using the pass-transistor logic acting as the apex in the input net list, and arranging, in the one-dimensional direction, layout cells including each transistor pair using the pass-transistor logic in order of the apexes of the graph.

A first specific structure of the present invention which accomplishes the fourth object is a semiconductor integrated circuit comprising a circuit using the pass-transistor logic and a circuit using the CMOS logic, wherein the circuit using the pass-transistor logic is formed by using a transistor having a threshold voltage which is lower than that of a transistor that forms the circuit using the CMOS logic.

A second specific structure of the present invention which accomplishes the fourth object is a semiconductor integrated circuit comprising a circuit using the pass-transistor logic and a circuit using the CMOS logic, wherein an inverter for signal amplification which amplifies the output signal of an output portion of the circuit using the pass-transistor logic is added to the output portion, the inverter for signal amplification including a transistor having the same polarity as that of a transistor forming the circuit using the pass-transistor logic and a transistor having the reverse polarity to that of the transistor forming the circuit using the pass-transistor logic, the transistor having the same polarity being formed by a transistor having a threshold voltage which is lower than that of the transistor forming the circuit using the pass-transistor logic, and the transistor having the reverse polarity being formed by a transistor having a threshold voltage which is higher than that of the transistor forming the circuit using the pass-transistor logic.

According to the invention having the first structure which accomplishes the first object, the given logic circuit is first divided into the combinational circuit portion and the register portion. Each partial circuit having high connectivity which forms the combinational circuit portion is converted into the circuit having the transistor level. Then, the layout cell of the partial circuit having the transistor level is generated. Thereafter, arrangement and wiring are performed by using, as unit cells, the layout cell which corresponds to each register included in the register portion and the layout cell for each partial circuit in the combinational circuit portion so that the block layout is created. In the combinational circuit portion, the layout cell is generated for each partial circuit having high connectivity. The same layout cell for each partial circuit acts as the unit cell. Consequently, the layout having excellent characteristics can be created with a few kinds of cells in both the circuits using the CMOS logic and the pass-transistor logic. In case of the circuit using the pass-transistor logic, particularly, the circuits having high connectivity are arranged in a cell. Consequently, optimum driving capability can be obtained and a layout having stable characteristics can be created. In addition, it is possible to ensure the superiority such as a decrease in area, a reduction in consumed power, high-speed operation, and the like.

According to the invention having the second structure which accomplishes the first object, a plurality of subcells which are prepared in advance in the subcell library are arranged and wired adjacently to each other to create the layout of a new cell (main cell). The same layout is registered in the main cell library. Then, the layout of the block is created by using the subcell library and the main cell library as cell libraries. The subcells are combined to form the main cell. Therefore, the composite gate and the circuit portion using the pass-transistor logic can be formed by the combination of the subcells. Accordingly, the block layout having excellent characteristics can be created with a few kinds of cells even though many kinds of cell layouts are not prepared in advance.

According to the invention having the first structure which accomplishes the second object, the delay characteristics are obtained for each register in advance with respect to the register portion which requires a lot of computation time and a large storage region for delay analysis. In each partial circuit of the combinational circuit portion, that is, the circuit portion having high connectivity which includes the circuits using the pass-transistor logic and the like, each partial circuit is generated by a layout cell. The circuit analysis is performed for each layout cell to obtain the delay characteristics. Therefore, the delay characteristics can accurately be obtained so that timing verification can be performed with high precision. In addition, the delay characteristics are obtained every layout. Therefore, verification can be performed at higher speed than in the case where the timing is verified for the whole layout of the obtained logic circuit.

According to the invention having the second structure which accomplishes the second object, a predetermined fixed value is not used but minimum and maximum capacity values which can be taken in all the state are used as the capacity value of the input pin of each gate. Based on both capacity values, the minimum and maximum delay values are obtained. Both delay values are defined for the gate to perform timing verification by static timing analysis. Therefore, it is possible to perform accurate timing verification in consideration of the limit delay value in all combinations which are possible. In addition, the verification is performed on the gate level. Consequently, the timing verification can be performed at high speed.

According to the invention having the first structure which accomplishes the third object, the basic logic of the inverter, the NAND, the NOR and the like which are suitable for the CMOS logic in the given net list is assigned to the CMOS logic layout cell. The composite gate, the arithmetic unit and the like which can have higher superiority in the area and the speed by using the pass-transistor logic than by using the CMOS logic are assigned to the pass-transistor logic layout cell. Accordingly, it is possible to obtain a semiconductor integrated circuit having a layout which utilizes the superiority of each of the CMOS logic and the pass transistor logic.

The invention having the second structure which accomplishes the third object has the following functions.

More specifically, the pass-transistor logic can be expressed by the transistor pair having a transistor whose gate receives the positive logic of an input signal and a transistor whose gate receives the negative logic of the input signal, respective sources of the transistors being connected to each other. By using the transistor pair as the apex to assign the connection of the transistors between the apex to a branch, the transistor pair can be represented by a binary tree in which an output acts as a root. In addition, two pairs of transistors are required because the output also needs the positive logic and the negative logic. Four transistors forming two pairs of transistors are formed in the basic pass-transistor logic layout cell. Accordingly, if two or more basic pass-transistor logic layout cells are arranged and wired adjacently to each other to form a composite pass-transistor logic layout cell, the layout of the pass-transistor logic can be created for any logic. Furthermore, the cell suitable for the CMOS logic or the amplifier for signal amplification of the circuit using the pass-transistor logic is prepared in the CMOS logic layout cell. If the CMOS logic layout cell and the composite pass-transistor logic layout cell are provided together to perform cell-based automatic arrangement and wiring, the desired block layout can be created. Consequently, the optimum block layout can be implemented.

According to the invention having the third structure which accomplishes the third object, the graph is made wherein a branch represents a wiring between the layout cells, and a branch which traverses the apexes arranged in the one-dimensional direction represents the number of wiring tracks required when the layout cells are arranged in one dimension direction. Accordingly, if the apexes are arranged in order, the number of the branches which traverse the apexes is minimized and the number of wiring tracks to be required is minimized. Thus, it is possible to obtain a semiconductor integrated circuit having a layout with higher density.

According to the invention having the first structure which accomplishes the fourth object, the signal input to the drain of the transistor is propagated to the output portion through the drain-source of the transistor in the circuit using the pass-transistor logic. In the case where the signal is propagated between the drain and the source, for example, the Hi potential is propagated in an N-channel type MOS transistor, the Hi potential is increased to a voltage which is lower than a gate voltage by a threshold voltage. In the case where the Lo potential is propagated in a P-channel type MOS transistor, the Lo potential is reduced to a voltage which is higher than the gate voltage by the threshold voltage. However, since the transistor having a low threshold voltage is used as the transistor in which the signal is propagated, such influence can be suppressed. Consequently, it is possible to implement the circuit using the pass-transistor logic which have more stages. In addition, the number of the amplifiers for signal amplification to be required can be reduced. Thus, it is possible to implement the circuit using the pass-transistor logic which can increase the speed and reduce the area still more.

According to the invention having the second structure which accomplishes the fourth object, the following functions are obtained. More specifically, the signal which is propagated in the circuit using the pass-transistor logic is amplified by the inverter for signal amplification which is provided in the output portion. In the case where the circuit using the pass-transistor logic is an N-channel type MOS transistor, the Hi potential is degraded by the influence of the threshold voltage. If the circuit using the pass-transistor logic is a P-channel type MOS transistor, the Lo potential is degraded. The signal having the degraded Hi potential is sent to the gate input of the N-channel type transistor in the inverter for signal amplification, and is amplified. The signal having the degraded Lo potential is sent to the gate input of the P-channel type transistor in the inverter for signal amplification, and is amplified. However, in the case where signal amplification is performed by the transistor having an ordinary threshold voltage, the operating speed of the transistor is reduced because the signal is degraded. According to the present invention, the output of the N-channel type transistor is amplified by using the N-channel type transistor having a low threshold voltage and the same polarity, and the output of the P-channel type transistor is amplified by using the P-channel type transistor having a low threshold voltage and the same polarity in the circuit using the pass-transistor logic. Consequently, the transistor can be operated at much higher speed even though the signal is degraded.

The above-mentioned objects and novel characteristics of the present invention will be more apparent from the following detailed description in conjunction with the drawings.

BRIEF DESCRIPTION OF THE DRAWINGS

The drawings show preferred embodiments of the present invention wherein:

FIG. 3 is a diagram showing an example of a net list having the cell level of the logic circuit according to the first embodiment of the present invention;

FIG. 29(a) is a diagram showing a layout cell in which a part of the two basic layout cells are combined so as to be shared;

FIG. 45 is a diagram showing a circuit in which an exclusive-OR circuit, a selector, a half adder and a full adder are implemented by using an inverter gate, an AND gate and the like.

DETAILED DESCRIPTION OF THE INVENTION

Preferred embodiments of the present invention will be described below with reference to the drawings.

First Embodiment

A first embodiment of the present invention will be described below.

Figure 1:
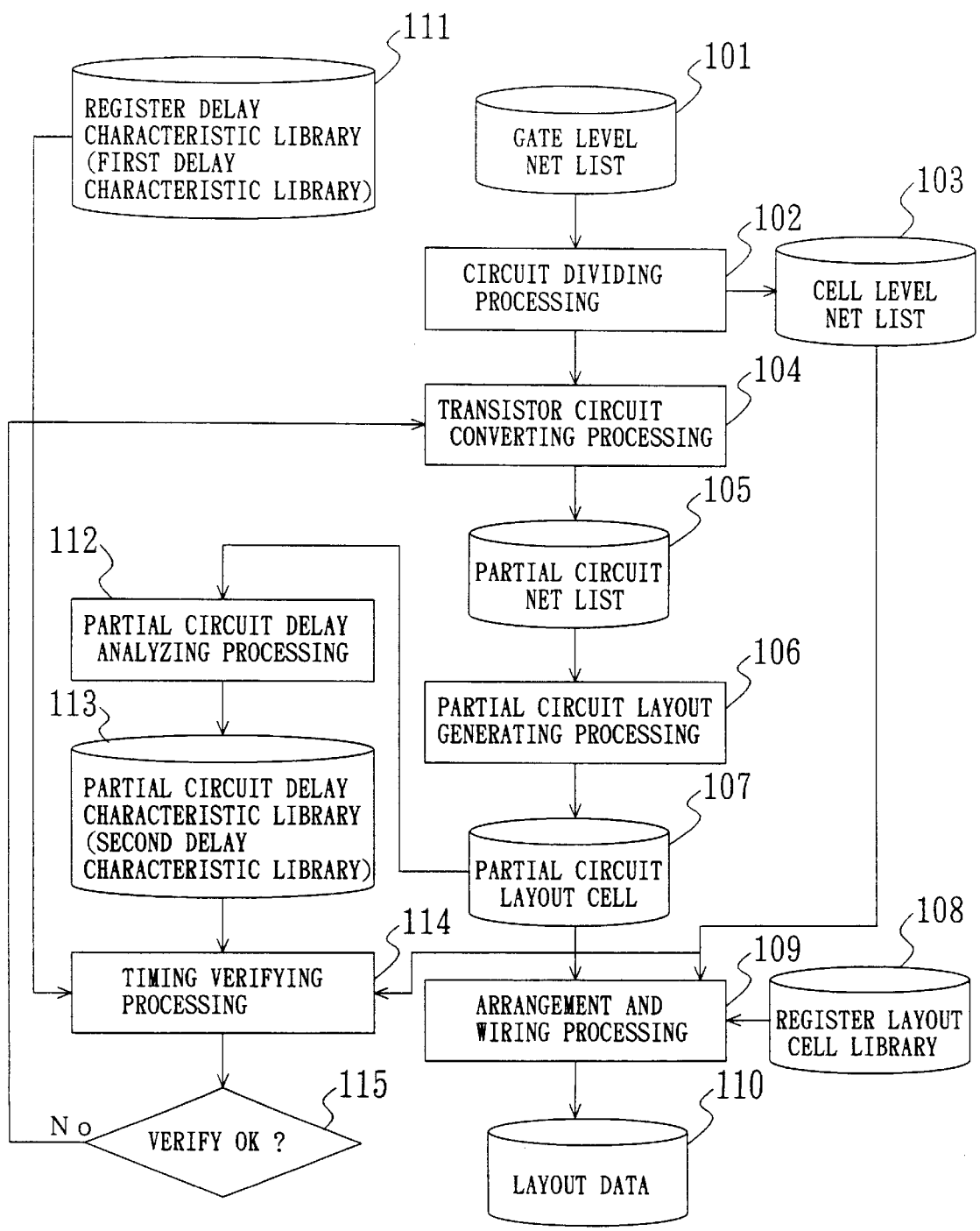
FIG. 1 is a flowchart showing the flow of a method for designing the layout of a semiconductor integrated circuit according to a first embodiment of the present invention.

FIG. 1 is a flowchart showing the flow of a method for designing the layout of a semiconductor integrated circuit and a method for verifying a timing thereof.

In FIG. 1, the reference numeral 101 designates a net list having the gate level of a given logic circuit, and the reference numeral 102 designates a circuit dividing processing in which the net list 101 having the gate level is divided into a combinational circuit portion and a register portion, and the combinational circuit portion which is obtained by division is then divided into a plurality of partial circuits. Each partial circuit forms a cell to generate the net list having the cell level. The reference numeral 103 designates a net list having the cell level generated by the circuit dividing processing 102.

The reference numeral 104 designates a transistor circuit converting processing for converting, into a circuit having the transistor level, each partial circuit which is obtained by the circuit dividing processing 102. The reference numeral 105 designates a net list having the transistor level for each partial circuit generated by the transistor circuit converting processing 104. The reference numeral 106 designates a partial circuit layout generating processing in which a layout is generated from the net list 105 of the partial circuit having the transistor level. The reference numeral 107 designates a layout cell of the partial circuit generated by the partial circuit layout generating processing 106.

The reference numeral 108 designates a given register layout cell library. The reference numeral 109 designates a layout arrangement and wiring processing in which the net list 103 having the cell level, the layout cell 107 of the partial circuit and the layout cell library 108 of the register are input to perform the cell-based arrangement and wiring so that a layout is generated. The reference numeral 110 designates layout data generated by the arrangement and wiring processing 109.

The reference numeral 111 designates a register portion delay characteristic library (first delay characteristic library) for storing the delay characteristics of a register portion. The reference numeral 112 designates a partial circuit delay analyzing processing for performing the delay analysis on the layout cell 107 of the partial circuit. The reference numeral 113 designates a partial circuit delay characteristic library (second delay characteristic library) for storing the delay characteristics which are analyzed by the partial circuit delay analyzing processing 112. The reference numeral 114 designates a timing verifying processing for verifying the timing of a given logic circuit based on the register portion delay characteristic library 111, the partial circuit delay characteristic library 113, and the net list 103 having the cell level. The reference numeral 115 designates a deciding processing for returning to the transistor circuit converting processing 104 when the result of the timing verifying processing 114 does not satisfy a desired timing.

The detailed processings of the method for designing the layout of a semiconductor integrated circuit and the method for verifying a timing thereof according to the present embodiment will be described below in accordance with the flowchart of FIG. 1 by using the examples of FIGS. 2, 3, 4(a) and 4(b), 5(a) and 5(b), and 6.

Figure 2:
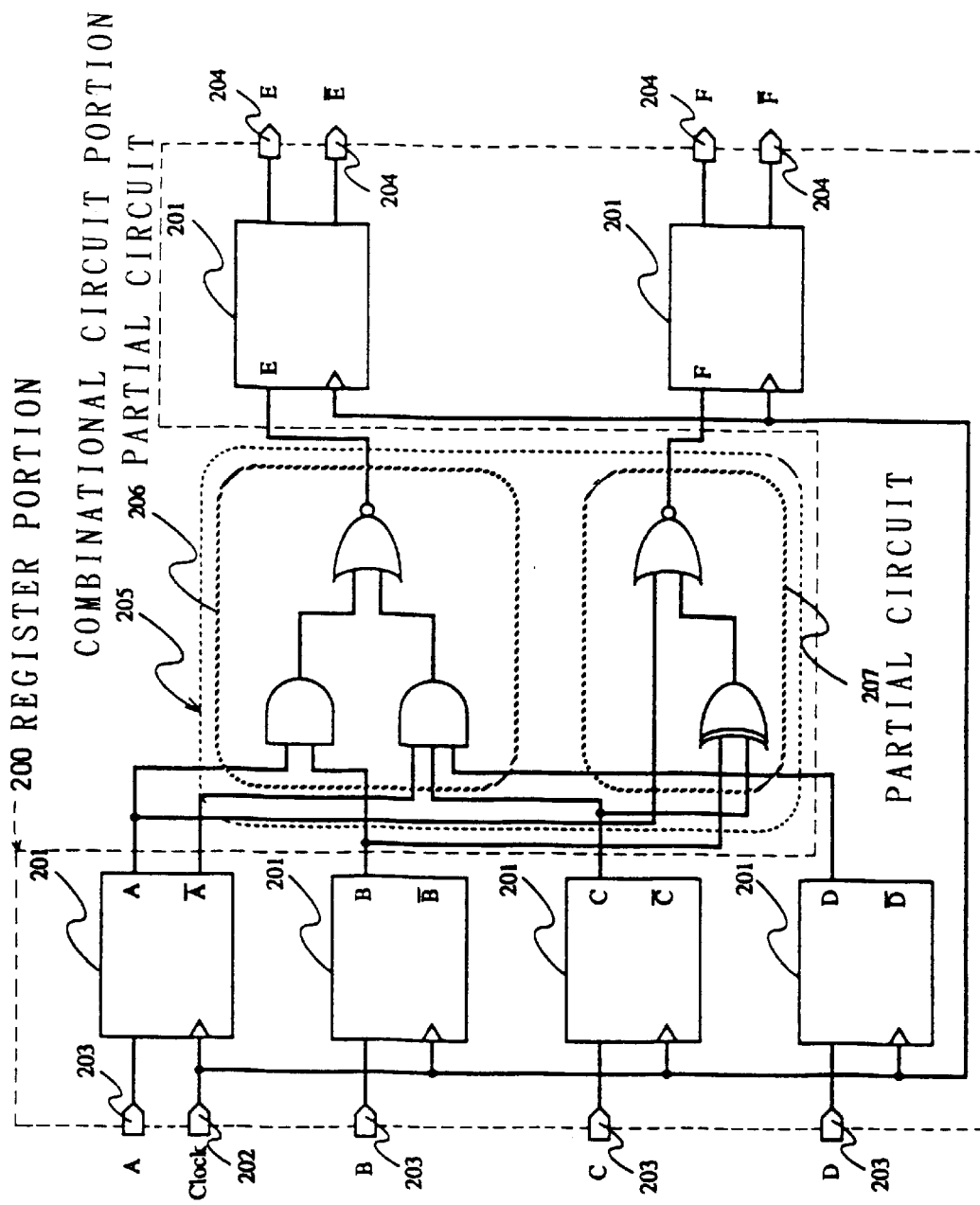
FIG. 2 is a diagram showing an example of a net list having the gate level of a logic circuit according to the first embodiment of the present invention.

FIG. 2 shows an example of a logic circuit which acts as an input according to the present embodiment corresponding to the net list 101 having the gate level shown in FIG. 1. In FIG. 2, the reference numeral 200 designates a register portion, the reference numeral 201 designates a register cell which forms the register portion 200, the reference numeral 202 designates a clock input terminal to the register cell 201, the reference numeral 203 designates a data input terminal of the register cell 201, the reference numeral 204 designates a data output terminal of the register cell 201, the reference numeral 205 designates a combinational circuit portion, and the reference numerals 206 and 207 designate a plurality of (two in FIG. 2) partial circuits which form the combinational circuit portion 205, respectively.

The partial circuits 206 and 207 are circuit portions in which signal paths are connected to each other except for signal paths connected to the outputs of the register portion 200.

According to the present embodiment, a net list which represents the logic circuit of FIG. 2 is divided into the register portion 200 and the combinational circuit portion 205 by the circuit dividing processing 102. Furthermore, the combinational circuit portion 205 is divided into a plurality of partial circuits 206 and 207. Then, the circuit dividing processing 102 also generates a net list which corresponds to a circuit having the cell level shown in FIG. 3 from a net list which corresponds to a circuit having the gate level shown in FIG. 2.

FIG. 3 shows a logic circuit having the cell level in which each of the partial circuits 206 and 207 that are obtained by the division of the circuit dividing processing 102 is replaced with a cell. In FIG. 3, the reference numeral 301 designates a cell which corresponds to the partial circuit 206, and the reference numeral 302 designates a cell which corresponds to the partial circuit 207.

Figure 4A:
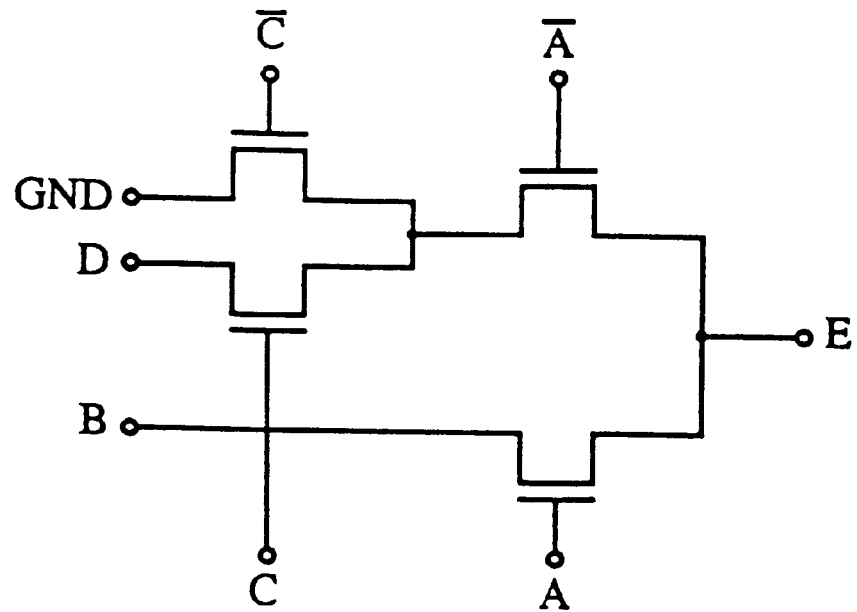
FIG. 4(a) is a diagram showing an example in which a partial circuit according to the first embodiment of the present invention is converted into a circuit having the transistor level.
Figure 4B:
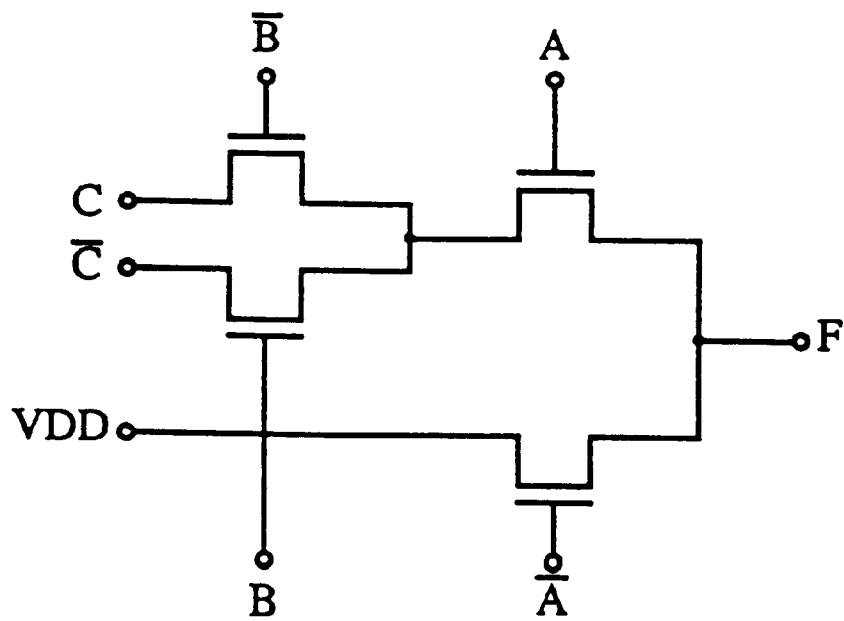
FIG. 4(b) is a diagram showing an example in which another partial circuit is converted into the circuit having the transistor level in the same manner.

Each of the partial circuits 206 and 207 which are obtained by the division of the circuit dividing processing 102 is converted, by the transistor level circuit converting processing 104, into a circuit having the transistor level shown in FIGS. 4(a) and 4(b). In addition, the net list 105 having the transistor level is generated for each partial circuit.

FIGS. 4(a) and 4(b) are diagrams showing circuits having the transistor level in which the partial circuits 206 and 207 are implemented by the N-channel pass-transistor logic by using a BDD (Binary Decision Diagram) respectively in the transistor level circuit converting processing 104. The partial circuits 206 and 207 correspond to FIGS. 4(a) and 4(b), respectively.

In the partial circuit layout cell generating processing 106, the net list 105 for each partial circuit is input to generate the layout cells of the partial circuits 206 and 207. As a method for generating the layout cell of the partial circuit, there is a method for automatically synthesizing layouts by the cell generation for inputting the net list 105 of the partial circuit.

Figure 5A:
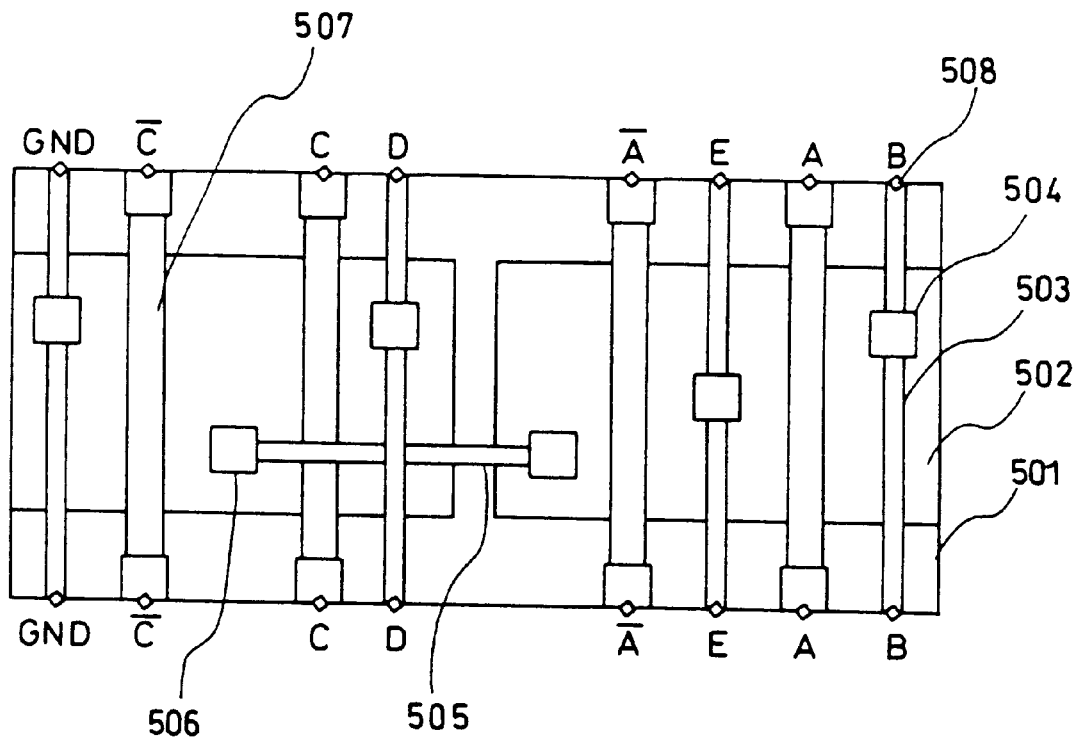
FIG. 5(a) is a diagram showing an example of the layout of a partial circuit which is generated by cell generation according to the first embodiment of the present invention.
Figure 5B:
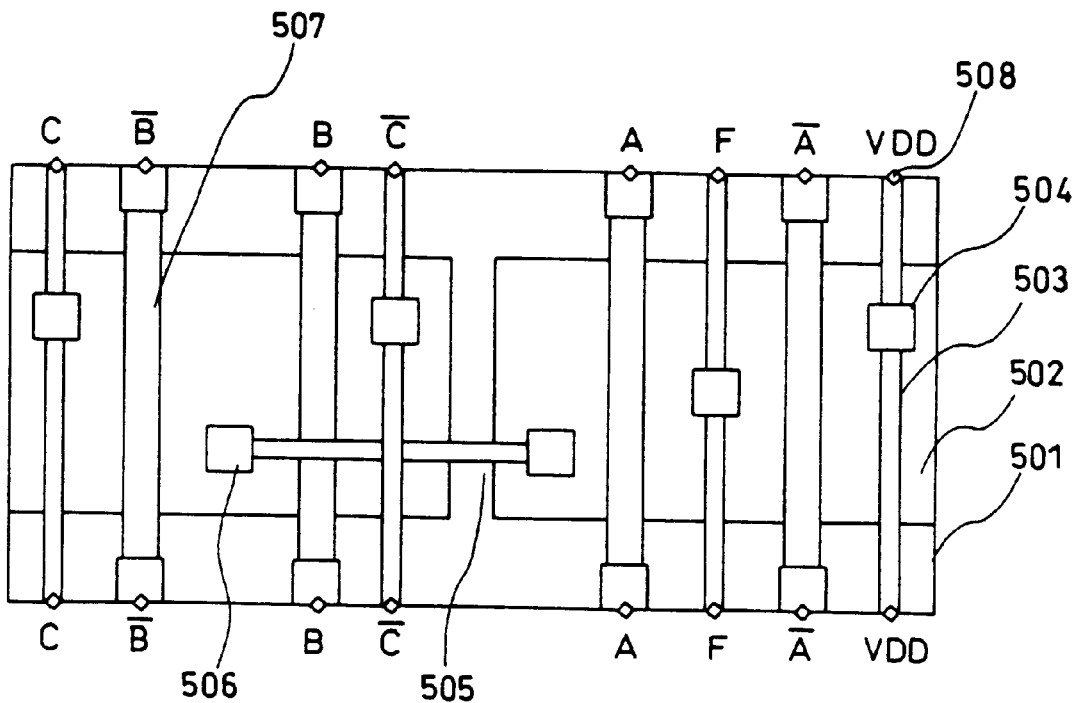
FIG. 5(b) is a diagram showing an example of the layout of another partial circuit in the same manner.

FIGS. 5(a) and 5(b) show the layouts in which the partial circuits having the transistor level shown in FIGS. 4(a) and 4(b) are synthesized by the cell generation, respectively. While an example of the cell generation has been shown, a method for forming a layout cell is not restricted thereto but a method using a subcell and the like can be employed as in second and third embodiments of the present invention which will be described below.

In FIGS. 5(a) and 5(b), the reference numeral 501 designates a cell frame, the reference numeral 502 designates a diffusion region which forms an N-channel transistor, the reference numeral 503 designates a first metal wiring layer, the reference numeral 504 designates a contact which connects the diffusion region 502 and the first metal wiring layer 503, the reference numeral 505 designates a second metal wiring layer, the reference numeral 506 designates a contact which connects the diffusion region 502 and the second metal wiring layer 505, the reference numeral 507 designates a polysilicon wiring which forms the gate of a transistor, and the reference numeral 508 designates an input-output terminal of a layout cell.

The arrangement and wiring processing 109 inputs the net list 103 having the cell level, the register layout cell library 108 and the layout cell 107 of the partial circuit to generate the layout data 110 of a block. The arrangement and wiring processing 109 is implemented by a cell-based automatic arrangement and wiring system which is used for ordinary layout design.

Figure 6:
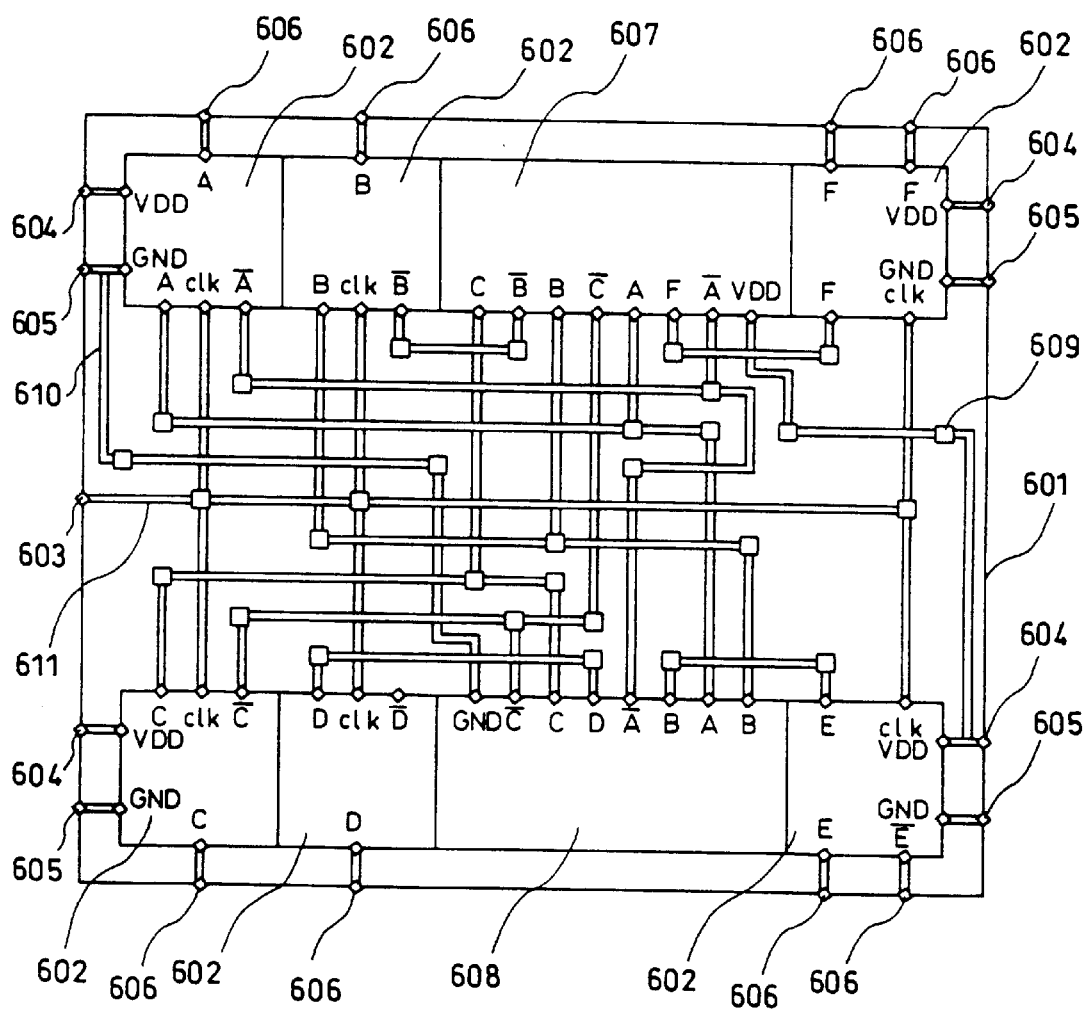
FIG. 6 is a diagram showing an example of the layout of a logic circuit generated by an arrangement and wiring processing according to the first embodiment of the present invention.

FIG. 6 shows a layout corresponding to the layout data 110 of a block which is generated by the arrangement and wiring processing 109. FIG. 6 shows the layout which corresponds to the circuit diagram of FIG. 2.

In FIG. 6, the reference numeral 601 designates a layout block outer frame, the reference numeral 602 designates a register cell, the reference numeral 603 designates a block outer clock terminal, the reference numeral 604 designates a block external power terminal, the reference numeral 605 designates a block external ground terminal, the reference numeral 606 designates a block external signal input-output terminal, the reference numeral 607 designates a layout cell shown in FIG. 5(a) which corresponds to the partial circuit 206, the reference numeral 608 designates a layout cell shown in FIG. 5(b) which corresponds to the partial circuit 207, the reference numeral 610 designates a first metal wiring layer, the reference numeral 611 designates a second metal wiring layer, and the reference numeral 609 designates a contact which connects the first metal wiring layer 610 and the second metal wiring layer 611.

After the layout of the block is generated as described above, the partial circuit delay analyzing processing 112 performs circuit delay analysis for the layout cell 107 corresponding to the partial circuits 206 and 207 so that the delay characteristics of the partial circuits 206 and 207 are obtained, respectively. For example, the delay model of the result obtained by performing the circuit delay analysis for the partial circuit layout shown in FIG. 5(a) which is generated from the partial circuit 206 is expressed by the following form.

cell Cell_a
input A
input A_bar
input B
input C
input C_bar
input D output E

A→E=2 nsec

A_bar→E=2 nsec

B→E=3 nsec

C43 E=4 nsec

C_bar→E=4 nsec

D→E=5 nsec

In the above expression, "→" represents a time which is taken from the change of an input signal to that of an output signal.

In the case where the partial circuits 206 and 207 have the circuits using the pass-transistor logic, a fourth embodiment which will be described below is applied to the calculation of the delay characteristics.

In the timing verifying processing 114, the timing of a given logic circuit is verified by a simulator using individual registers and individual partial circuits as unit gates based on the partial circuit delay characteristic library in which the above-mentioned delay model is prepared for the partial circuits 206 and 207 and the individual register portion delay characteristics 111. In the case where timing errors are caused when verifying the timing by a simulation, a transistor is optimized again to regenerate a circuit in the transistor circuit converting processing 104.

According to the first embodiment of the present invention, the combinational circuit portion is divided every partial circuit having high connectivity in which the signal paths are connected to each other and the partial circuit forms a unit cell. Consequently, it is possible to perform layout design using the existing automatic arrangement and wiring processing without developing a lot of layout cell libraries in both of the complete CMOS circuit and the circuit using the pass-transistor logic. Furthermore, the delay characteristics are obtained for the layout of each partial circuit. Therefore, the delay characteristics can accurately be obtained so that timing verification can be performed with high precision. In addition, timing verification can be performed at higher speed than in the case where the timing of the layout of the logic circuit which is obtained is wholly verified.

Second Embodiment

A second embodiment of the present invention will be described below with reference to the drawings.

Figure 7:
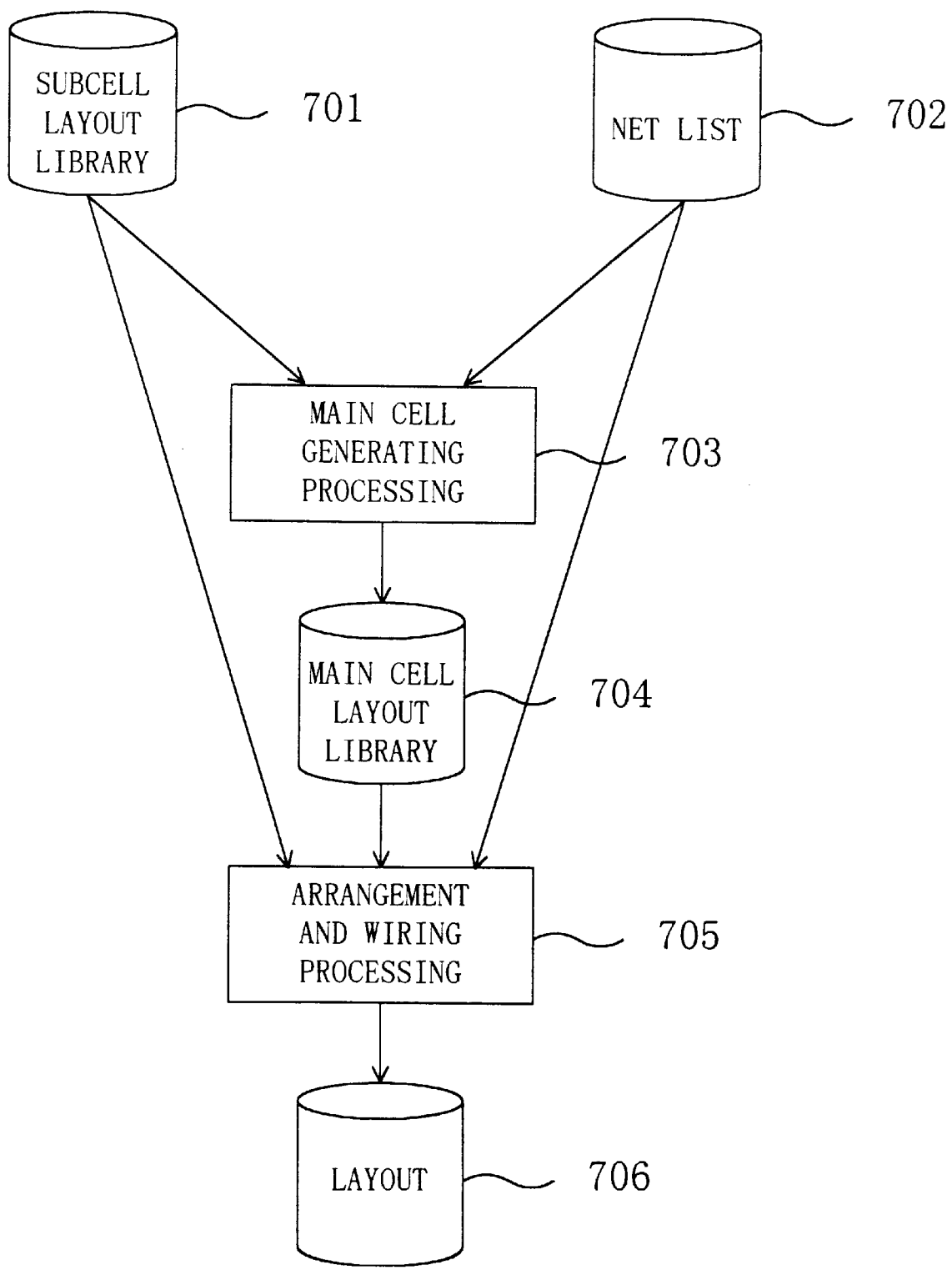
FIG. 7 is a flowchart showing the flow of a method for designing the layout of a semiconductor integrated circuit according to second and third embodiments of the present invention.

FIG. 7 is a flowchart showing a method for designing the layout of a semiconductor integrated circuit according to the present invention.

In FIG. 7, the reference numeral 701 designates a subcell layout library (subcell library), the reference numeral 702 designates a net list of a logic circuit, the reference numeral 703 designates a main cell layout generating processing (main cell generating processing), and the reference numeral 704 designates a main cell layout library (main cell library) generated by the main cell layout generating processing 703. The reference numeral 705 designates an automatic arrangement and wiring processing (layout arrangement and wiring processing) in which the net list 702 of the logic circuit is converted into layout data based on the subcell layout library 701 and the main cell layout library 704, and the reference numeral 706 designates layout data generated by the automatic arrangement and wiring processing 705.

The layout designing method shown in FIG. 7 will be described below in detail with reference to FIGS. 8, 9, 10 and 11. While the inside of the cell is shown by a symbol in FIGS. 8, 10 and 11, it is actually drawn by a mask pattern.

Figure 8:
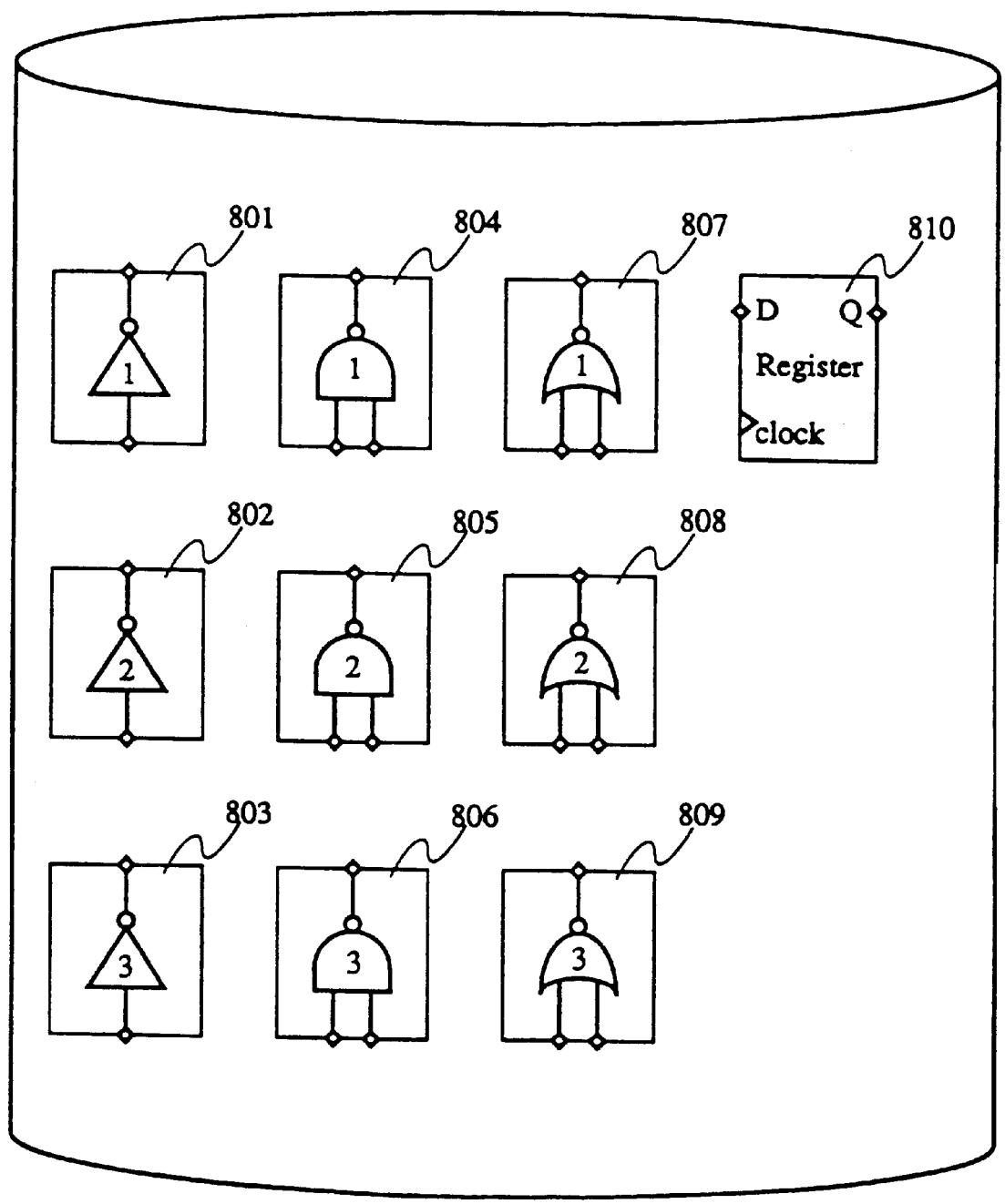
FIG. 8 is a diagram showing an example of a subcell library according to the second embodiment of the present invention.

FIG. 8 shows an example of the subcell layout library 701. The layouts of a plurality of subcells are stored, in advance, in the subcell layout library 701 in FIG. 8. Each subcell is formed by at least one transistor such as inverter gates 801, 802 and 803 having different driving capabilities, NAND gates 804, 805 and 806 having different driving capabilities, NOR gates 807, 808 and 809 having different driving capabilities, and a register 810 shown in FIG. 8. An ordinary cell comprises one logic having the predetermined driving capability.

Therefore, the cell may be divided into a logic portion and a driving capability portion, and various kinds of subcells may be stored in the driving capability portion.

Figure 9:
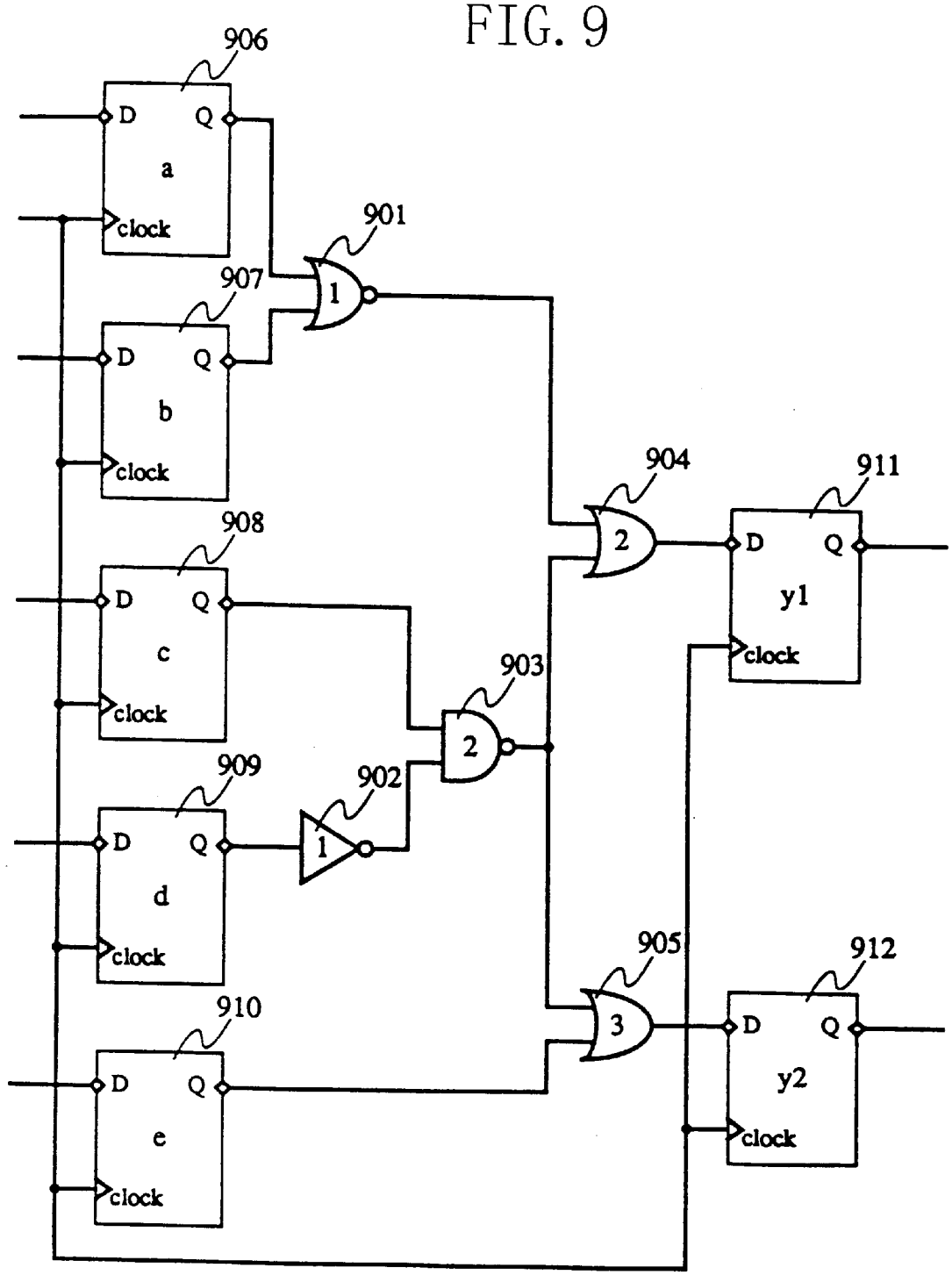
FIG. 9 is a diagram showing an example of a net list of a logic circuit according to the second embodiment of the present invention.

FIG. 9 shows an example of the input net list 702. The reference numeral 901 designates a NOR gate, the reference numeral designates an inverter gate, the reference numeral 903 designates a NAND gate, and the reference numerals 904 and 905 designate OR gates. The reference numerals 906, 907, 908, 909 and 910 designate input registers, and the reference numerals 911 and 912 designate output registers.

In the net list shown in FIG. 9, each of the layouts of the gates 901, 902 and 903 is prepared in the subcell layout library 701 shown in FIG. 8. The OR gates 904 and 905 do not exist in the subcell layout library 701. The main cell layout generating processing 703 selects each subcell of the subcell layouts 802, 803, 807 and 808 from the subcell layout library 701 in order to generate the OR gates 904 and 905 which do not exist in the subcell layout library 701. The selected subcells 802 and 807 are caused to adjoin each other to generate a layout which corresponds to the OR gate 904. The selected subcells 803 and 808 are caused to adjoin each other to generate a layout which corresponds to the OR gate 905.

Figure 10:
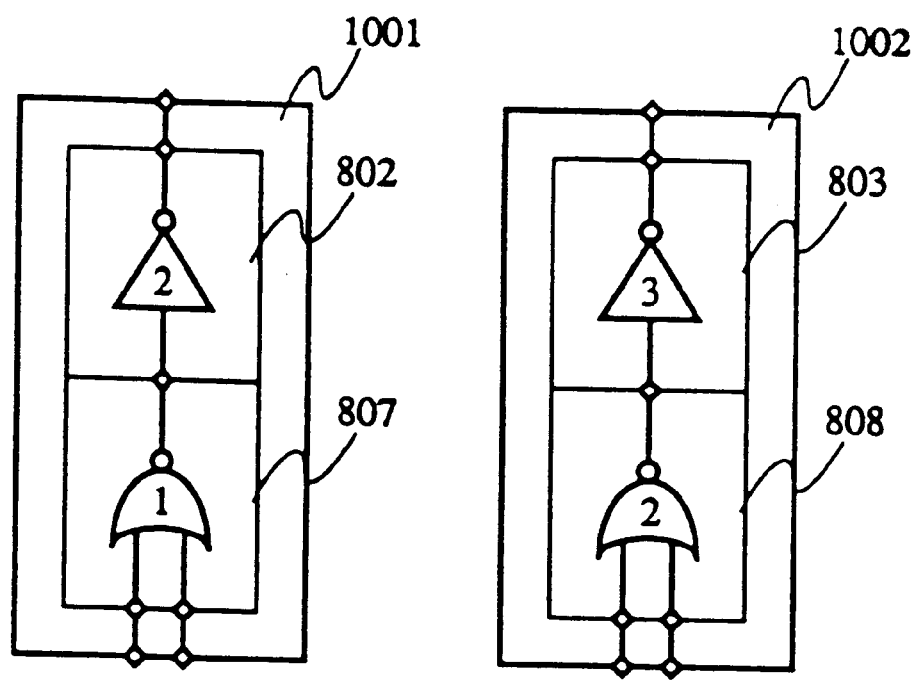
FIG. 10 is a diagram showing an example of a main cell layout according to the second embodiment of the present invention.

FIG. 10 shows an example of a layout thus generated, in which the reference numeral 1001 designates a layout which corresponds to the OR gate 904 and the reference numeral 1002 designates a layout which corresponds to the OR gate 905. The generated layouts are registered and stored as main cell layouts in the main cell layout library 704.

Figure 11:
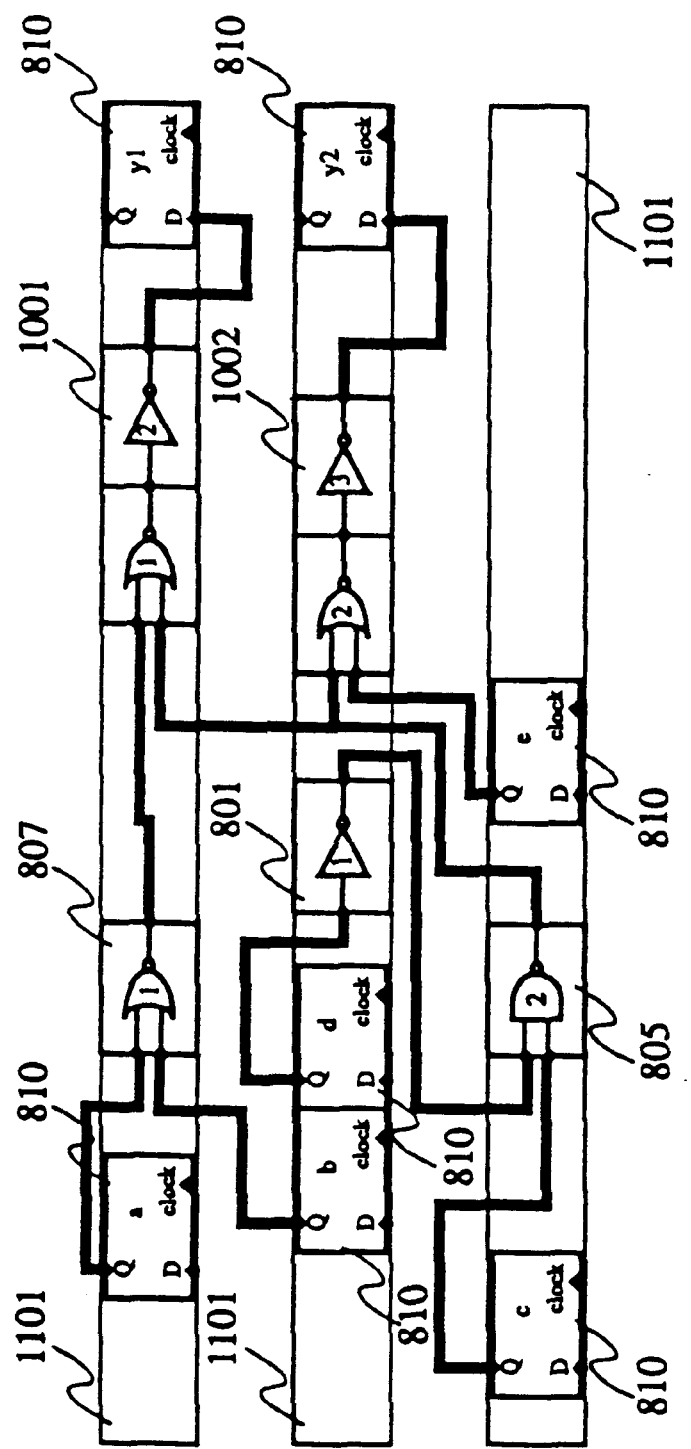
FIG. 11 is a diagram showing an example of a block layout output by an automatic arrangement and wiring processing according to the second embodiment of the present invention.

The automatic arrangement and wiring processing 705 outputs the layout data 706 which corresponds to the given net list 702 shown FIG. 9 based on the subcell layout library 701 and the main cell layout library 704 which is generated as described above. FIG. 11 shows an example of the layout data 706 output from the automatic arrangement and wiring processing 705. In FIG. 11, the reference numeral 1101 designates a cell line. The cell line 1101 has the subcells 801, 805, 807 and 810 and the main cells 1001 and 1002 arranged and wired.

Thus, the subcells are combined to form the circuit portion including a composite gate in the layout design using the flowchart according to the present embodiment. Consequently, it is possible to perform layout design using the existing automatic arrangement and wiring processing without preparing many kinds of layout cells in advance. Furthermore, the newly generated main cell has subcells arranged adjacently to each other. Therefore, the delay caused by the wiring can be suppressed, and the consumed power can be reduced.

Third Embodiment

A third embodiment of the present invention will be described below. The present embodiment of the invention shows a layout designing method wherein the basic portion of a pass-transistor gate is included as a subcell in the second embodiment described above.

The present embodiment will be described below in accordance with the flowchart of FIG. 7 with reference to FIGS. 12, 13, 14 and 15. While the inside of the cell is shown by a symbol in FIGS. 12, 14 and 15, it is actually drawn by a mask pattern.

Figure 12:
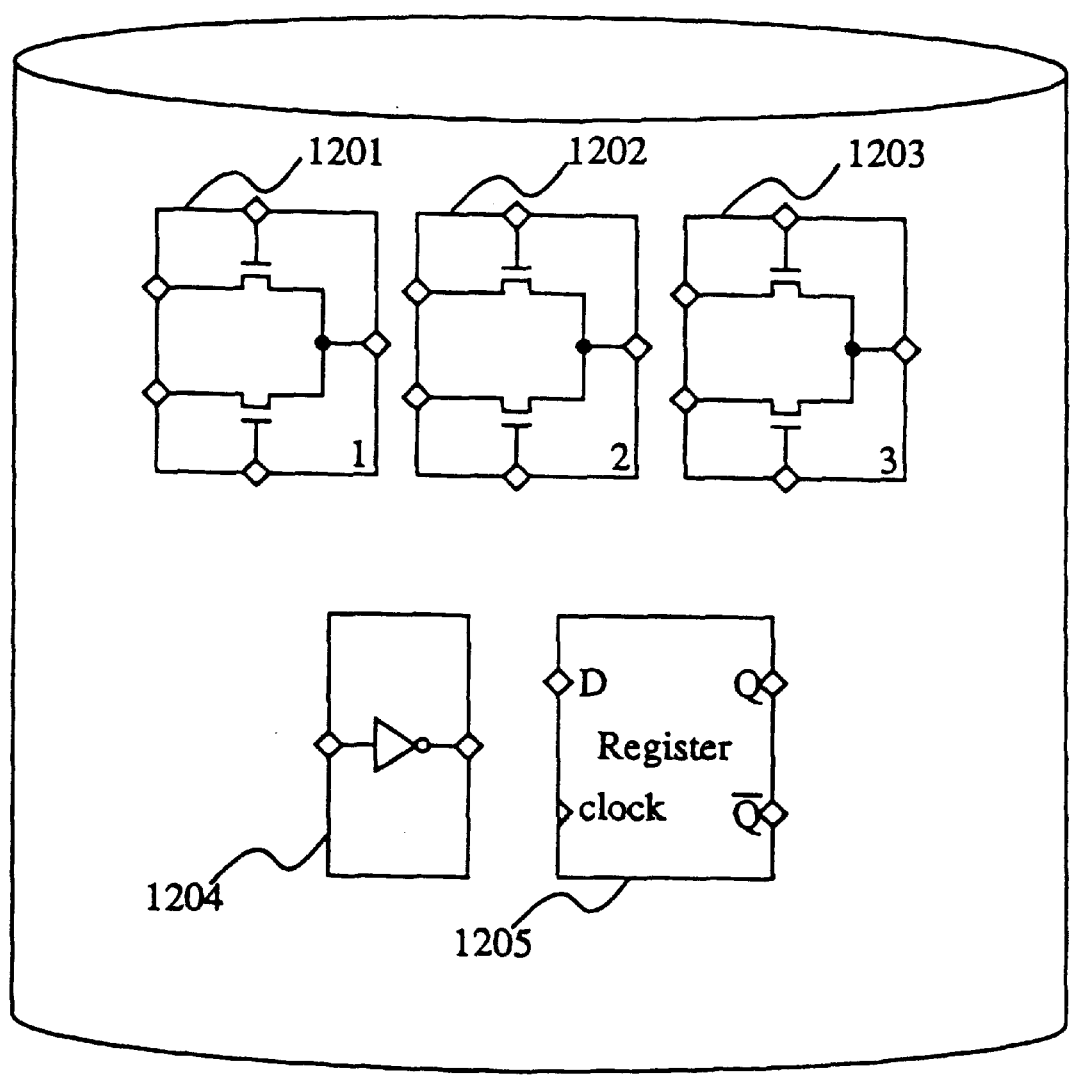
FIG. 12 is a diagram showing an example of a subcell library according to a third embodiment of the present invention.

FIG. 12 shows an example of the subcell layout library 701. A subcell shown in FIG. 12 includes a cell formed by two transistors having the same polarity in which source terminals are connected to each other. In the subcell layout library 701 shown in FIG. 12, the reference numerals 1201, 1202 and 1203 designate subcells of N-channel pass-transistor gates having different driving capabilities, the reference numeral 1204 designates a subcell comprising an inverter gate, and the reference numeral 1205 designates a subcell comprising a register.

Figure 13:
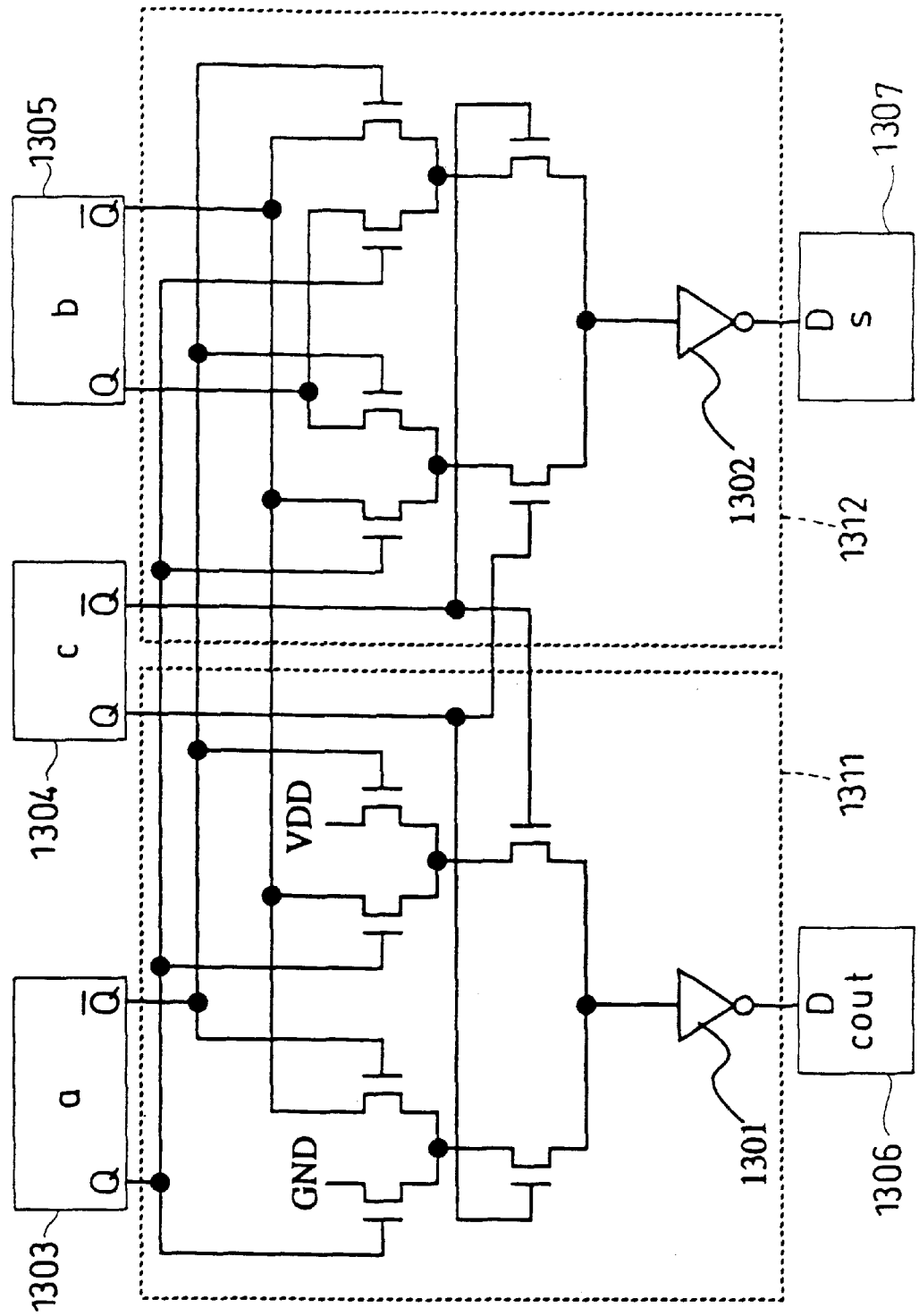
FIG. 13 is a diagram showing an example of a net list according to the third embodiment of the present invention.

FIG. 13 shows an example of the net list 702 which is input, and represents a full adder which is incorporated by using the pass-transistor logic. In FIG. 13, the reference numerals 1301 and 1302 designate inverter gates, the reference numerals 1303, 1304 and 1305 designate input registers, the reference numerals 1306 and 1307 designate output registers, and the reference numerals 1311 and 1312 designate partial circuits.

Figure 14:
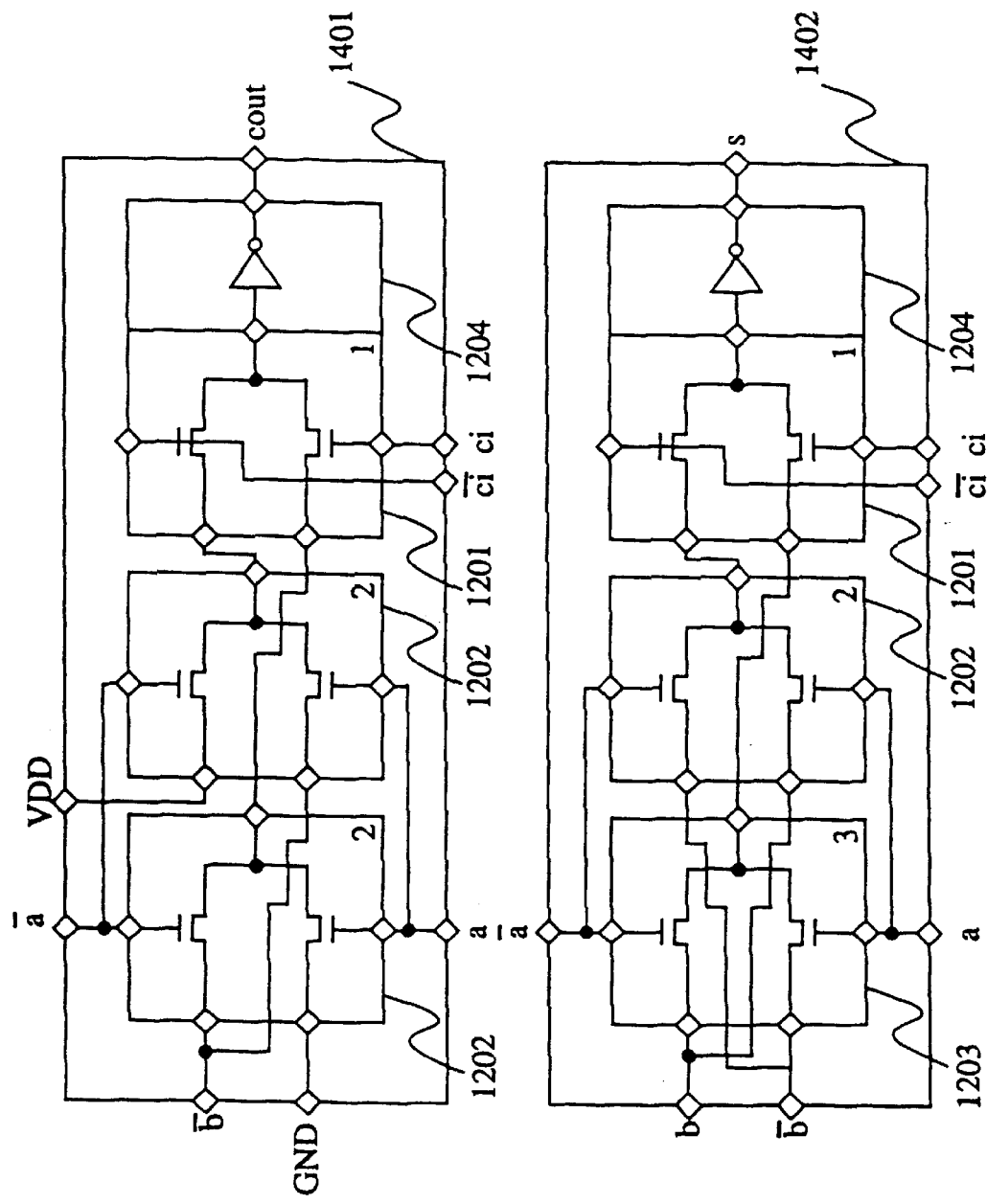
FIG. 14 is a diagram showing an example of a main cell layout according to the third embodiment of the present invention.

The main cell layout generating processing 703 generates, as main cells, the partial circuits 1311 and 1312 shown in FIG. 13. The main cell layout generating processing 703 selects each subcell of the subcell layouts 1201, 1202, 1203 and 1204 from the subcell layout library 701 during generation in order to generate layouts which correspond to the partial circuits 1311 and 1312. The selected subcells are arranged and wired to generate a main cell layout which corresponds to the partial circuits 1311 and 1312. FIG. 14 shows an example of a main cell layout thus generated, in which the reference numeral 1401 designates a main cell that corresponds to the partial circuit 1311 and is formed by subcells 1201, 1202 and 1204. The reference numeral 1402 is a main cell which corresponds to the partial circuit 1312 and is formed by subcells 1201, 1202, 1203 and 1204. The main cell layout thus generated is stored in the is main cell layout library 704.

Figure 15:
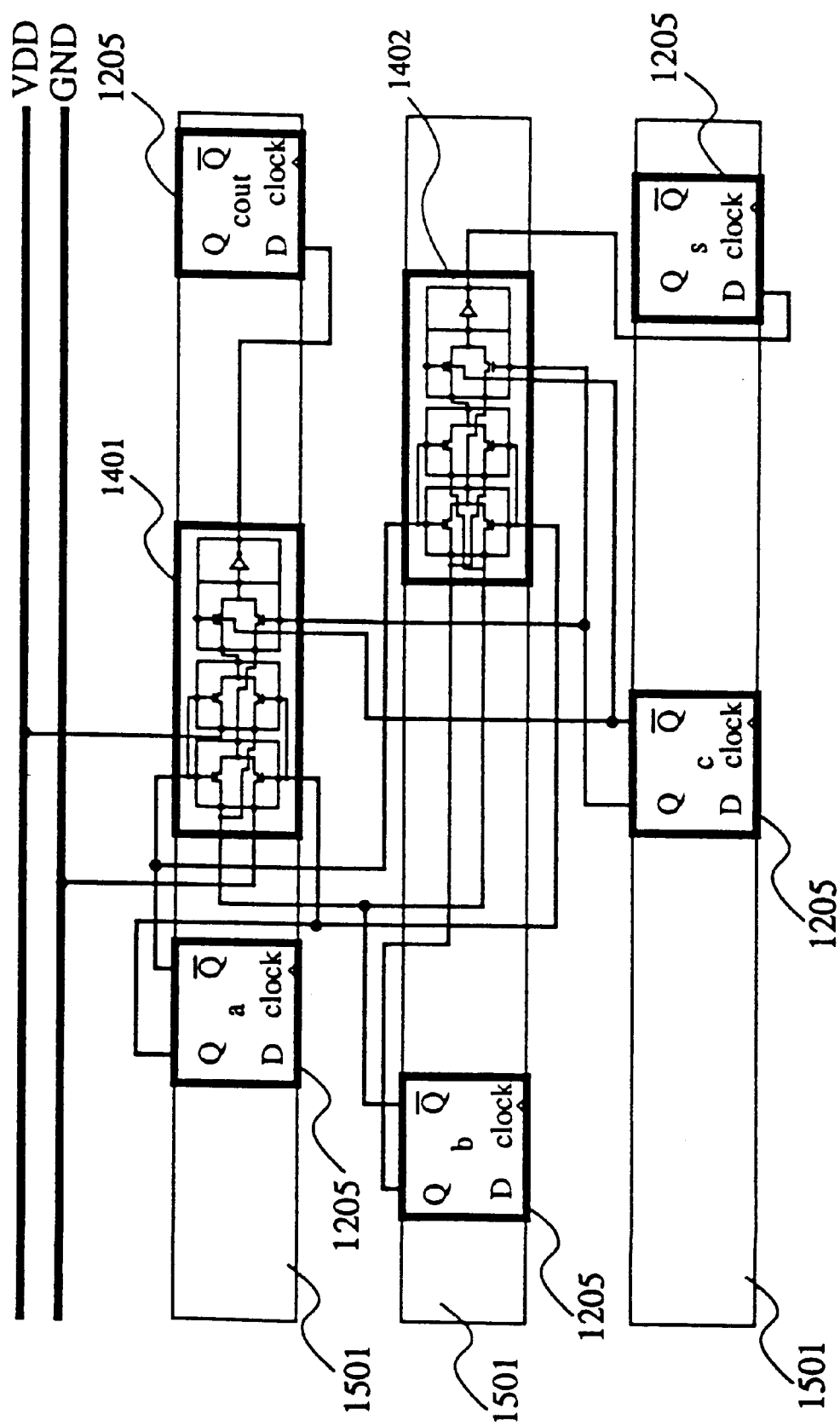
FIG. 15 is a diagram showing an example of a block layout output by an automatic arrangement and wiring processing according to the third embodiment of the present invention.

The automatic arrangement and wiring processing 705 outputs the layout data 706 which corresponds to the given net list 702 based on the subcell layout library 701 and the main cell layout library 704 that is generated as described above. FIG. 15 shows an example of the layout data 706 output from the automatic arrangement and wiring processing 705. In FIG. 15, the reference numeral 1501 designates a cell line. The cell lines 1501 have the subcells 1205 and the main cells 1401 and 1402 arranged and wired.

Thus, the subcells are combined to form a circuit portion using the pass-transistor logic in the layout design in accordance with the flowchart of the present invention. Consequently, it is possible to perform layout design using the existing automatic arrangement and wiring processing without preparing many kinds of layout cells in advance. Furthermore, the newly generated main cell has subcells arranged adjacently to each other. Therefore, the delay caused by the wiring can be suppressed, and the consumed power can be reduced.

While two N-channel transistors have been used in the present embodiment, it is apparent that the same processing can also be performed by using a subcell which is formed by connecting two P-channel transistors so that the same effects can be obtained.

Fourth Embodiment

A method for verifying the timing of a semiconductor integrated circuit according to a fourth embodiment of the present invention will be described below with reference to FIGS. 16 and 17.

Figure 16:
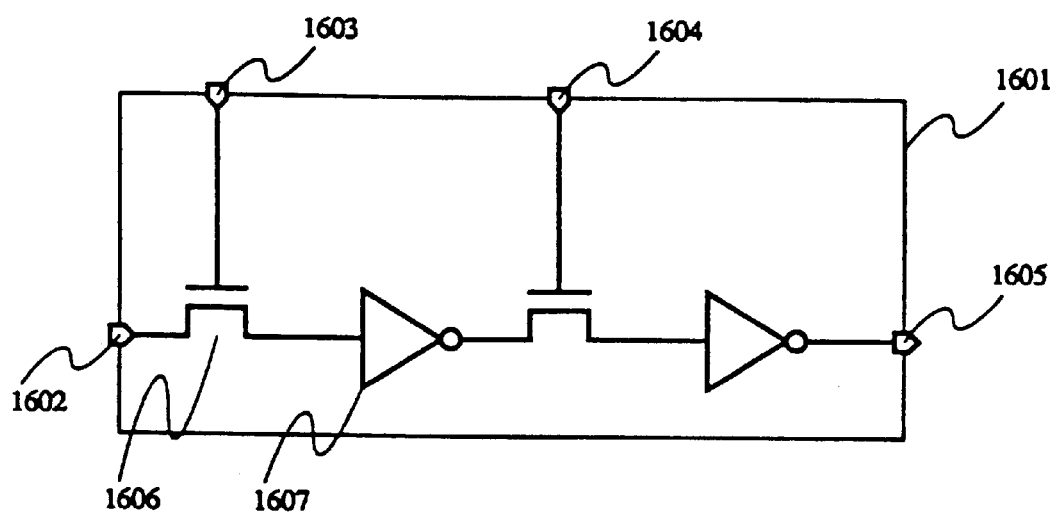
FIG. 16 is a diagram showing an example of a cell according to a fourth embodiment of the present invention.

FIG. 16 shows an example of a cell (gate) in which the input capacity is varied depending on the input signal of a terminal. In FIG. 16, the reference numeral 1601 designates a boundary of the cell, the reference numerals 1602, 1603 and 1604 designate input terminals (input pins), the reference numeral 1605 designates an output terminal, the reference numeral 1606 designates an N-channel transistor, and the reference numeral 1607 designates an inverter gate.

In FIG. 16, when the input level of the input terminal 1603 is LOW, the N-channel transistor 1606 is turned off and the input load capacity of the input terminal 1602 is only the drain capacity of the N-channel transistor 1606 if the wiring capacity is ignored. On the other hand, when the input level of the input terminal 1603 is HIGH, the N-channel transistor 1606 is turned on and the input load capacity of the input terminal 1602 is the capacity which is obtained by adding the drain and source capacities of the N-channel transistor 1606 and the gate capacity of the inverter gate 1607 if the wiring capacity is ignored.

Figure 17:
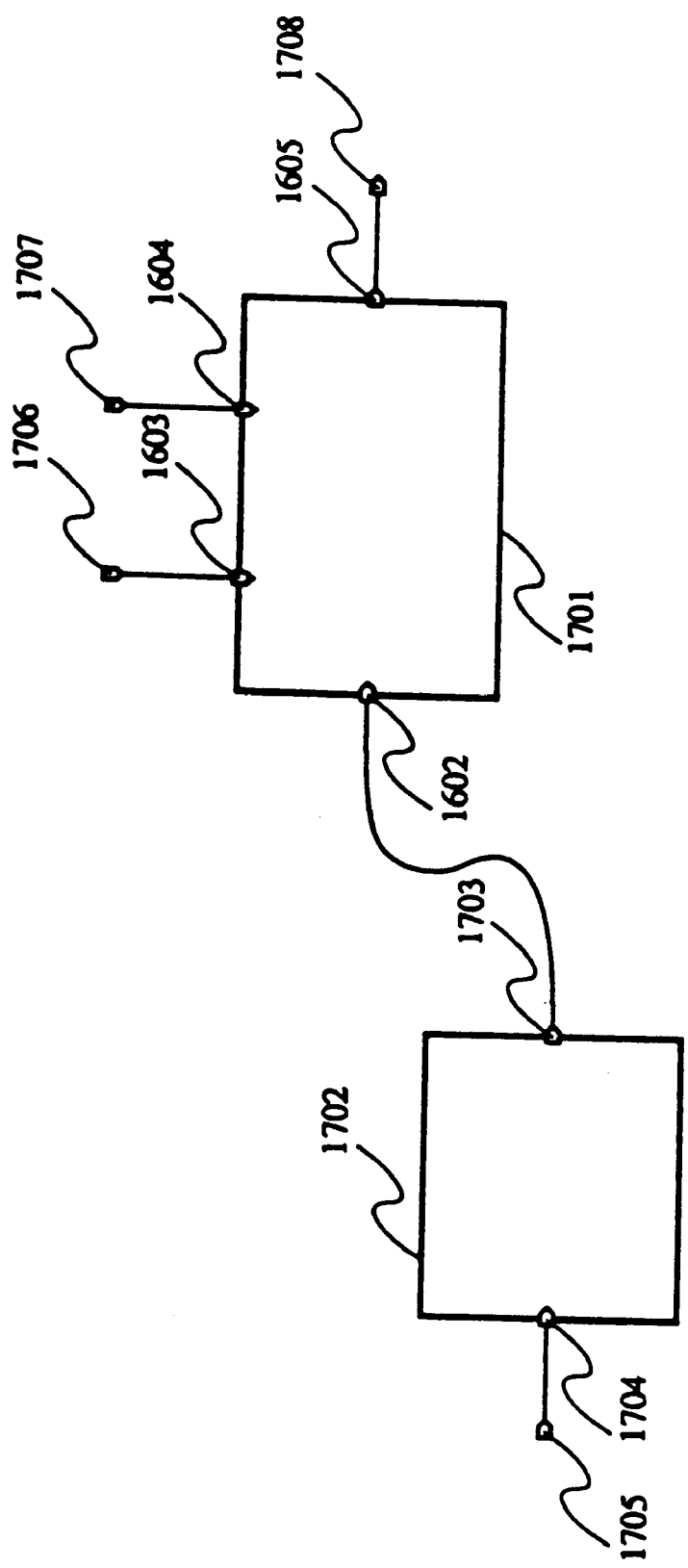
FIG. 17 is a diagram showing an example of a circuit using the cell shown in FIG. 16 according to the fourth embodiment of the present invention.

FIG. 17 shows an example of a circuit using the cell of FIG. 16. In FIG. 17, the reference numeral 1701 designates the cell shown in FIG. 16, the reference numeral 1702 designates another cell, the reference numeral 1703 designates an output terminal of the cell 1702, the reference numeral 1704 designates an input terminal of the cell 1702, and the reference numerals 1705, 1706, 1707 and 1708 designate terminals for connection to the outside. The input terminal 1602 of the cell 1701 is connected to the output terminal 1703 of the cell 1702. The input terminal 1704 of the cell 1702 is connected to the terminal 1705 for connection to the outside. Terminals 1603, 1604 and 1605 of the cell 1701 are connected to the terminals 1706, 1707 and 1708 for connection to the outside, respectively.

When verifying the timing of the circuit shown in FIG. 17, it is necessary to obtain the delay value of the output terminal 1703 of the cell 1702. Consequently, it is necessary to calculate the load capacity of the input terminal 1602 of the cell 1701 connected to the output terminal 1703. As described above, the input capacity of the input terminal 1602 of the cell 1701 is the minimum when the input level of the input terminal 1603 is LOW, while the input capacity of the input terminal 1602 of the cell 1701 is the maximum when the input level of the input terminal 1603 is HIGH. For this reason, the minimum input capacity value and the maximum input capacity value are obtained in advance, and delay values are obtained for each case. These minimum and maximum delay values are defined for the cell 1701 and transferred to a simulator so that it is verified by static timing analysis whether or not a desired timing is satisfied for both delay values.

If a net list has a plurality of cells having the terminal in which the input capacity is varied depending on the input signal or the internal state as shown in FIG. 16, it is verified whether or not the desired timing is satisfied by performing several kinds of verification with a delay value which is obtained by properly combining the maximum and minimum delay values of each output terminal of each cell.

The cell having the terminal in which the input capacity is varied depending on the input signal or the internal state may have the structure shown in FIG. 16 or may have the circuit using the pass-transistor logic shown in FIG. 14. In the case where the partial circuits 206 and 207 shown in FIG. 2 according to the first embodiment are formed by the circuit using the pass-transistor logic, the fourth embodiment may be applied to the partial circuit delay analyzing processing 112 and the timing verifying processing 114 according to the first embodiment (see FIG. 1).

According to the timing verifying method according to the fourth embodiment of the present invention described above, it is possible to accurately verify whether or not desired timing constraints can be satisfied for the net list including the cell having the terminal in which the input capacity is varied depending on the input signal or the internal state in consideration of the minimum and maximum delay values taken in all combinations which are possible.

Fifth Embodiment

Figure 18:
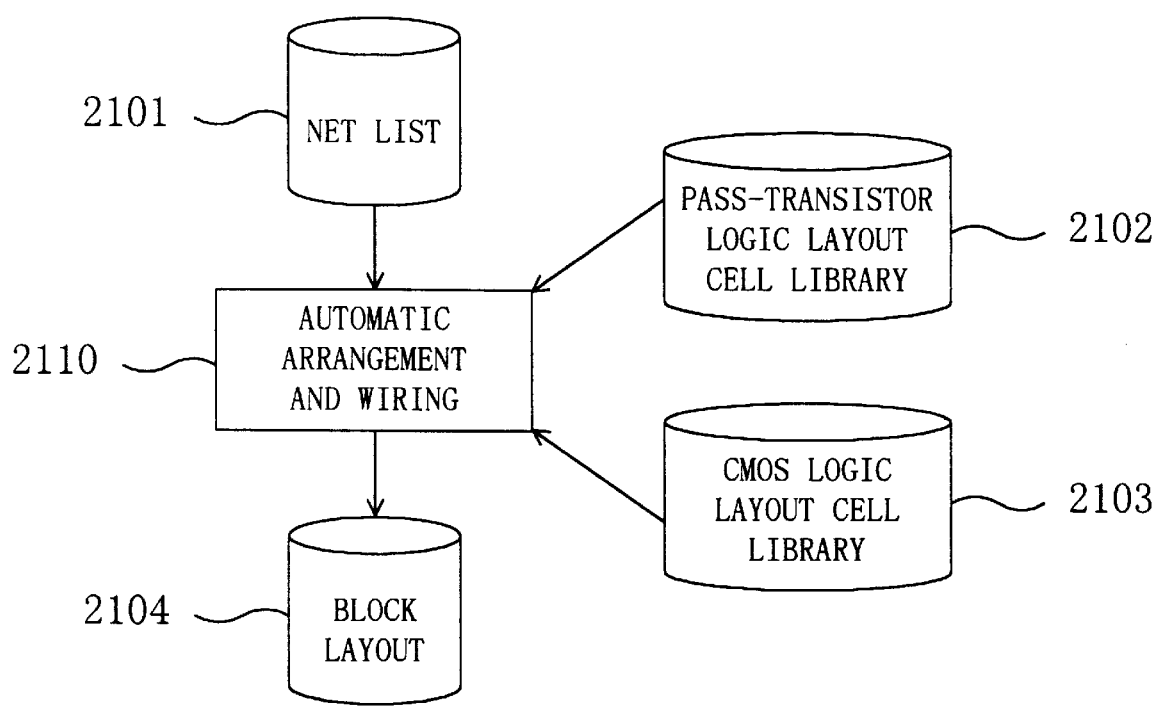
FIG. 18 is a system flowchart showing the flow of a method for designing a semiconductor integrated circuit according to a fifth embodiment of the present invention.

FIG. 18 is a system flowchart according to a fifth embodiment of the present invention. In FIG. 18, the reference numeral 2101 designates a given net list, the reference numeral 2102 designates a pass-transistor logic layout cell library for forming a circuit using the pass-transistor logic, the reference numeral 2103 designates a CMOS logic layout cell library for forming a circuit using the CMOS logic, the reference numeral 2104 designates a block layout which is generated, and the reference numeral 2110 designates an automatic arrangement and wiring processing for generating the block layout 2104 from the given net list 2101 by using the layout cell libraries 2102 and 2103.

Figure 19:
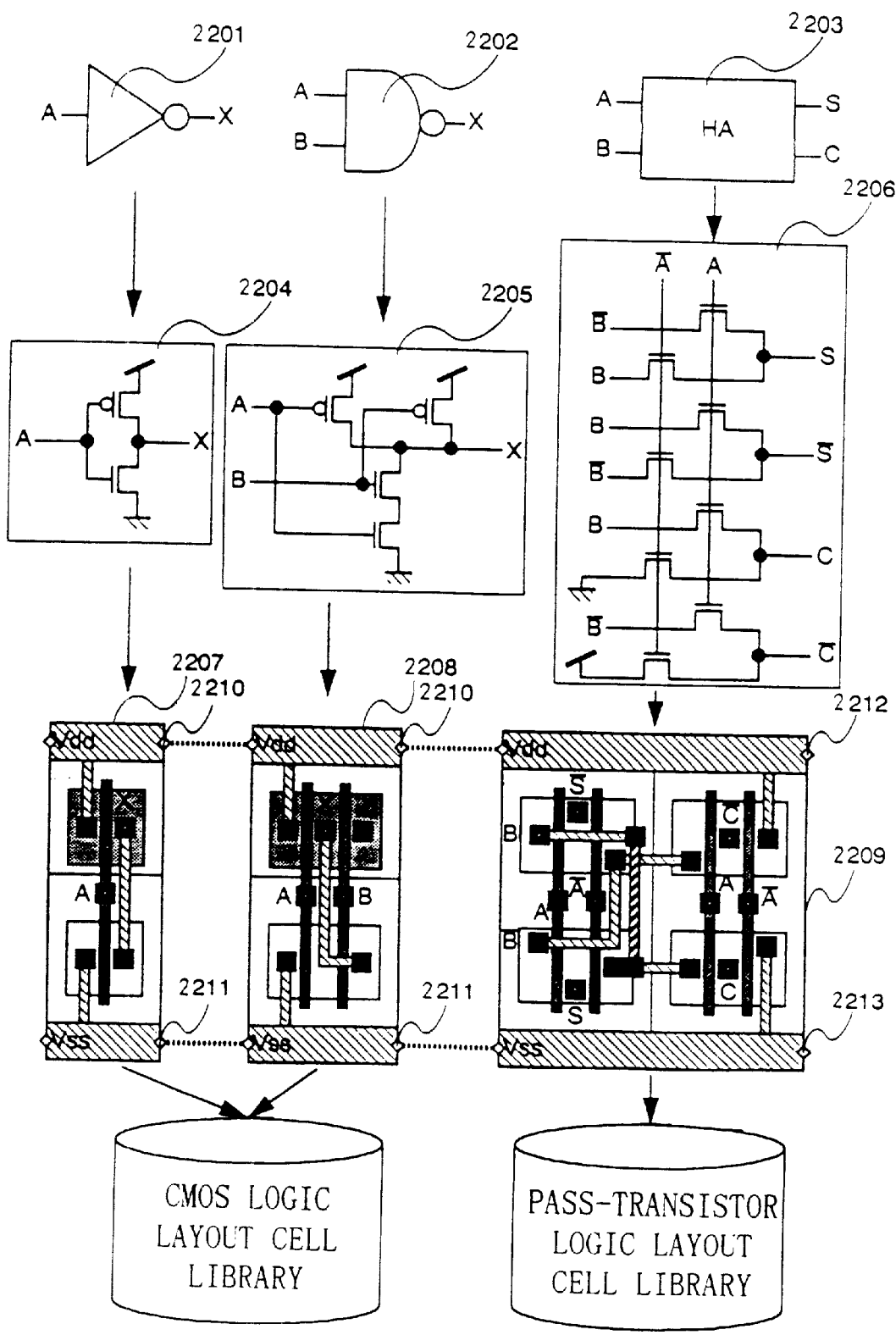
FIG. 19 is a diagram showing an example of a layout cell library according to the fifth embodiment of the present invention.

FIG. 19 shows a specific example of a layout cell library stored in the cell libraries 2102 and 2103. The reference numeral 2201 designates an inverter, and the reference numeral 2202 designates a 2-input NAND gate. The reference numerals 2204 and 2205 designate circuits having the transistor level in which the inverter 2201 and the 2-input NAND gate 2202 are implemented by the CMOS logic, respectively. The reference numerals 2207 and 2208 designate CMOS logic layout cells of the circuits 2204 and 2205, respectively. The CMOS logic layout cells 2207 and 2208 are stored in the CMOS logic layout cell library 2103. In addition, a logic gate in which at least one of the area, the delay and the consumed power is smaller by using the CMOS logic than by using the pass-transistor logic is implemented by the CMOS logic, and its CMOS logic layout cell is stored in the CMOS logic layout cell library 2103.

The reference numeral 2203 designates a half adder, the reference numeral 2206 designates a circuit having the transistor level which implements the half adder 2203 by using the pass-transistor logic, and the reference numeral 2209 designates a pass-transistor logic layout cell in which the circuit 2206 is formed by using the pass-transistor logic. The layout cell 2209 is stored in the pass-transistor logic layout cell library 2102. In addition to the layout cell 2209, a logic gate in which at least one of the area, the delay and the consumed power is smaller by using the pass-transistor logic than by using the CMOS logic is implemented by the pass-transistor logic, and its pass-transistor logic layout cell is stored in the pass-transistor logic layout cell library 2102.

Figure 44:
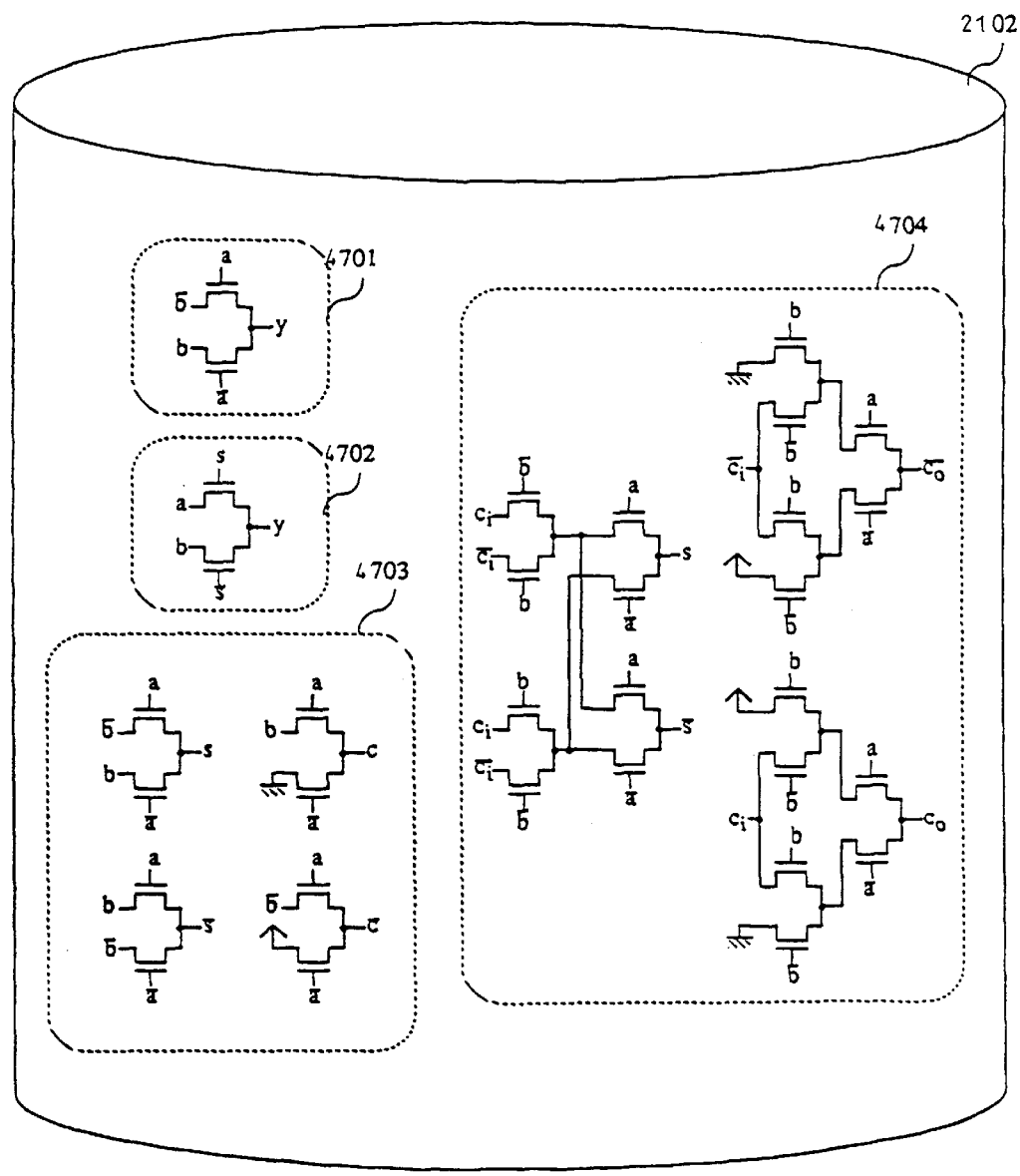
FIG. 44 is a diagram showing an example of a cell stored in a pass-transistor logic layout cell library.

For example, FIG. 44 shows an example of a cell stored in the pass-transistor logic layout cell library 2102. The reference numeral 4701 designates a circuit having the transistor level in which an exclusive-OR circuit is implemented by using the pass-transistor logic, the reference numeral 4702 designates a circuit having the transistor level in which a selector is implemented by using the pass-transistor logic, the reference numeral 4703 designates a circuit having the transistor level in which the half adder is implemented by using the pass-transistor logic, and the reference numeral 4704 designates a circuit having the transistor level in which the full adder is implemented by using the pass-transistor logic. A layout cell which corresponds to each circuit is stored in the pass-transistor logic layout cell library 2102.

Figure 45:
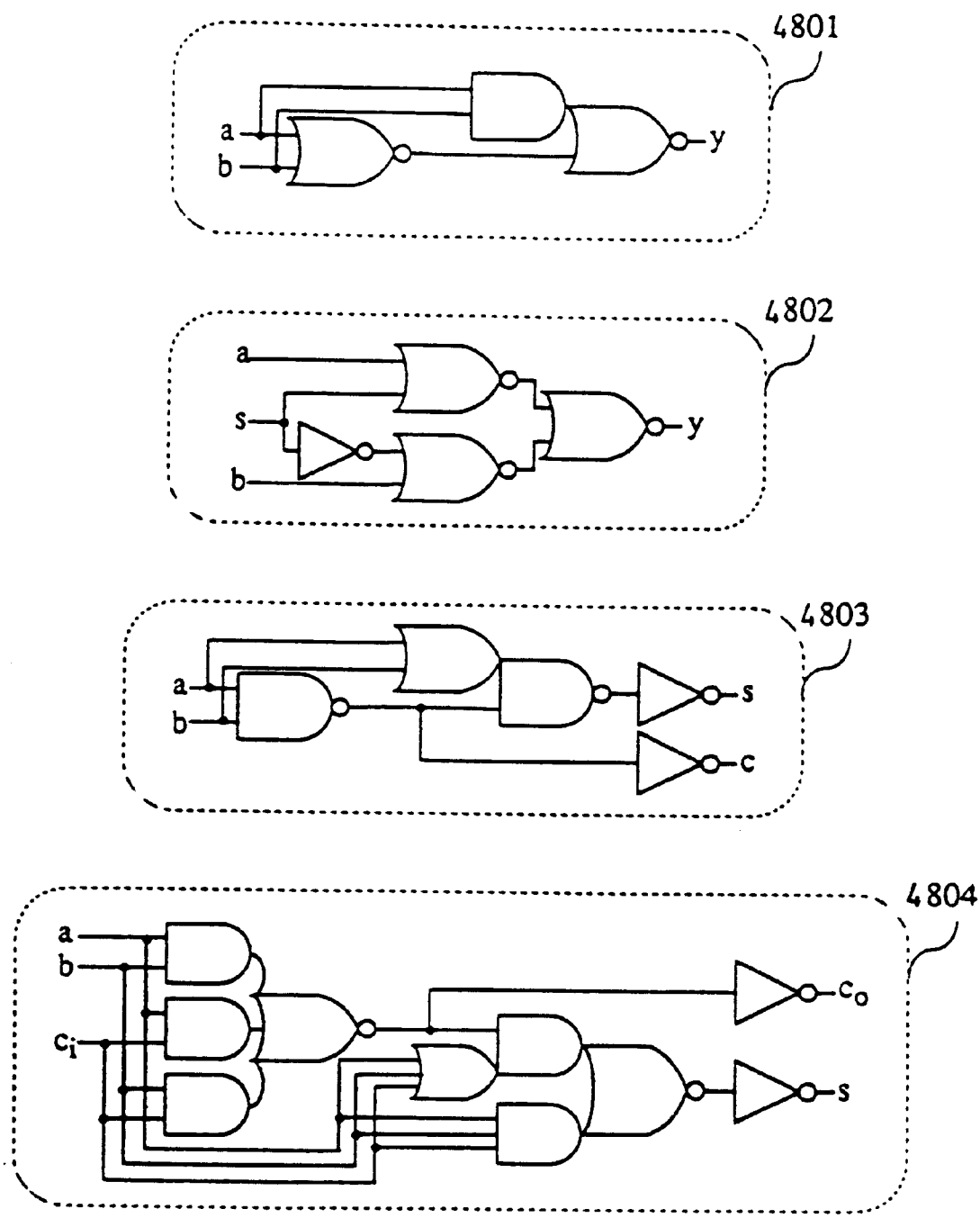
Figure 46:
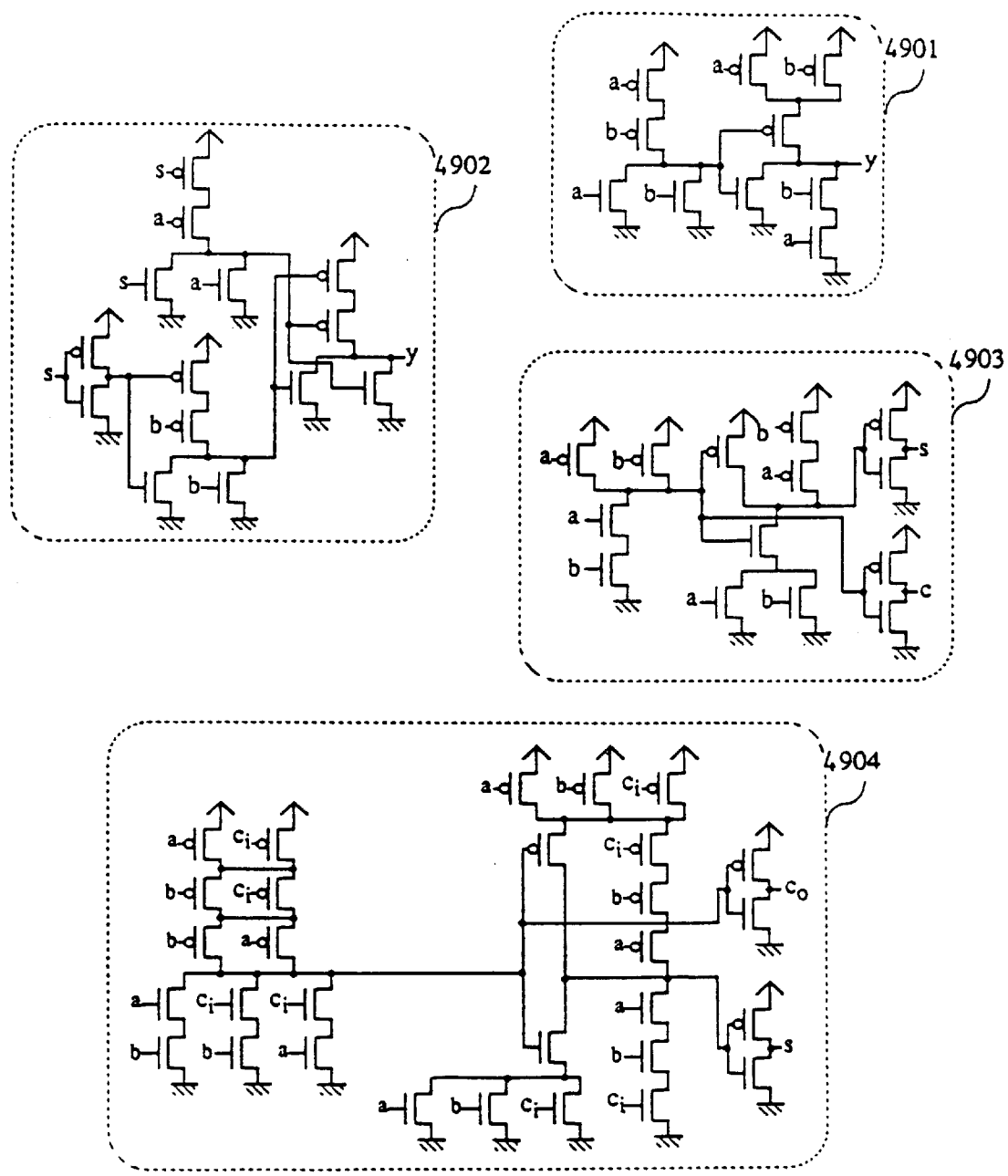
FIG. 46 is a diagram showing a circuit having the transistor level in which the exclusive-OR circuit, the selector, the half adder and the full adder are implemented by using the CMOS logic.

FIG. 45 is a circuit diagram in which each circuit shown in FIG. 44 is implemented by an inverter gate, an AND gate, a NAND gate, an OR gate, a NOR gate and a composite gate thereof. The reference numeral 4801 designates an exclusive-OR circuit, the reference numeral 4802 designates a selector, the reference numeral 4803 designates a half adder, and the reference numeral 4804 designates a full adder. These are drawn by circuits having the transistor level of the CMOS logic in FIG. 46. The reference numeral 4901 designates a circuit having the transistor level of the exclusive-OR circuit 4801, the reference numeral 4902 designates a circuit having the transistor level of the selector 4802, the reference numeral 4903 designates a circuit having the transistor level of the half adder 4803, and the reference numeral 4904 designates a circuit having the transistor level of the full adder 4804. If they are implemented by using the CMOS logic, the exclusive-OR circuit can be formed by 10 transistors, the selector can be formed by 14 transistors, the half adder can be formed by 14 transistors and the full adder can be formed by 30 transistors. It is apparent from these figures that the number of transistors is greater than in the circuit using the pass-transistor logic shown in FIG. 44. If all the transistors have the same sizes, the sum of the channel widths of the transistors is reduced. In case of the exclusive-OR circuit, while the number of stages of the transistors which are connected in maximum series in a circuit using the pass-transistor logic from an input to an output is 1, the number of stages of the transistors is 2 in a circuit using the CMOS logic. Consequently, it is apparent that the delay from the input to the output is reduced.

In the layout cells 2207, 2208 and 2209, the reference numerals 2210 and 2211 designate a power terminal (power line) and a ground terminal (ground line) of the CMOS logic layout cells 2207 and 2208 respectively, and the reference numerals 2212 and 2213 designate a power terminal (power line) and a ground terminal (ground line) of the pass-transistor logic layout cell 2209 respectively. The spacing between the power terminal 2210 and the ground terminal 2211 of the CMOS logic layout cells 2207 and 2208 is set equal to the spacing between the power terminal 2212 and the ground terminal 2213 of the pass-transistor logic layout cell 2209. Consequently, the layout cell in the CMOS logic layout cell library 2103 and the layout cell in the pass-transistor logic layout cell library 2102 are arranged together in the same line so that a layout can be created by a standard cell method.

Figure 20:
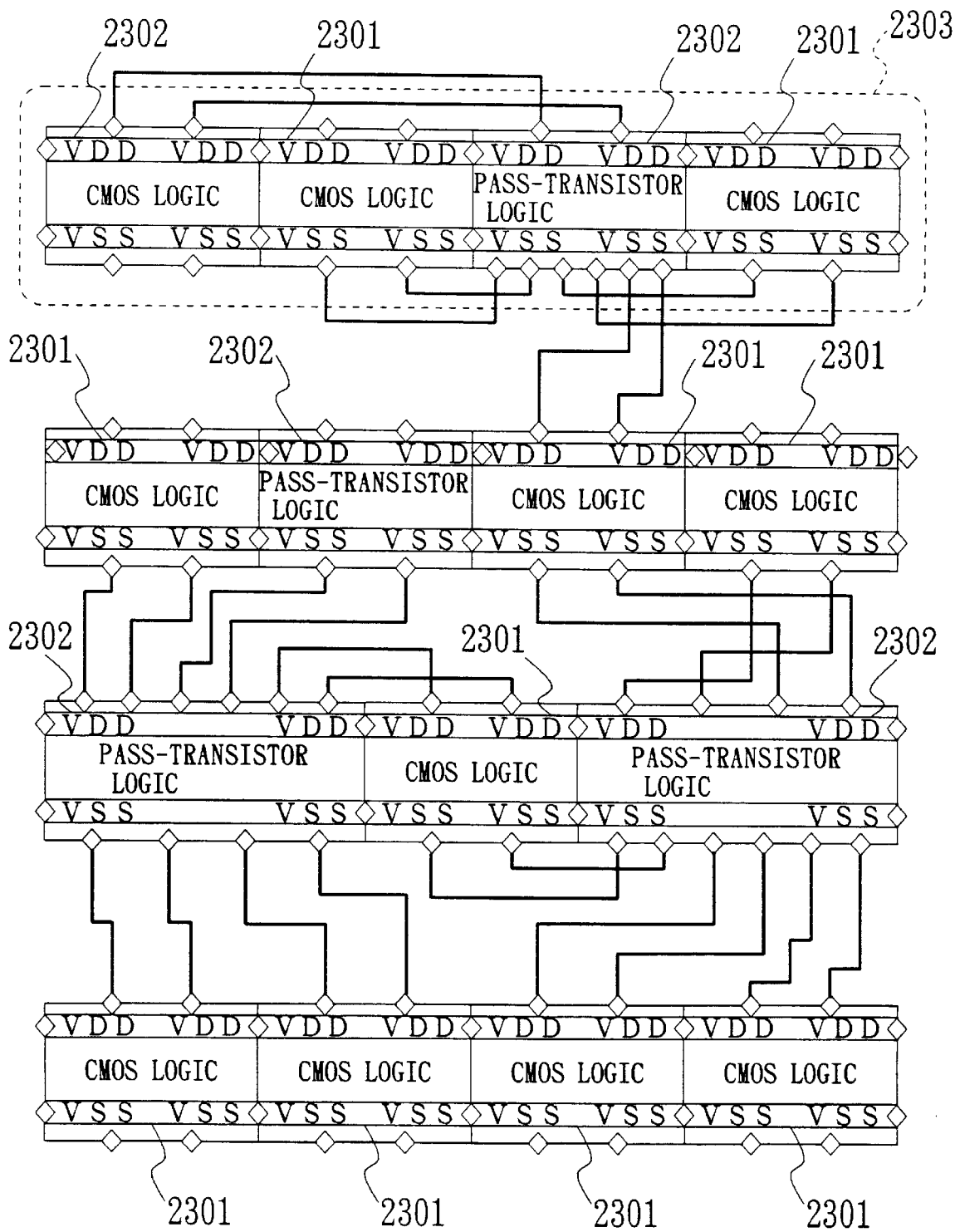
FIG. 20 is a diagram showing an example of a block layout according to the fifth embodiment of the present invention.

FIG. 20 shows an example of the layout of a semiconductor integrated circuit created by the designing method according to the present embodiment. By using the pass-transistor logic layout cell in the pass-transistor logic layout cell library 2102 and the CMOS logic layout cell in the CMOS logic layout cell library 2103 in accordance with the net list 2101, a block layout is created by the standard cell method by performing the automatic arrangement and wiring processing 2110.

In FIG. 20, the reference numeral 2301 designates a CMOS logic layout cell, the reference numeral 2302 designates a pass-transistor logic layout cell, and the reference numeral 2303 designates a layout of the line in which the layout cells 2301 and 2302 are provided together in the same line. The layout 2303 is arranged in a plurality of lines. The lines are wired in accordance with the given net list 2101 so that the block layout is created.

Each line has the common power line and ground line. If the power line is formed between the ground lines by using the CMOS logic per gate, the logic gate in which at least one of the area, the delay and the consumed power is small is arranged in the circuit using the CMOS logic to answer the purpose such as the superiority in area, the superiority in speed and the like. If the power line is formed between the ground lines by using the pass-transistor logic per gate, the logic gate in which at least one of the area, the delay and the consumed power is small is arranged in the circuit using the pass-transistor logic to answer the purpose such as the superiority in area, the superiority in speed and the like. Thus, the layout can be created. Consequently, the CMOS logic and the pass-transistor logic are selected in the high degree of freedom of design according to the required area, speed and consumed power so that the desired block layout can be created by using the automatic arrangement and wiring.

Sixth Embodiment

A sixth embodiment of the present invention will be described below with reference to the drawings.

The present embodiment provides a method in which a plurality of basic pass-transistor logic layout cells are used, each basic pass-transistor logic layout cell including four N-channel type MOS transistors, and are arranged and wired to form a composite pass-transistor logic layout cell and to prepare a CMOS logic layout cell comprising a P-channel type MOS transistor and an N-channel type MOS transistor, and the layout of a given logic circuit is created by using the composite pass-transistor logic layout cell and the CMOS logic layout cell.

Figure 21:
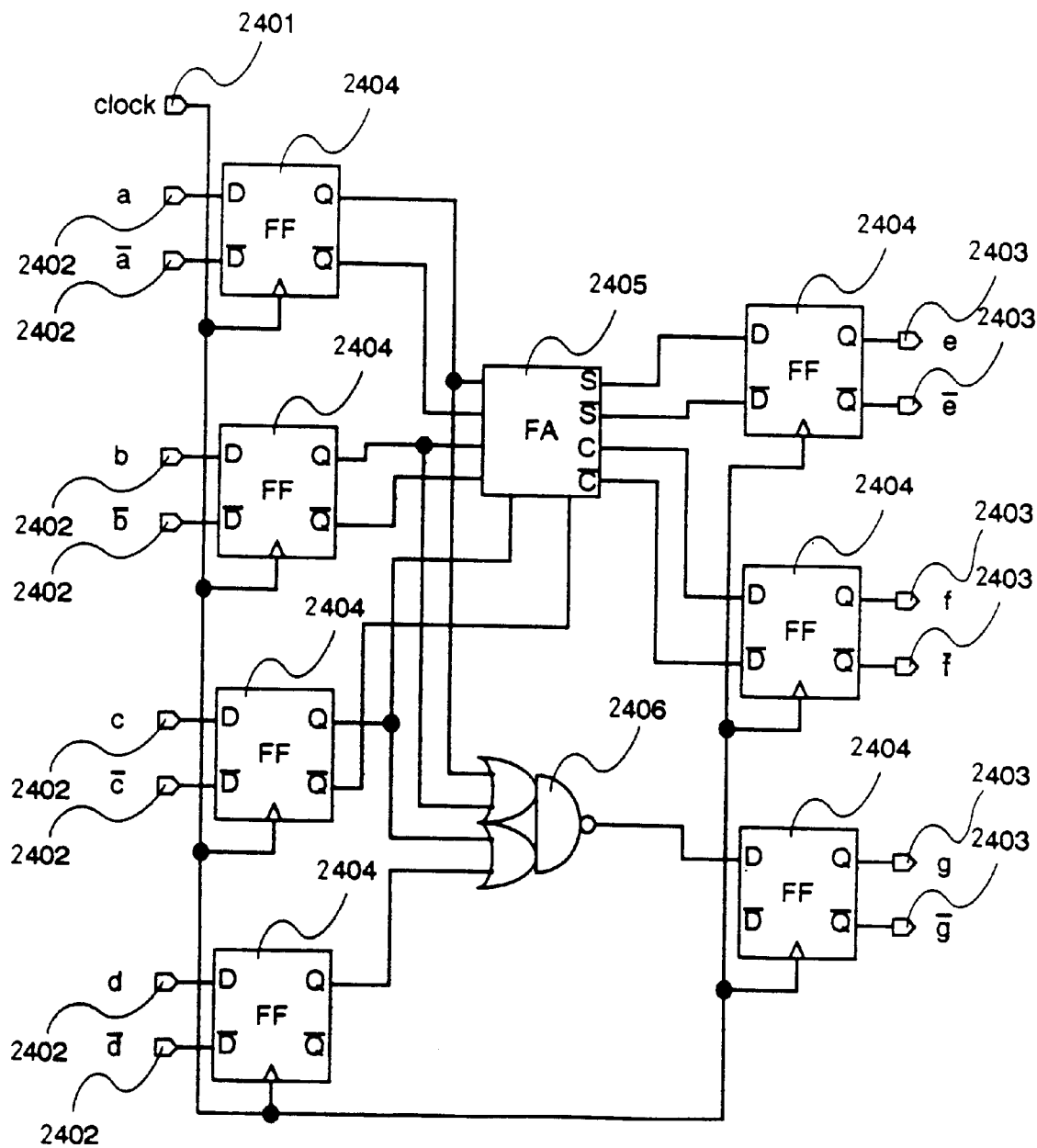
FIG. 21 is a diagram showing an example of a net list having the cell level of a logic circuit according to a sixth embodiment of the present invention.

FIG. 21 shows an example of a logic circuit which acts as an input. In FIG. 21, the reference numeral 2401 designates a clock input terminal, the reference numeral 2402 designates a signal input terminal, the reference numeral 2403 designates a signal output terminal, the reference numeral 2404 designates a flip-flop cell, the reference numeral 2405 designates a full adder cell, and the reference numeral 2406 designates a 4-input OR-and-inverter logic gate cell.

Figure 22:
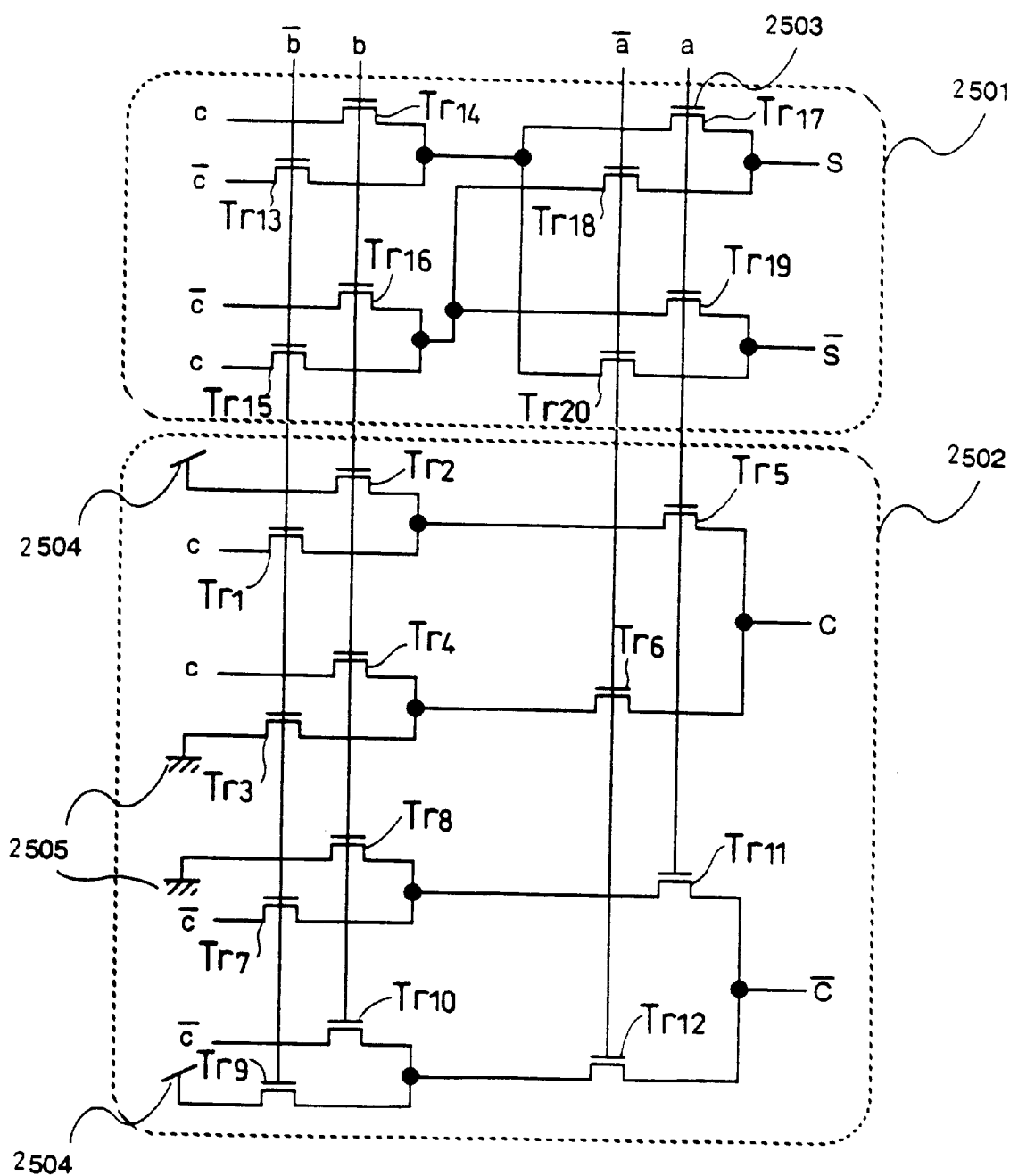
FIG. 22 is a diagram showing an example of a net list having the pass-transistor logic of a full adder according to the sixth embodiment of the present invention.
Figure 26:
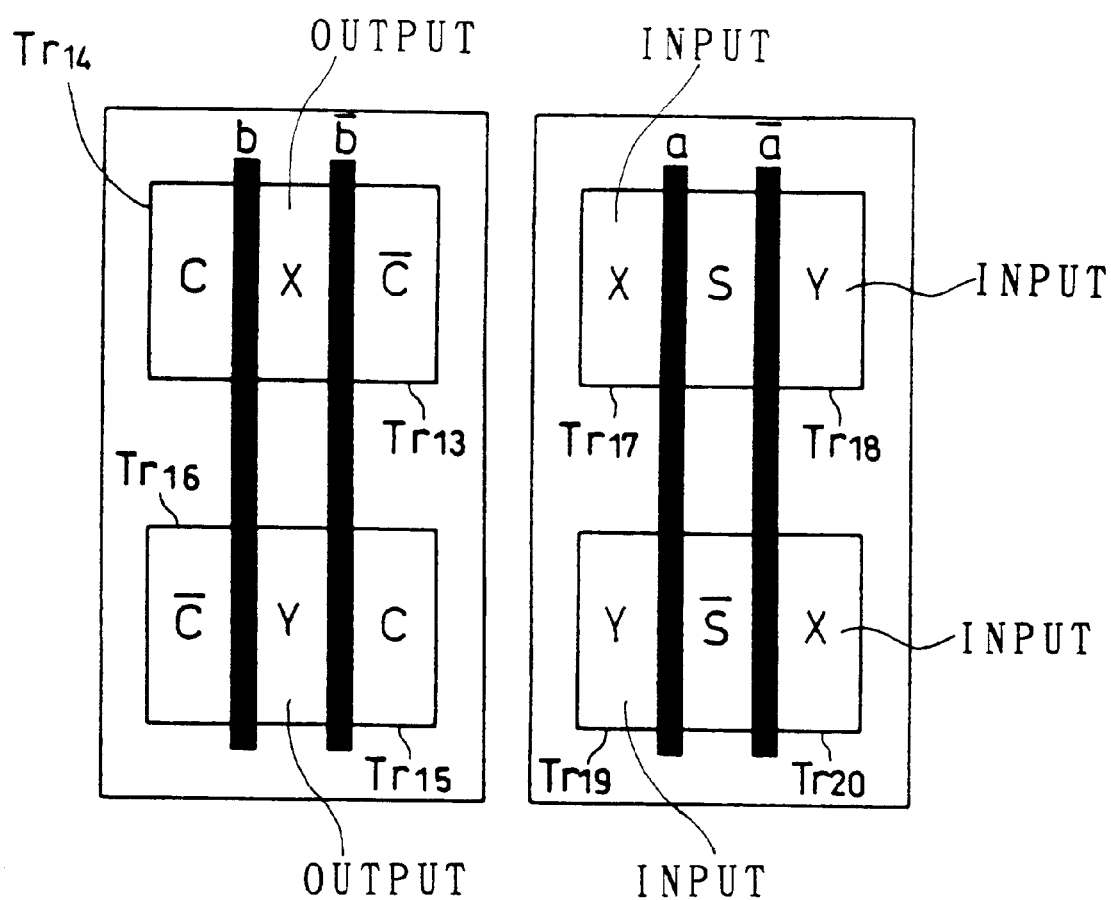
FIG. 26 is a diagram showing an example of the arrangement of the first layout cell in the case where the arithmetic circuit for addition in the full adder is formed according to the sixth embodiment of the present invention.

The flip-flop cell 2404 and the logic gate cell 2406 are implemented by using the CMOS logic layout cell. The full adder cell 2405 is implemented by using the pass-transistor logic layout cell which is formed by the N-channel type MOS transistor. FIG. 22 is a circuit diagram in which the full adder cell 2405 is implemented by using the pass-transistor logic. FIG. 26 is a circuit diagram in which the logic gate cell 2406 is implemented by using the CMOS logic.

FIG. 22 is a circuit diagram in which the full adder cell 2405 is implemented by using the pass-transistor logic which is formed by the N-channel type MOS transistor. In FIG. 22, the reference numeral 2501 designates an arithmetic circuit for addition in the full adder, and the reference numeral 2502 designates an arithmetic circuit for carry in the full adder. The reference numeral 2503 designates an N-channel type MOS transistor, the reference numeral 2504 designates a power input portion, and the reference numeral 2505 designates a ground input portion. As is apparent from FIG. 22, in the case where the logic of the full adder 2405 is created by a pass-transistor comprising the N-channel type MOS transistor, it can be implemented by 20 N-channel type MOS transistors Tr1 to Tr20. However, if the same logic is implemented by the CMOS logic, it is necessary to use 40 MOS transistors including N-channel type MOS transistors and P-channel type MOS transistors which are not shown.

An example of a layout cell which corresponds to the circuit diagram of FIG. 22 will be described below together with a method for forming the same layout cell with reference to FIGS. 23 to 30.

Figure 23:
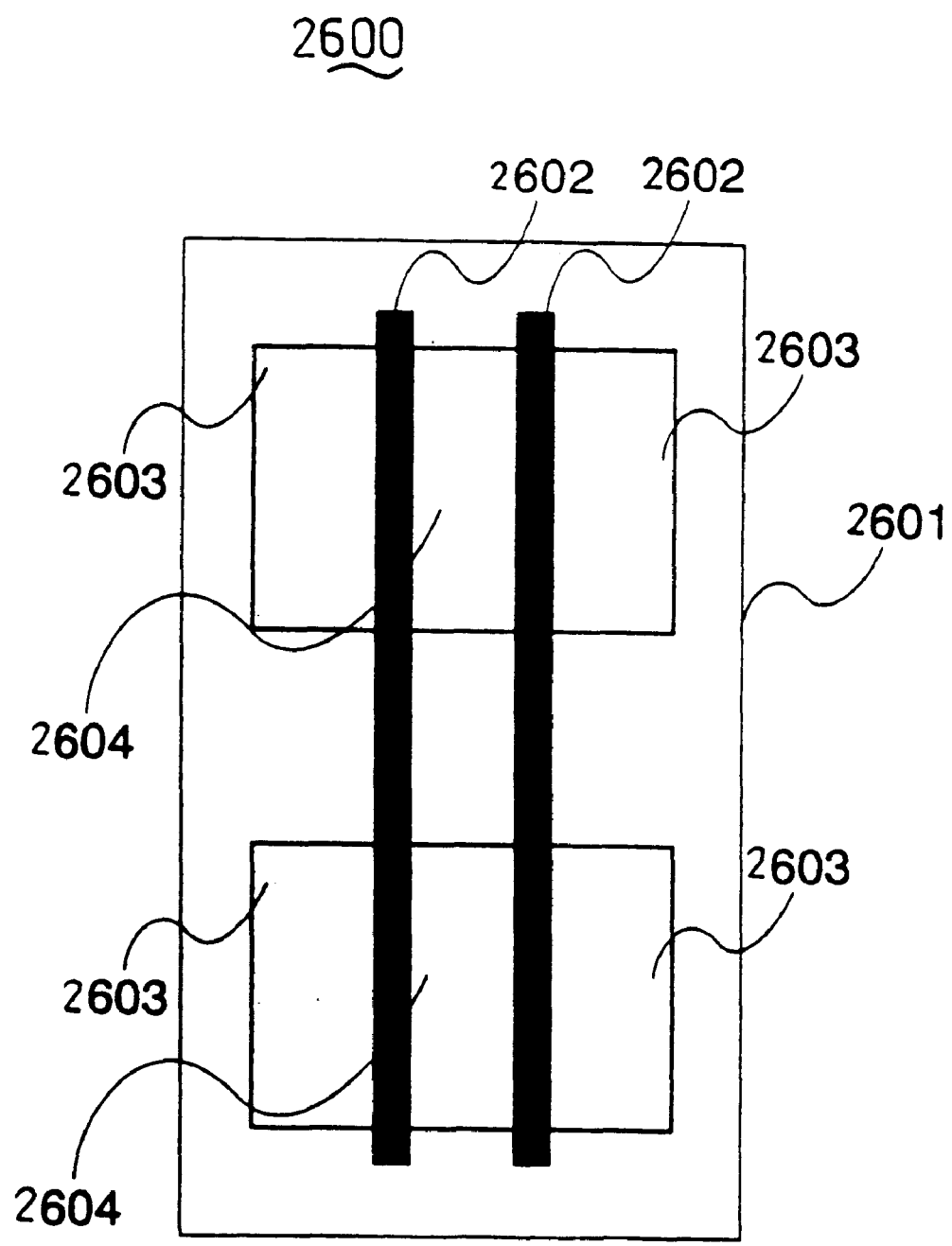
FIG. 23 is a diagram showing an example of a first layout cell according to the sixth embodiment of the present invention.

FIG. 23 shows an example of a basic pass-transistor logic layout cell 2600 that is formed by four N-channel type MOS transistors having two pairs of two N-channel type MOS transistors whose sources are connected to each other. In FIG. 23, the reference numeral 2601 designates an outer frame of the cell, the reference numeral 2602 designates a gate, the reference numeral 2603 designates a drain, and the reference numeral 2604 designates a source, which are shared by the two N-channel type MOS transistors.

Figure 25:
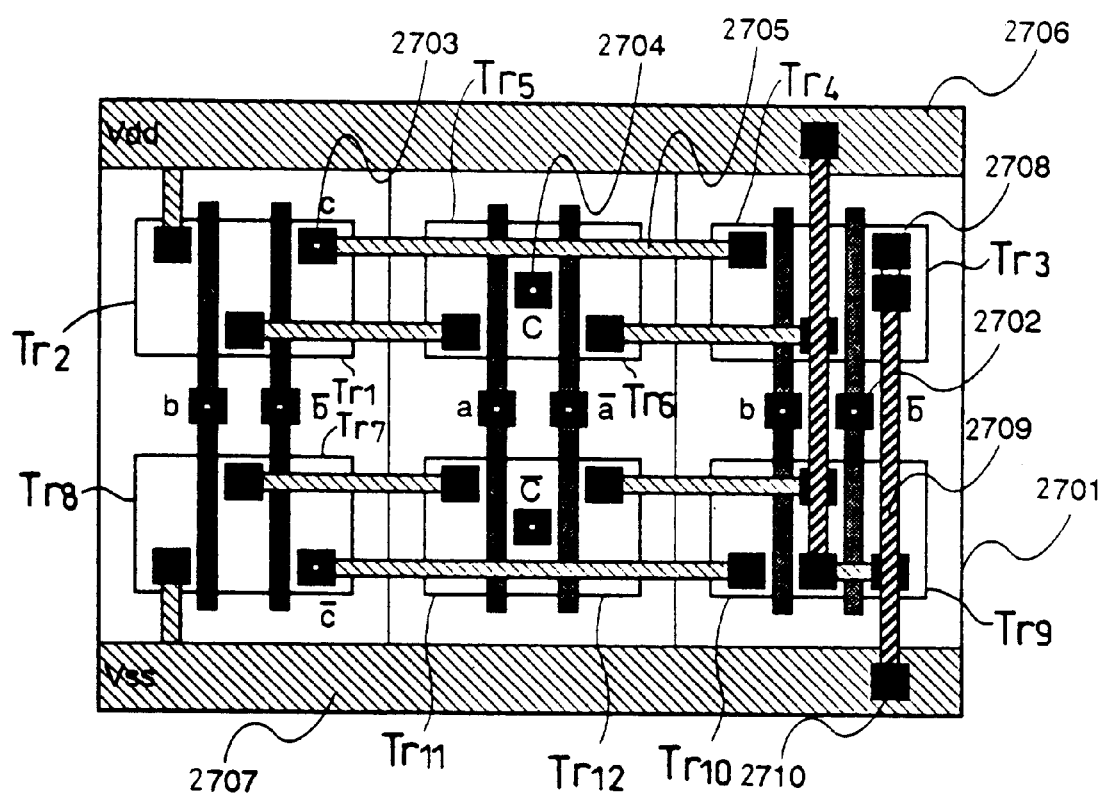
FIG. 25 is a diagram showing an example of a layout cell corresponding to a carry arithmetic circuit of the full adder according to the sixth embodiment of the present invention.
Figure 27:
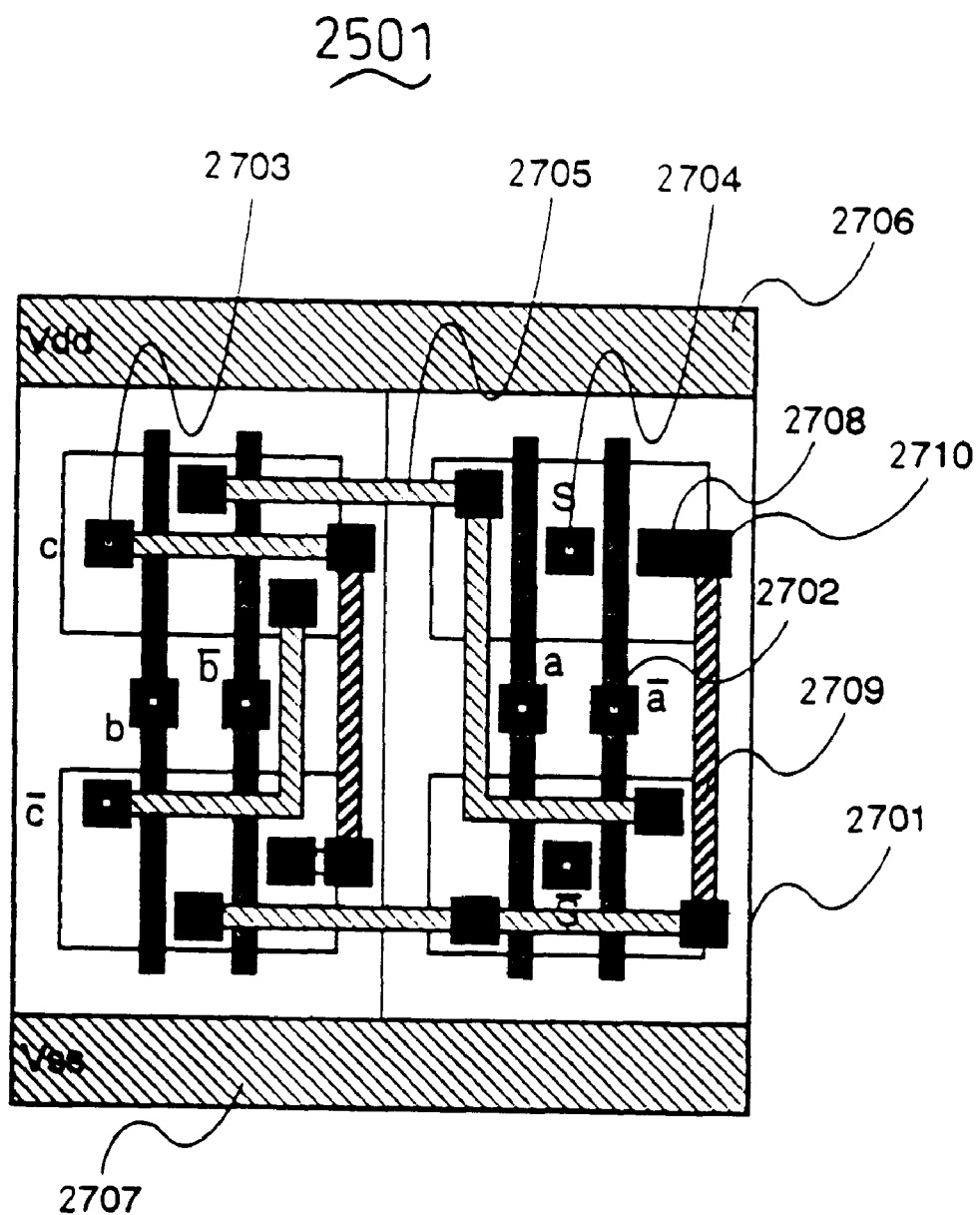
FIG. 27 is a diagram showing an example of a layout cell corresponding to the arithmetic circuit for addition in the full adder according to the sixth embodiment of the present invention.

FIG. 25 shows a layout cell (composite pass-transistor logic layout cell) in which the arithmetic circuit 2502 for carry in the full adder is formed by using the basic pass-transistor logic layout cell 2600 shown in FIG. 23. FIG. 27 shows a layout cell (composite pass-transistor logic layout cell) in which the arithmetic circuit 2501 for addition in the full adder is formed by using the basic pass-transistor logic layout cell 2600.

Figure 24:
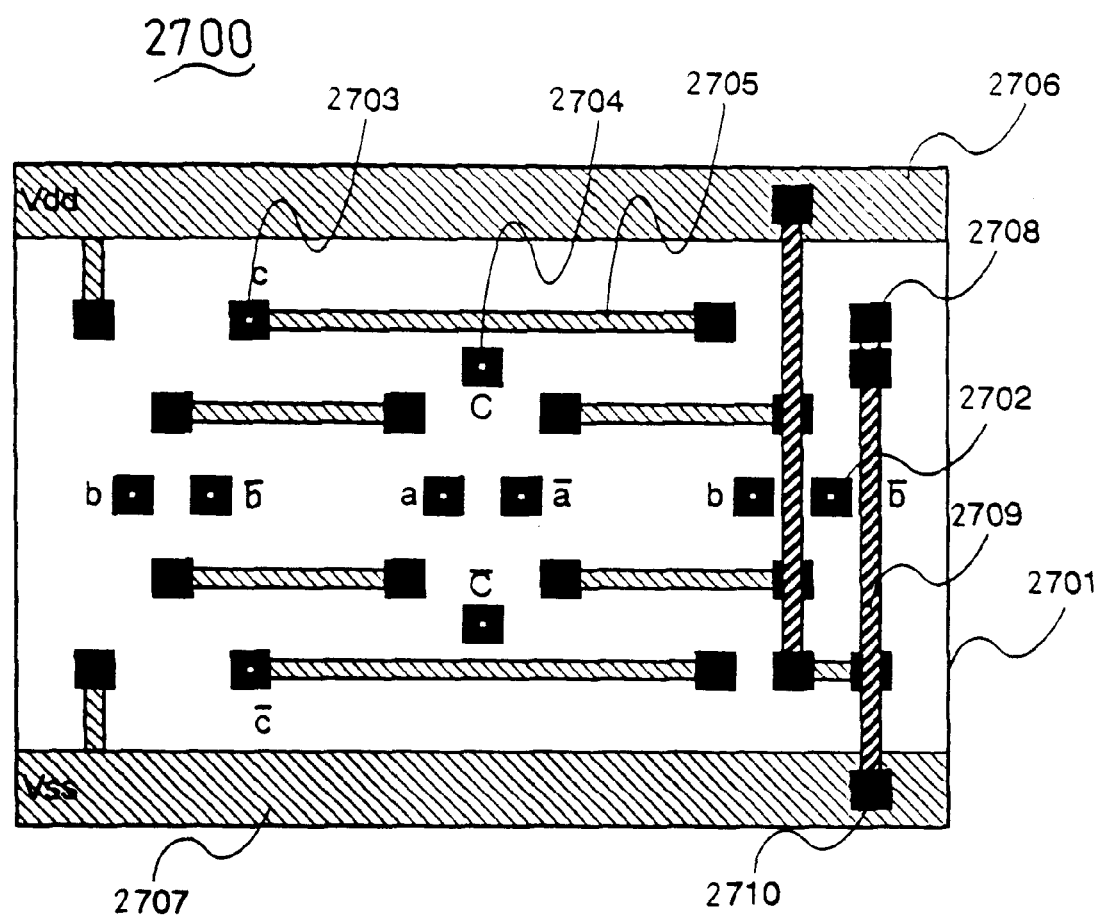
FIG. 24 is a diagram showing an example of a wiring pattern layout cell according to the sixth embodiment of the present invention.

A method for forming a layout cell which corresponds to the arithmetic circuit 2502 for carry in the full adder shown in FIG. 25 will be described below. First of all, three basic pass-transistor logic layout cells 2600 shown in FIG. 23 are arranged horizontally. Then, a wiring pattern layout cell 2700 which is prepared in advance as shown in FIG. 24 is superposed on the basic pass-transistor logic layout cells 2600. Thus, the arithmetic circuit 2502 (composite pass-transistor logic layout cell) for carry shown in FIG. 25 is completed.

In the wiring pattern layout cell 2700 shown in FIG. 24, the reference numeral 2701 designates a cell outer frame, the reference numeral 2702 designates a gate input terminal, the reference numeral 2703 designates a drain input terminal, the reference numeral 2704 designates a source output terminal, the reference numeral 2705 designates a first wiring layer, the reference numeral 2706 designates a power wiring layer, the reference numeral 2707 designates a ground wiring layer, the reference numeral 2708 designates a contact layer from a diffusion layer to the first wiring layer, the reference numeral 2709 designates a second wiring layer, and the reference numeral 2710 designates a contact layer from the first wiring layer to the second wiring layer.

FIG. 27 is a layout cell (composite pass-transistor logic layout cell) that corresponds to the arithmetic circuit 2501 for addition in the full adder, which is formed by horizontally arranging two basic pass-transistor logic layout cells shown in FIG. 23. In this case, the basic pass-transistor logic layout cell shown in FIG. 23 has a common source 2604 set to outputs X, Y, S and /S, and a drain 2603 set to inputs c, /c, X and Y as shown in FIG. 26.

Figure 30:
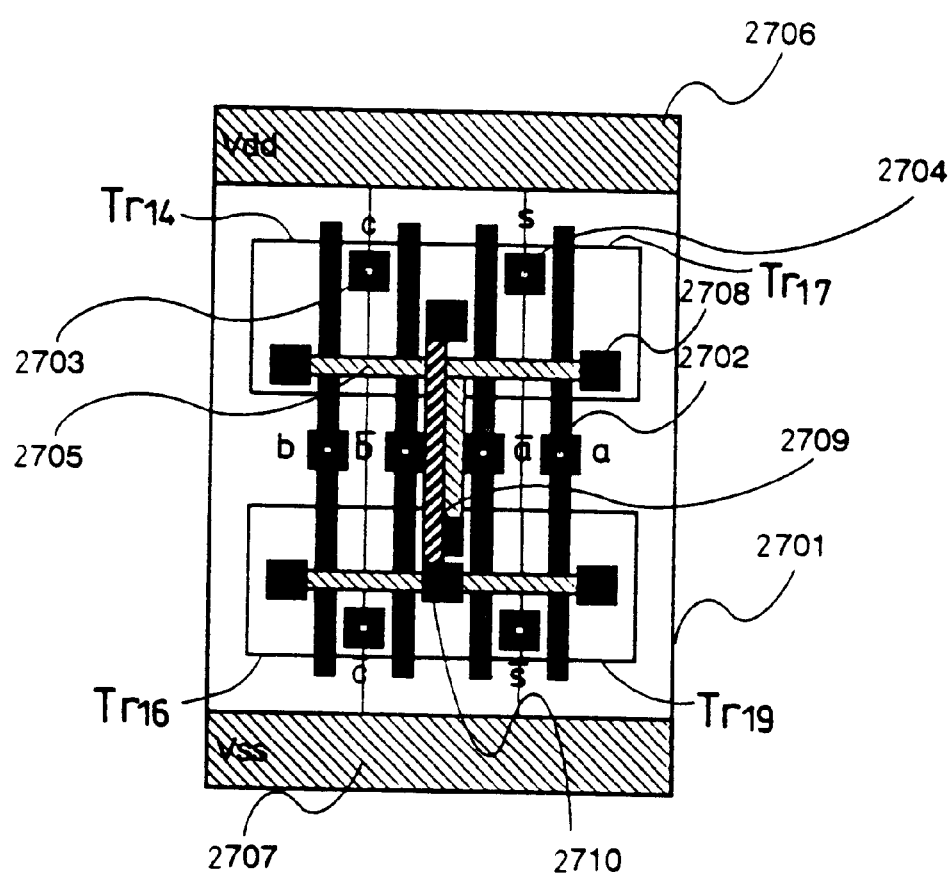
FIG. 30 is a diagram showing an example of another layout cell corresponding to the arithmetic circuit for addition in the full adder according to the sixth embodiment of the present invention.

FIG. 30 shows a layout cell (composite pass-transistor logic layout cell) which corresponds to the arithmetic circuit 2501 for addition in the full adder. This layout cell has the arrangement which is different from that of the layout cell shown in FIG. 27.

Figure 28:
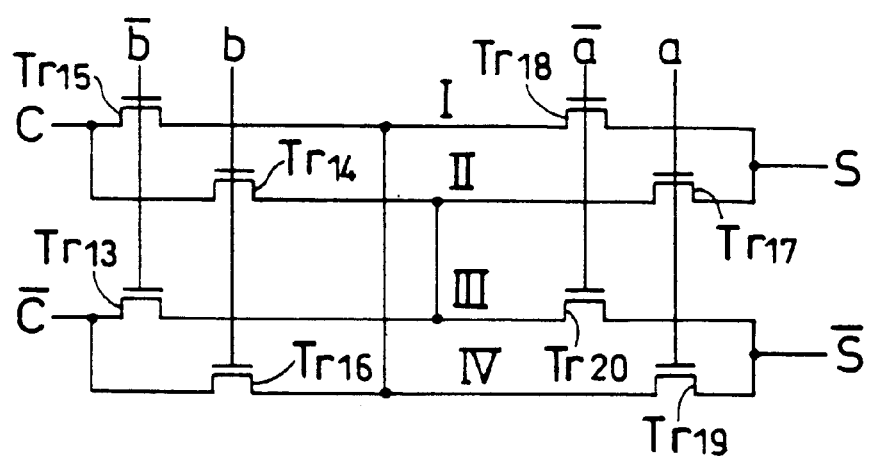
FIG. 28 is a diagram showing an example of another net list of the arithmetic circuit for addition in the full adder according to the sixth embodiment of the present invention.
Figure 29A:
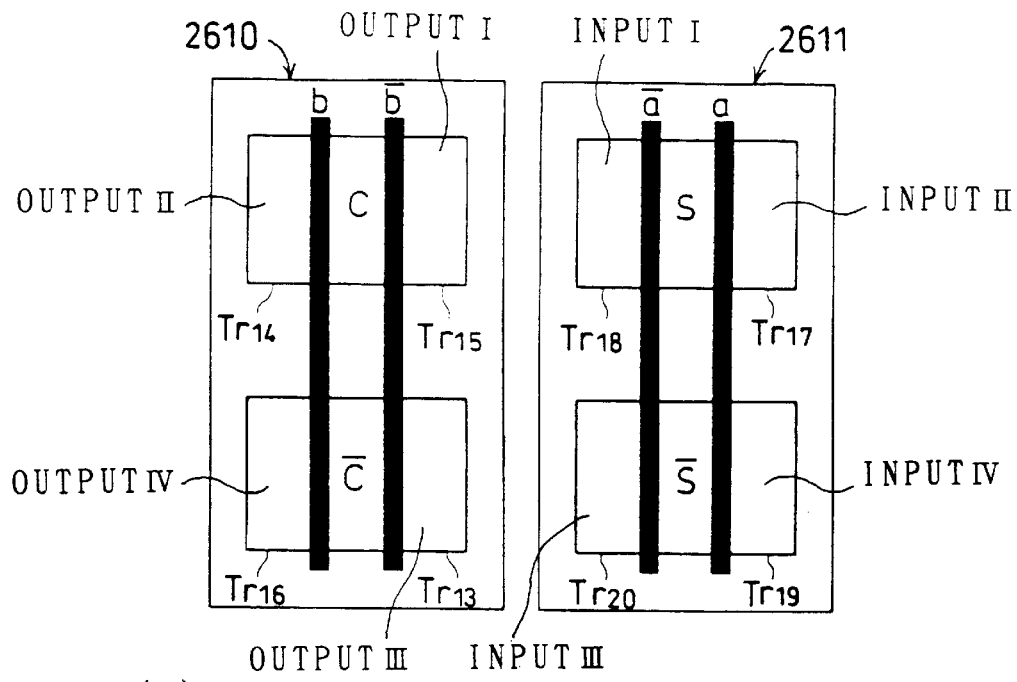
FIG. 29(a) is a diagram showing two basic pass-transistor logic layout cells which form the first layout cell in the case where the arithmetic circuit for addition in the full adder is formed according to the sixth embodiment of the present invention.
Figure 29B:
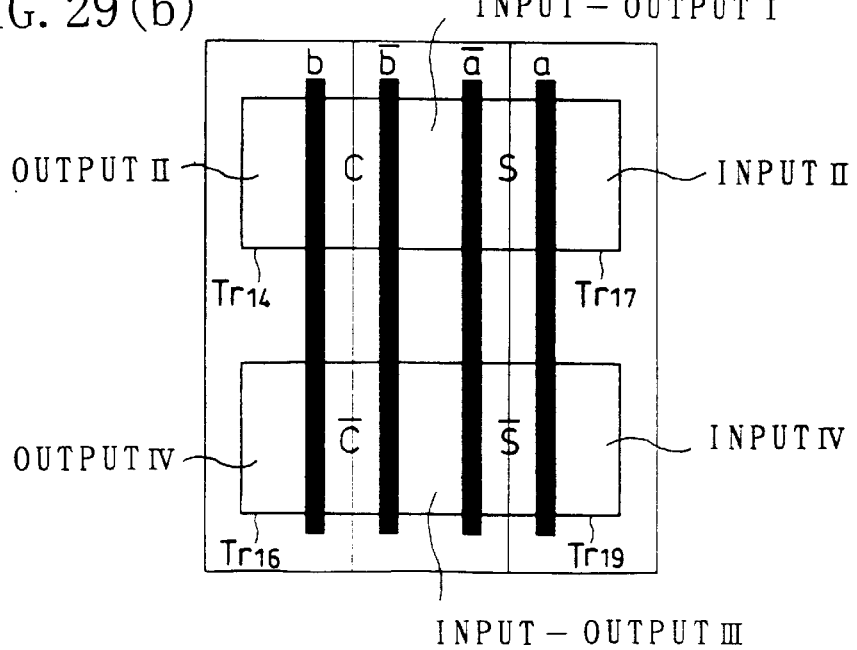

The layout cell shown in FIG. 30 is formed in the following manner. The wiring of the arithmetic circuit 2501 for addition in the full adder shown in FIG. 22 is converted as shown in FIG. 28. Based on the wiring, the common source 2604 is set to the outputs S and /S and the drain 2603 is set to inputs I, II, III and IV for the basic pass-transistor logic layout cell (exclusive-OR) 2611 provided on the right side as shown in FIG. 29(a) in the same manner as in FIG. 26, and the common source 2604 is set to the inputs c and /c and the drain 2603 is set to the outputs I, II, III and IV for the basic pass-transistor logic layout cell (the logic other than the exclusive-OR) 2610 provided on the left side as shown in FIG. 29(a). According to this setting method, the outputs I and II of the basic pass-transistor logic layout cell provided on the left side are adjacent to the inputs I and II of the basic pass-transistor logic layout cell provided on the right side for inputting the outputs I and II. For this reason, the drain portions of the layout cells on the right and left sides are shared as shown in FIG. 29(a), and both layout cells are wired. Accordingly, the drain portion is shared so that the area of the layout cell can be reduced.

Figure 31:
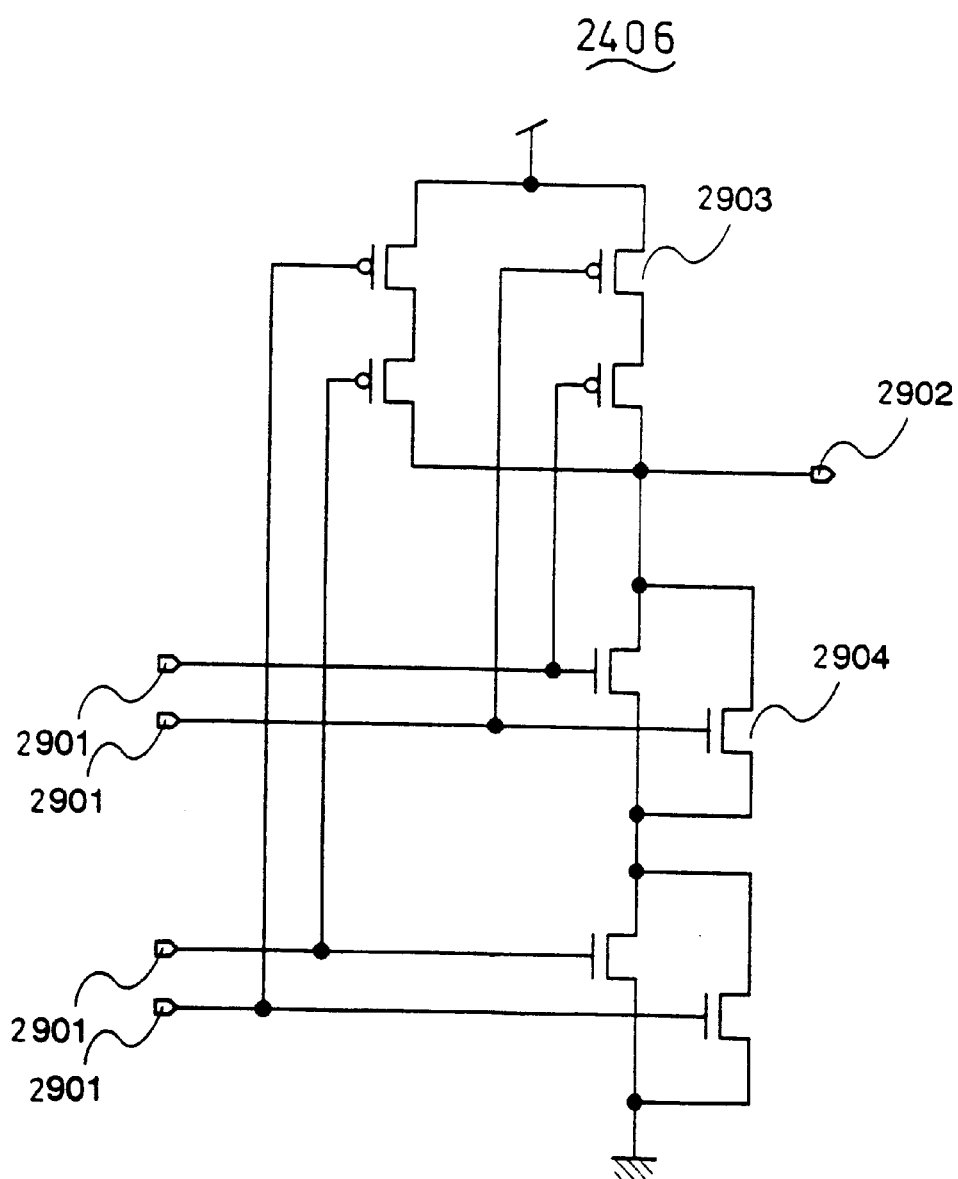
FIG. 31 is a diagram showing a circuit having the transistor level in which the OR and inverter logic is described by the CMOS logic according to the sixth embodiment of the present invention.

FIG. 31 is a diagram showing a circuit having the transistor level in which the 4-input OR-and-inverter logic gate cell 2406 shown in FIG. 21 is described by the CMOS logic. In FIG. 31, the reference numeral 2901 designates an input terminal, the reference numeral 2902 designates an output terminal, the reference numeral 2903 designates a P-channel type MOS transistor, and the reference numeral 2904 designates an N-channel type MOS transistor. As is apparent from FIG. 31, if the OR-and-inverter logic gate 2406 should be implemented by using the CMOS logic, eight MOS transistors are required. However, if the same logic should be implemented by using the pass-transistor logic comprising the N-channel type MOS transistor, it is necessary to provide more transistors than in the case where the same logic is implemented by using the CMOS logic, that is, 28 transistors.

Figure 32:
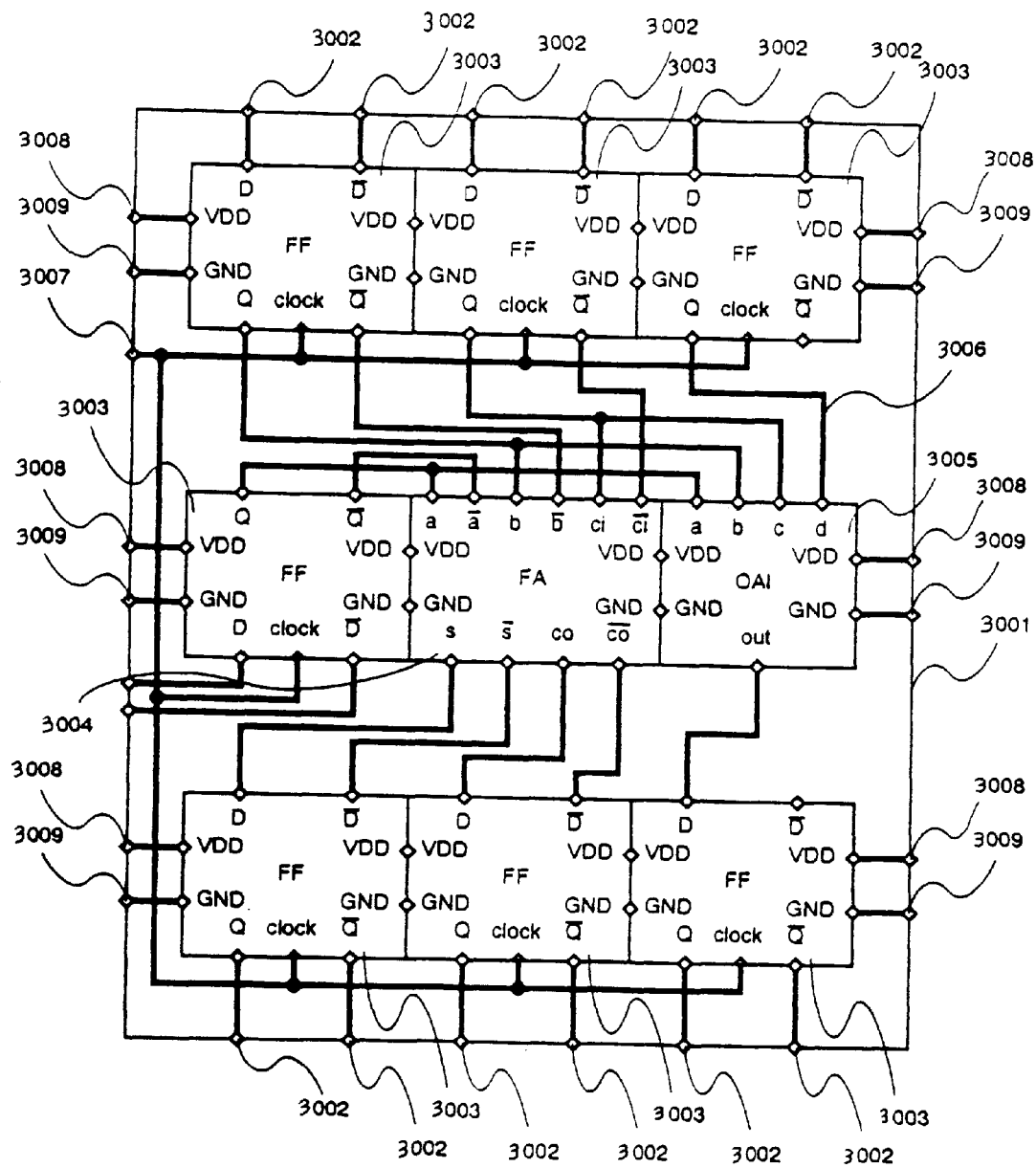
FIG. 32 is a diagram showing an example of a block layout according to the sixth embodiment of the present invention.

FIG. 32 shows an example of a layout in which the logic circuit shown in FIG. 21 is implemented by using the composite pass-transistor logic layout cell and the CMOS logic layout cell.

In FIG. 32, the reference numeral 3001 designates a block outer frame, the reference numeral 3002 designates an outer terminal, the reference numeral 3003 designates a layout cell which corresponds to the flip-flop 2404, the reference numeral 3004 designates a layout cell which corresponds to the full adder 2405, the reference numeral 3005 designates a layout cell which corresponds to the logic gate 2406, the reference numeral 3006 designates a wiring which connects terminals, the reference numeral 3007 designates a clock signal input terminal, the reference numeral 3008 designates a power terminal, and the reference numeral 3009 designates a ground terminal. The layout cell 3003 which corresponds to the flip-flop 2404 and the layout cell 3005 which corresponds to the logic gate 2406 are formed by a CMOS logic layout cell. The full adder 3004 is formed by the pass-transistor logic layout cell using the N-channel type MOS transistor.

According to the present embodiment described above, each logic portion is implemented by using the CMOS logic layout cell or the pass-transistor logic layout cell which is optimum, and is combined for use so that a layout which is more compact can be created. In addition, it is possible to form a composite pass-transistor logic layout cell by superposing a wiring pattern layout cell on the basic pass-transistor logic layout cell comprising the N-channel type MOS transistor.

In the basic pass-transistor logic layout cell, furthermore, an output portion is arranged on the outside to perform wiring so that the diffusion layer can be shared to form a layout cell having the smaller area.

Seventh Embodiment

A seventh embodiment of the present invention will be described below with reference to the drawings.

Figure 33:
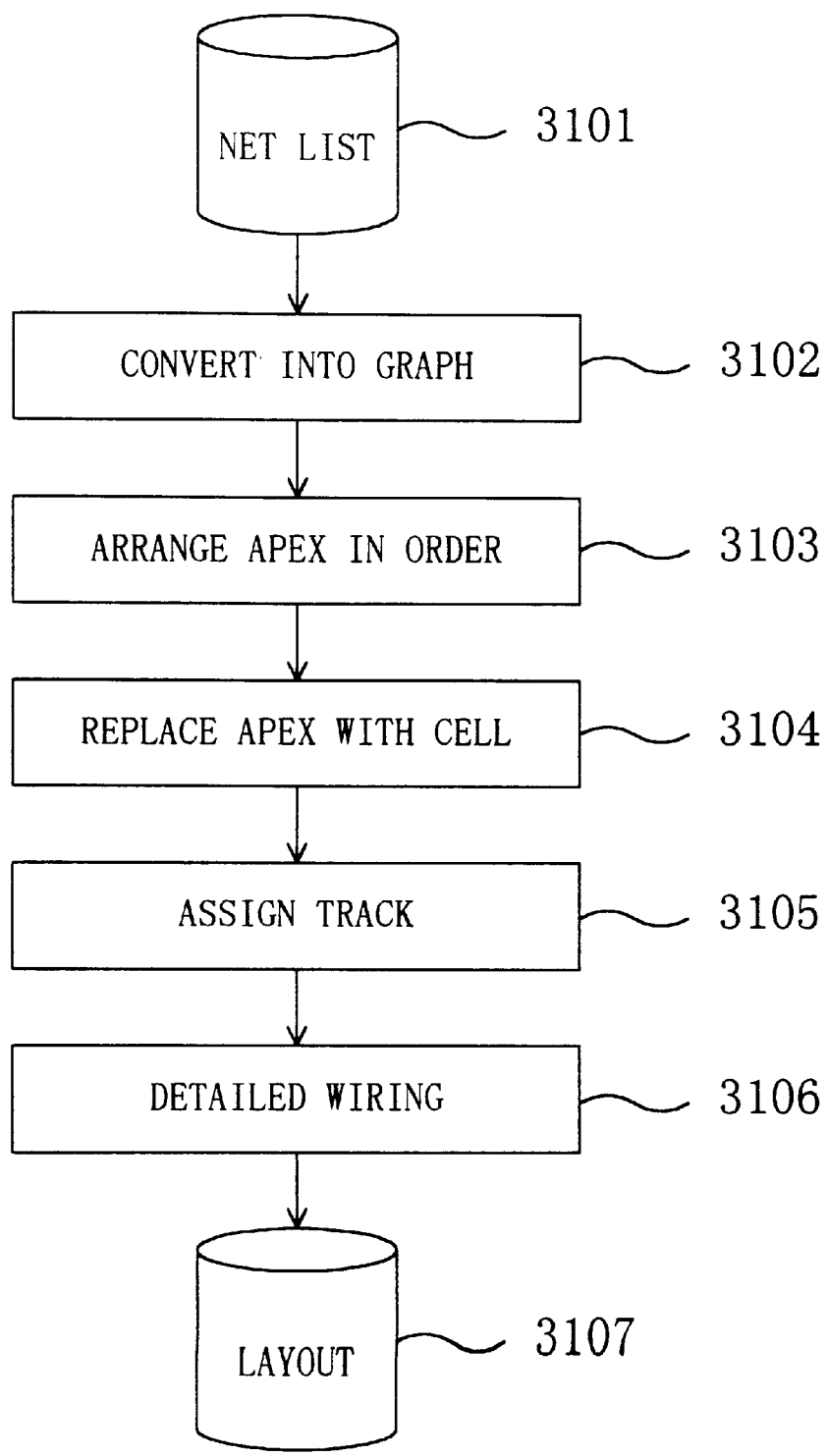
FIG. 33 is a system flowchart showing the flow of a layout designing method according to a seventh embodiment of the present invention.

FIG. 33 is a system flowchart showing the flow of a method for automatically generating a completed layout cell in which the predetermined logic is implemented by using a unit pass-transistor logic layout cell comprising an N-channel type MOS transistor.

In FIG. 33, the reference numeral 3101 designates a net list having the transistor level to be input, the reference numeral 3102 designates a processing for converting the input net list into a graph, the reference numeral 3103 designates a processing for arranging the apex of the graph in order, the reference numeral 3104 designates a processing for replacing the apex with a layout cell, the reference numeral 3105 designates a processing for assigning a wiring to a track, the reference numeral 3106 designates a processing for performing the wiring, and the reference numeral 3107 designates layout data to be generated.

The processing for the method for automatically generating a layout cell according to the present embodiment will be described below in detail in accordance with the flow shown in FIG. 33 by using examples of FIGS. 34, 35 and 36.

Figure 34:
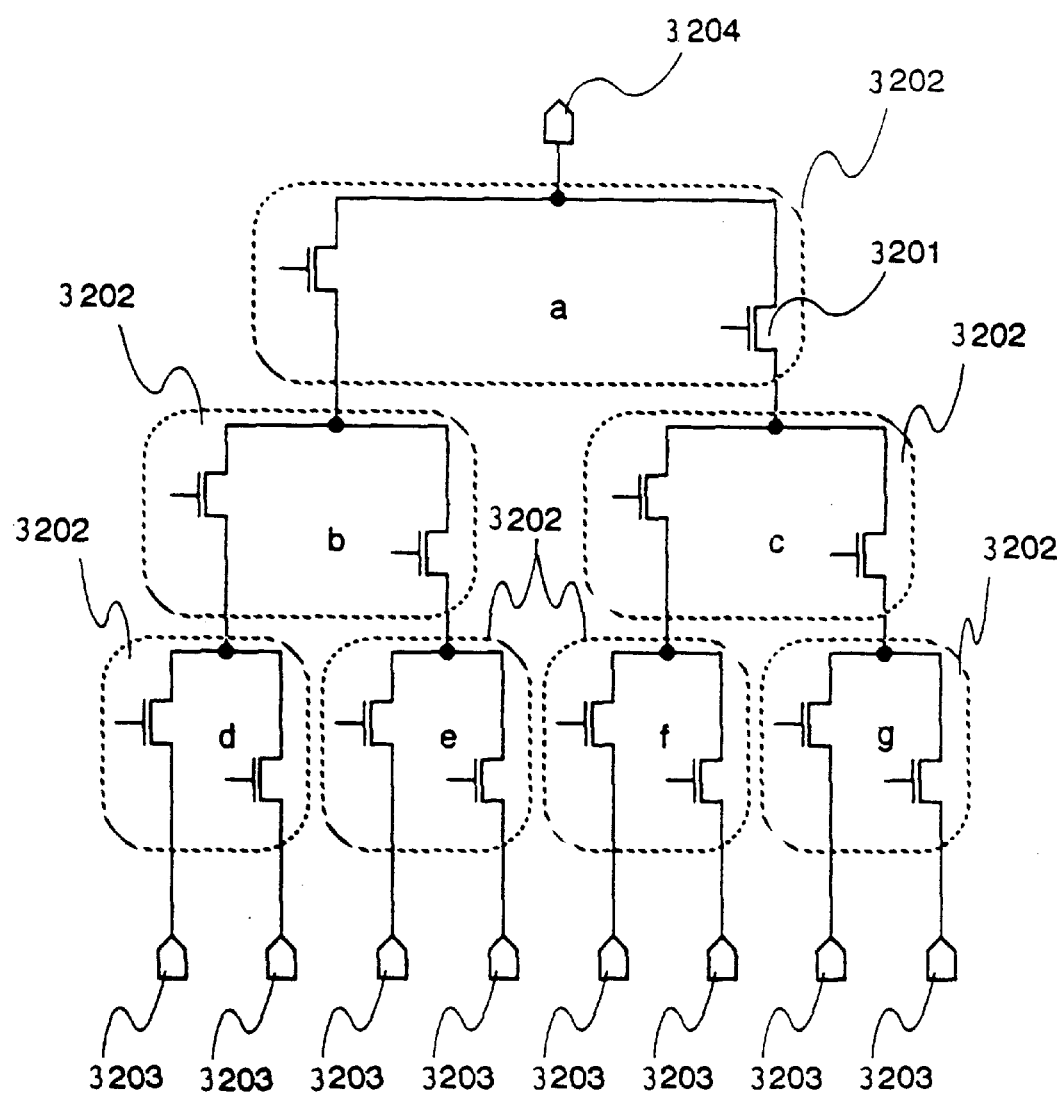
FIG. 34 is a diagram showing an example of a net list using the pass transistor logic according to the seventh embodiment of the present invention.

FIG. 34 shows an example of a circuit using the pass-transistor logic comprising an N-channel type MOS transistor which acts as an input. In FIG. 34, the reference numeral 3201 designates the N-channel type MOS transistor, the reference numeral 3202 designates a pair of transistors comprising two N-channel type MOS transistors which form a unit layout cell and have respective sources connected to each other, the reference numeral 3203 designates an input terminal, and the reference numeral 3204 designates an output terminal. The processing will be described below by using the data as an input example.

In the processing 3102, each N-channel type MOS transistor pair 3202 of the input net list acts as an apex. The connecting relationship between the apexes is caused to correspond to a branch to make a graph.

Figure 35:
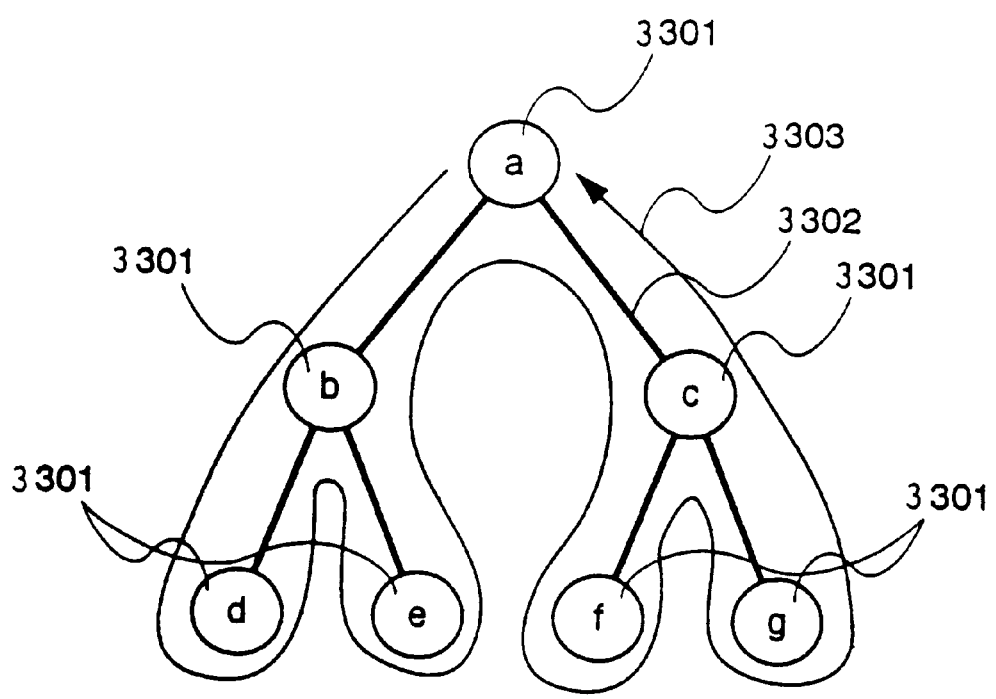
FIG. 35 is a diagram showing an example of a graph made based on the net list using the pass-transistor logic according to the seventh embodiment of the present invention.

FIG. 35 is a graph which corresponds to the net list shown in FIG. 34. In FIG. 35, the reference numeral 3301 designates an apex which corresponds to the transistor pair 3202 including two N-channel type MOS transistors whose sources are connected to each other, the reference numeral 3302 designates a branch which represents the connecting relationship of the transistor pair 3202, and the reference numeral 3303 designates the sequence of the apexes to be retrieved during the arrangement thereof in order. In this sequence of retrieval, the apexes are arranged in order of d, b, e, a, f, c and g. This order is characterized in that the descendant of each apex always branches off to the right and the left. Accordingly, inputs to two drain terminals of each transistor pair which corresponds to the apex can be wired by the same track. The alphabet of the apex shown in FIG. 35 corresponds to the alphabet affixed to the transistor pair 3202 shown in FIG. 34.

The apexes are arranged in order in the processing 3103. Then, each apex is replaced with a cell in the processing 3104. Thereafter, each wiring is assigned to a wiring track in the processing 3105. This processing may be a method such as a left edge algorithm or a non-deterministic method such as simulated annealing. Finally, detailed wiring is performed in the processing 3106. Thus, layout data 3107 is created.

Figure 36:
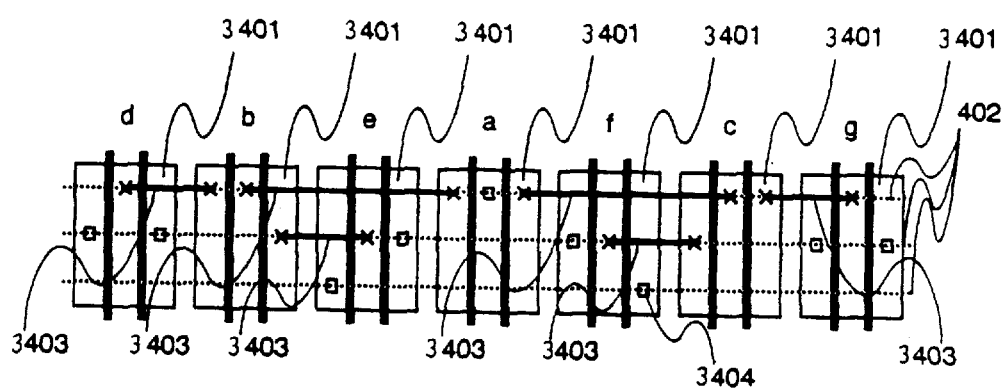
FIG. 36 is a diagram showing an example of a block layout according to the seventh embodiment of the present invention.

FIG. 36 is a layout diagram which corresponds to the circuit diagram of FIG. 34. In FIG. 36, the reference numeral 3401 designates a layout cell which corresponds to each apex, the reference numeral 3402 designates a wiring track, the reference numeral 3403 designates a wiring, and the reference numeral 3404 designates a terminal. The alphabet affixed to a transistor pair shown in FIG. 36 is the alphabet affixed to the transistor pair 3202 shown in FIG. 34 and the alphabet affixed to the apex 3301 shown in FIG. 35.

According to the present embodiment described above, it is possible to automatically generate a completed layout cell which implements a circuit using the pass-transistor logic by a unit layout cell comprising the N-channel type MOS transistor. In addition, in the case where each unit layout cell is arranged in one dimension, the number of wiring tracks can be decreased.

Figure 43:
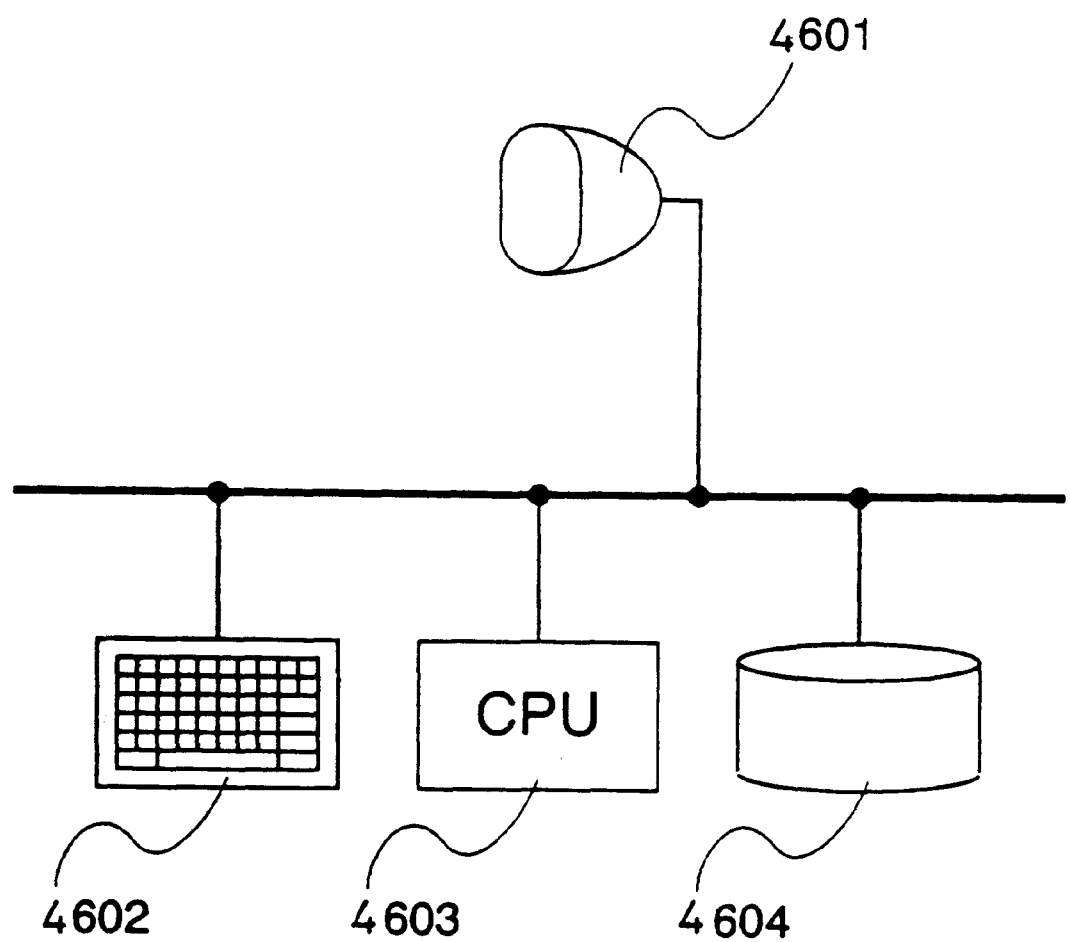
FIG. 43 is a diagram showing the hardware configuration which implements a method for designing a semiconductor integrated circuit according to the present invention.

The first to seventh embodiments described above can be realized by a hardware structure shown in FIG. 43. In FIG. 43, the reference numeral 4601 designates a display unit, the reference numeral 4602 designates a keyboard for input, the reference numeral 4603 designates a central processing unit, and the reference numeral 4604 designates a memory in which each information is stored.

Eighth Embodiment

An eighth embodiment of the present invention will be described below with reference to the drawings.

Figure 37:
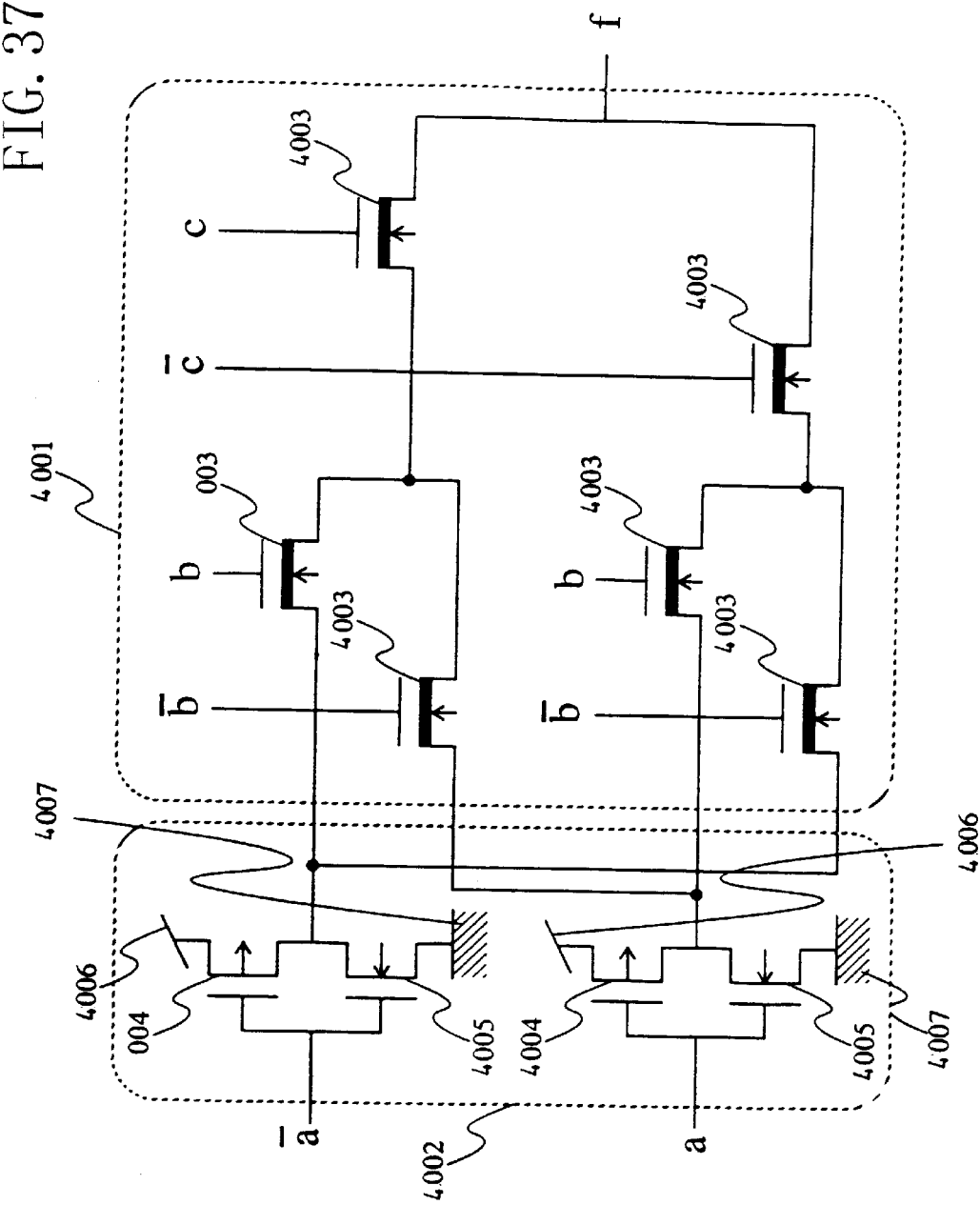
FIG. 37 is a diagram showing the partial circuit of a semiconductor integrated circuit according to an eighth embodiment of the present invention.

FIG. 37 shows an example of a semiconductor integrated circuit having a circuit using the CMOS logic and a circuit using the pass-transistor logic.

In FIG. 37, the reference numeral 4001 designates an adder using the pass-transistor logic, and the reference numeral 4002 designates an inverter using the CMOS logic. The circuit 4001 using the pass-transistor logic is formed by an N-channel type MOS transistor 4003 having a low threshold voltage (for example, 0.1 V).

The reference numeral 4005 designates an N-channel type MOS transistor having a higher threshold voltage (for example, 0.7 V) than that of the N-channel type MOS transistor 4003, and the reference numeral 4004 designates a P-channel type MOS transistor having a threshold voltage which is almost equal to that of the N-channel type MOS transistor 4005. The reference numeral 4006 designates a constant voltage source for a predetermined voltage (for example, 3.3V) having the signal value Hi, and the reference numeral 4007 designates a reference voltage source having the signal value Lo. They form the CMOS inverter circuit 4002 together with the N-channel type MOS transistors 4004 and 4005 having high threshold voltages.

The input of the circuit 4001 using the pass-transistor logic is the output of the CMOS inverter circuit 4002, and is changed from the potential of the signal value Lo to that of the signal value Hi. The circuit 4001 using the pass-transistor logic utilizes the N-channel type MOS transistor. Consequently, the output potential is equal to the signal value Lo if the signal value Lo is output, and it is decreased by the threshold voltage of the N-channel type MOS transistor if the signal value Hi is output. Accordingly, the signal value Hi is degraded. If a degradation in the output signal is great, a circuit on the stage next to the circuit using the pass-transistor logic cannot recognize the signal value Hi.

According to the present embodiment, the N-channel type MOS transistor having a low threshold voltage is utilized for the circuit using the pass-transistor logic. Consequently, a degradation in the signal can be suppressed even though the signal value Hi is output. Accordingly, it is possible to omit a circuit for signal amplification between the circuit using the pass-transistor logic and the circuit on the next stage, or to increase the number of stages of a pass-transistor in the long pass-transistor logic so that the number of circuits for signal amplification can be decreased.

The case where the P-channel type MOS transistor is utilized for the circuit using the pass-transistor logic will be described below. When the signal value Hi is output, the output potential has the signal value Hi. When the signal value Lo is output, the output potential is increased by the threshold voltage of the P-channel type MOS transistor because of the characteristics of the P-channel type MOS transistor so that the signal value Lo is degraded. However, if the P-channel type MOS transistor having a low threshold voltage is utilized as the circuit using the pass-transistor logic, a degradation in the signal can be suppressed in the same manner.

Ninth Embodiment

A ninth embodiment of the present invention will be described below with reference to the drawings.

Figure 38:
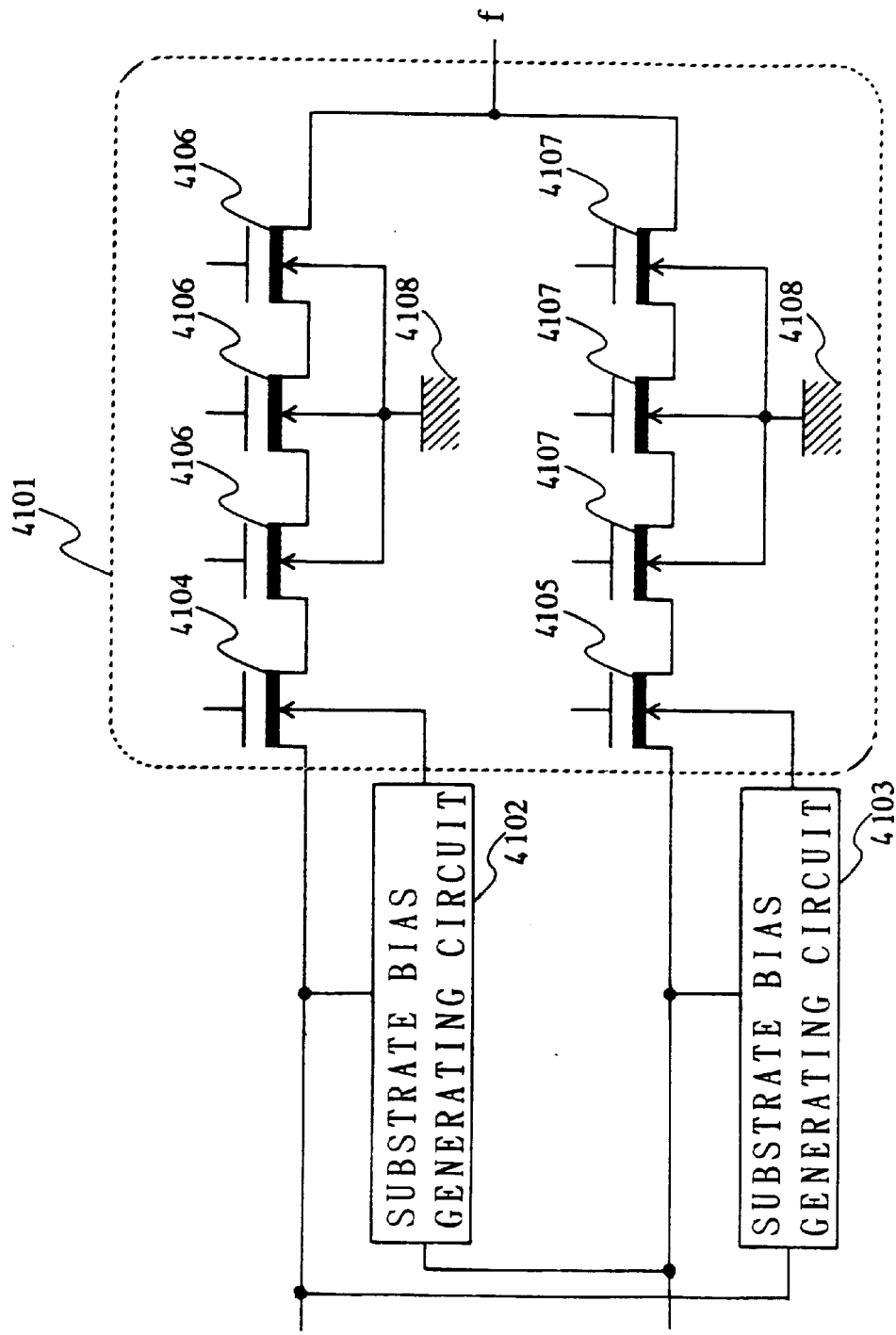
FIG. 38 is a diagram showing the partial circuit of a semiconductor integrated circuit according to a ninth embodiment of the present invention.

In FIG. 38, the reference numeral 4101 designates a partial circuit using the pass-transistor logic. The circuit 4101 using the pass-transistor logic comprises N-channel type MOS transistors 4104, 4105, 4106 and 4107 having low threshold voltages. The reference numeral 4108 designates a reference voltage source having the signal value Lo.

The reference numerals 4102 and 4103 designate substrate bias generating circuits (substrate bias control circuits) which change the potentials of the substrates of MOS transistors, that is, of the N-channel type MOS transistors 4104 and 4105 having low threshold voltages based on the value of an external input signal a of the circuit 4101 using the pass-transistor logic and the value of a signal/a which is obtained by inverting the input signal a, in which the signals a and/a act as drain inputs.

The substrate bias generating circuit 4102 controls the potential of the substrate of the N-channel type MOS transistor 4104 having a low threshold voltage. If the input signal a has the value Hi and the inverted signal/a has the value Lo, a voltage having the signal value Lo is applied to the substrate of the transistor 4104. If the input signal a has the value Lo and the inverted signal/a has the value Hi, the substrate bias generating circuit 4102 applies, to the substrate of the transistor 4104, a voltage in such a manner that the threshold voltage is increased, that is, a voltage which is lower than the signal value Lo.

If the input signal/a has the signal value Hi and the inverted signal a has the signal value Lo, the substrate bias generating circuit 4103 applies a voltage having the signal value Lo to the substrate of the N-channel type MOS transistor 4105 having a low threshold voltage. If the input signal/a has the signal value Lo and the inverted signal a has the signal value Hi, the substrate bias generating circuit 4103 applies, to the substrate of the N-channel type MOS transistor 4105, a voltage in such a manner that the threshold voltage is increased, that is, a voltage which is lower than the signal value Lo.

In the case where a signal having the value Lo is input to the input a of the circuit 4101 using the pass-transistor logic and a signal having the value Hi is input to the input/a, the node of the input a is electrically connected to a reference S voltage source having the signal value Lo and the node of the input/a is electrically connected to a constant voltage source having the signal value Hi. In this case, the N-channel type MOS transistors 4104, 4105, 4106 and 4107 of the circuit 4101 using the pass-transistor logic have low threshold voltages. Consequently, a lot of leakage current flows. More specifically, the leakage current flows from the constant voltage source having the signal value Hi which is electrically connected to the input/a to the reference voltage source having the signal value Lo which is electrically connected to the input a through the N-channel type MOS transistors 4105 and 4107 having low threshold voltages, an output f, and the N-channel type MOS transistors 4106 and 4104 having low threshold voltages.

According to the present embodiment, however, the substrate bias generating circuit 4102 applies the potential to the substrate of the N-channel type MOS transistor 4104 having a low threshold voltage in such a manner that the threshold voltage is increased. Accordingly, it is possible to control the amount of the leakage current which flows from the constant voltage source having the signal value Hi to the reference voltage source having the signal value Lo.

More specifically, the output of the circuit 4101 using the pass-transistor logic is determined by the signals input to the gates of the N-channel type MOS transistors 4104, 4105, 4106 and 4107 having low threshold voltages. In this case, when the signal value Lo is output as the output signal of the circuit 4101 using the pass-transistor logic, the threshold voltage of a pass-transistor from input to output, that is, of the N-channel type MOS transistor 4104 is increased by the substrate bias generating circuit 4102. Since the N-channel type MOS transistor is used as the pass-transistor, the signal value Lo is not degraded because of the characteristics of the N-channel type MOS transistor.

In the case where the signal value Hi is output as the output signal of the circuit 4101 using the pass-transistor logic, the substrate bias generating circuit 4103 does not bias the substrate of the pass-transistor from input to output, that is, of the N-channel type MOS transistor 4105 in such a manner that the threshold voltage is increased. Accordingly, the N-channel type MOS transistors 4105 and 4107 keep the low threshold voltages. Consequently, the effects which suppress a degradation in the output signal are not damaged.

Figure 39:
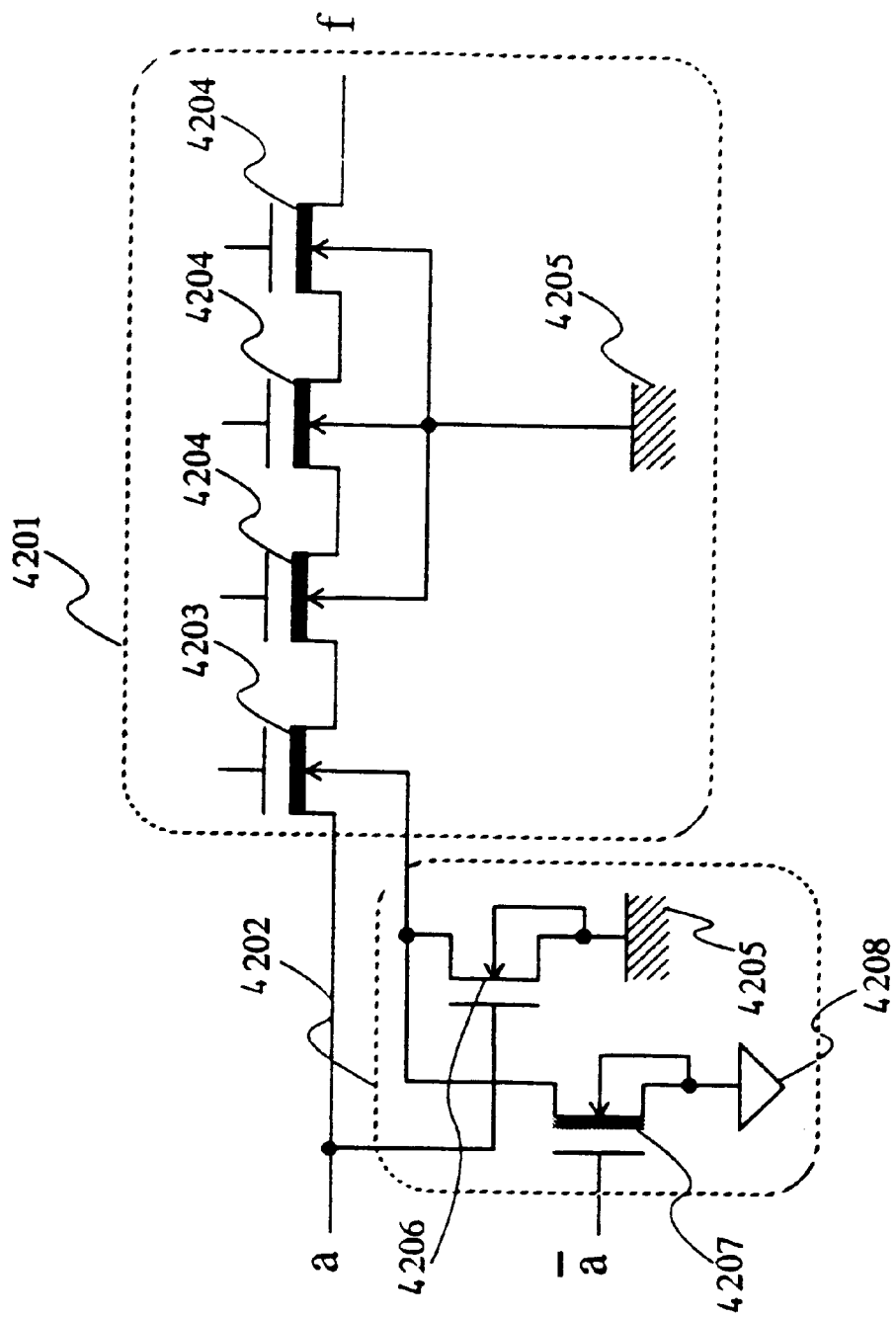
FIG. 39 is a circuit diagram showing, in detail, a substrate bias generating circuit according to the ninth embodiment of the present invention.

FIG. 39 shows an example of the substrate bias generating circuit. In FIG. 39, the reference numeral 4201 designates a partial circuit using the pass-transistor logic, and the reference numeral 4202 designates a substrate bias generating circuit. The partial circuit 4201 using the pass-transistor logic comprises N-channel type MOS transistors 4203 and 4204 having low threshold voltages.

In FIG. 39, the reference numeral 4205 designates a reference voltage source having the signal value Lo, and the reference numeral 4208 designates a constant voltage source having a low threshold voltage that is lower than the reference voltage having the signal value Lo which can produce the substrate bias effects capable of fully suppressing the leakage current for the N-channel type MOS transistor 4203. The reference numeral 4206 designates an N-channel type MOS transistor which is turned on with the signal value Hi and turned off with the signal value Lo when the reference potential is applied to a substrate and a source. The reference numeral 4207 designates an N-channel type MOS transistor which is turned off with the signal value Lo and turned on with the signal value Hi when the potential of the constant voltage source 4208 is applied to a substrate and a source.

The same signal value as that of the drain input of the partial circuit 4201 using the pass-transistor logic is input to the gate of the N-channel type MOS transistor 4206. The inverted signal of the drain input of the partial circuit 4201 using the pass-transistor logic is input to the gate of the N-channel type MOS transistor 4207. When the signal value Hi is sent to the input a and the signal value Lo is sent to the input/a, the N-channel type MOS transistor 4206 is turned on and the N-channel type MOS transistor 4207 is turned off in the substrate bias generating circuit 4202. For this reason, a reference voltage having the signal value Lo is applied to the substrate of the MOS transistor whose drain input is the external input signal a of the circuit 4201 using the pass-transistor logic, that is, the substrate of the N-channel type MOS transistor 4203. The threshold voltage of the transistor 4203 is kept low. Accordingly, the signal value Hi of the input a is propagated with the potential which is decreased by the low threshold voltages of the transistors 4203 and 4204 in the circuit 4201 using the pass-transistor logic, and is output to the output point f. When the signal value Lo is sent to the input a and the signal value Hi is sent to the input/a, the N-channel type MOS transistor 4206 is turned off and the N-channel type MOS transistor 4207 is turned on in the substrate bias generating circuit 4202. For this reason, the potential of the constant voltage source 4208 which is lower than the signal value Lo is applied to the substrate of the N-channel type MOS transistor 4203 whose drain input is the external input signal a of the circuit 4201 using the pass-transistor logic. Consequently, the threshold voltage of the transistor 4203 is increased. As a result, it is possible to suppress the leakage current which flows from the circuit 4201 using the pass-transistor logic to the input a.

Also in the case where a P-channel type MOS transistor having a low threshold voltage is used as the circuit 4201 using the pass-transistor logic, the effects of the present invention can be obtained if the input signal value and the polarity of the MOS transistor are changed.

Tenth Embodiment

A tenth embodiment of the present invention will be described below with reference to the drawings.

Figure 40:
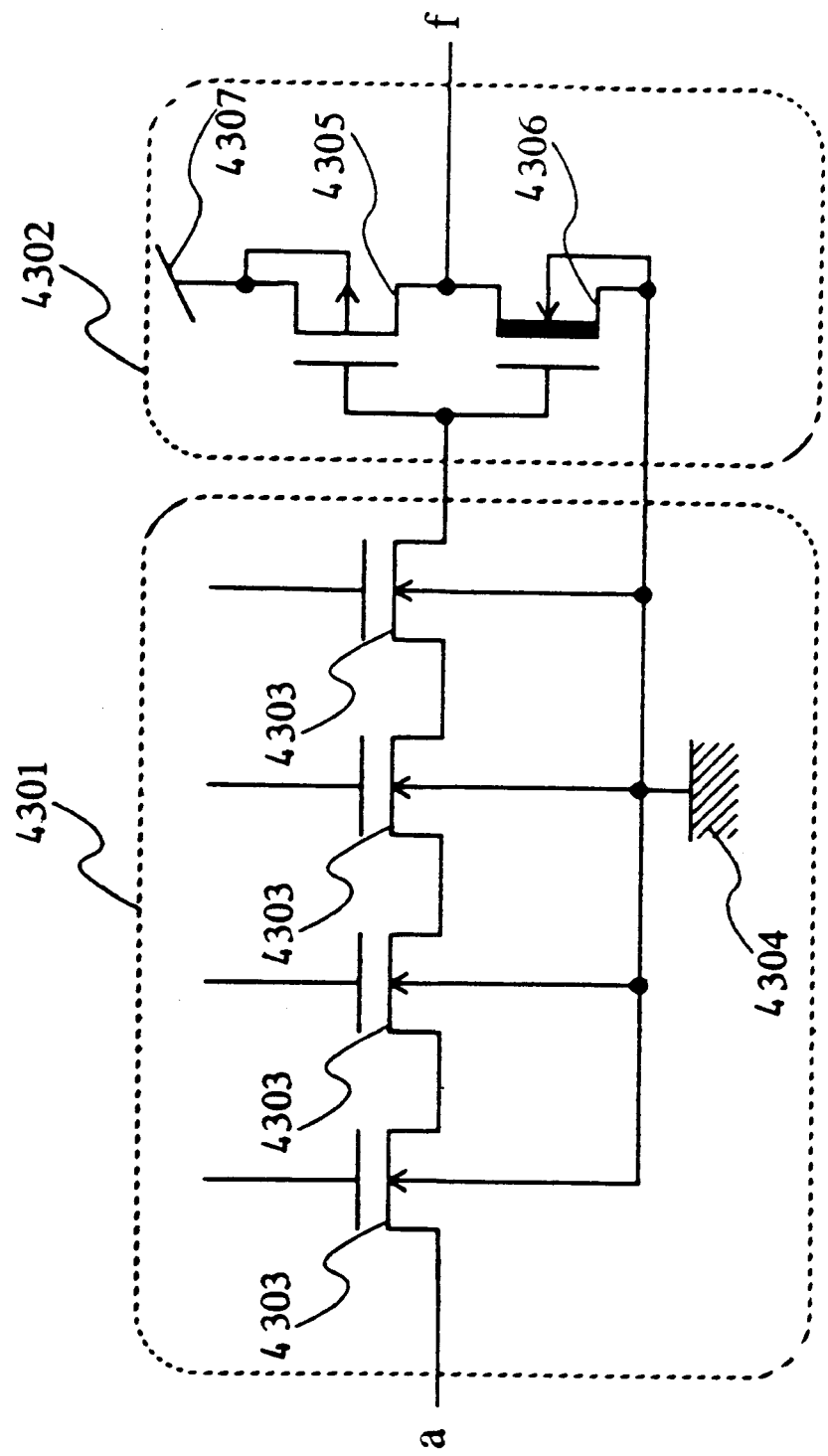
FIG. 40 is a diagram showing the partial circuit of a semiconductor integrated circuit according to a tenth embodiment of the present invention.

FIG. 40 shows an example of a semiconductor integrated circuit having a circuit using the CMOS logic and a circuit using the pass-transistor logic. In FIG. 40, the reference numeral 4301 designates a partial circuit using the pass-transistor logic which is formed by an N-channel type MOS transistor 4303.

In FIG. 40, the reference numeral 4302 designates an inverter for signal amplification using the CMOS logic. The inverter 4302 amplifies the output signal of the circuit 4302 using the pass-transistor logic. In the inverter 4302, the reference numeral 4305 designates a P-channel type MOS transistor having a threshold voltage which is almost equal to that of the transistor 4303, the reference numeral 4306 designates an N-channel type MOS transistor having a threshold voltage which is lower than that of the transistor 4303, the reference numeral 4307 designates a constant voltage source having the signal value Hi, and the reference numeral 4304 designates a reference voltage source having the signal value Lo.

As described above, the circuit 4301 using the pass-transistor logic is formed by the N-channel type MOS transistor. Consequently, if the signal value Lo is output, the output potential is equal to the signal value Lo. On the other hand, if the signal value Hi is output, the output potential is decreased by the threshold voltage of the N-channel type MOS transistor used for the pass-transistor logic so that the signal value Hi is degraded. If the output signal is greatly degraded, a circuit provided on the stage next to the circuit using the pass-transistor logic cannot recognize the signal value Hi. For this reason, it is necessary to amplify the output signal of the circuit 4301 using the pass-transistor logic. The CMOS inverter 4302 for signal amplification comprises the N-channel type MOS transistor 4306 having a low threshold voltage and the P-channel type MOS transistor 4307.

According to the present embodiment, the CMOS inverter circuit for signal amplification which uses the N-channel type MOS transistor 4306 having a low threshold voltage is added to the output of the circuit 4301 using the pass-transistor logic which is formed by the N-channel type MOS transistor. Consequently, even though the output signal Hi of the circuit 4301 using the pass-transistor logic is degraded, the Hi output can be amplified at high response speed.

In the case where the P-channel type MOS transistor is used as the circuit 4301 using the pass-transistor logic, it is apparent that the output signal value Lo of the circuit using the pass-transistor logic which is degraded can be amplified at high response speed if the P-channel type MOS transistor having a low threshold voltage is used in the CMOS inverter circuit for signal amplification.

Eleventh Embodiment

An eleventh embodiment of the present invention will be described below with reference to the drawings.

Figure 41:
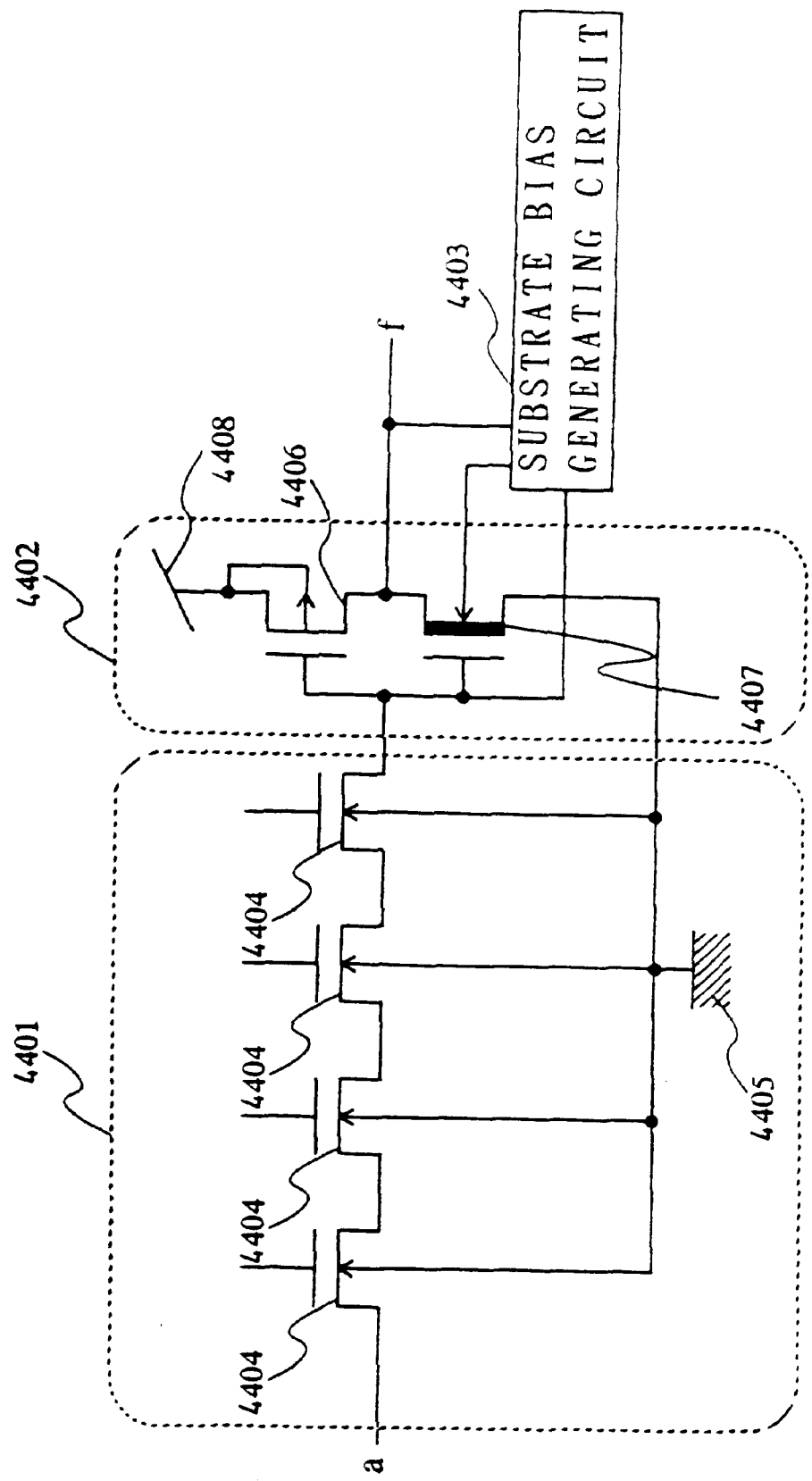
FIG. 41 is a diagram showing the partial circuit of a semiconductor integrated circuit according to an eleventh embodiment of the present invention.

In FIG. 41, the reference numeral 4401 designates a partial circuit using the pass-transistor logic which is formed by an N-channel type MOS transistor 4404. The reference numeral 4402 designates an inverter using the CMOS logic for amplifying the output signal of the circuit 4401 using the pass-transistor logic. In the inverter 4402, the reference numeral 4406 designates a P-channel type MOS transistor having a threshold voltage which is almost equal to that of the N-channel type MOS transistor 4404, the reference numeral 4407 designates an N-channel type MOS transistor having a threshold voltage which is lower than that of the N-channel type MOS transistor 4404, the reference numeral 4408 designates a constant voltage source having the signal value Hi, and the reference numeral 4405 designates a reference voltage source having the signal value Lo.

In the same manner as in the ninth embodiment, the circuit 4401 using the pass-transistor logic utilizes the N-channel type MOS transistor. For this reason, when the signal value Lo is output, the output potential becomes equal to the signal value Lo. On other hand, when the signal value Hi is output, the output potential is decreased by the threshold voltage of the N-channel type MOS transistor so that the signal value Hi is degraded. However, the N-channel type MOS transistor 4407 of the inverter 4402 using the CMOS logic for signal amplification has a low threshold voltage. Therefore, the output signal having the degraded value Hi can be amplified at high response speed.

However, also in the case where the N-channel type MOS transistor 4407 having a low threshold voltage is off, a lot of leakage current flows. If the output of the circuit 4401 using the pass-transistor logic has the signal value Lo, the P-channel type MOS transistor 4406 is on. Accordingly, even though the N-channel type MOS transistor 4407 is off, the leakage current flows from the constant voltage source 4408 to the reference voltage source 4405. In order to suppress the leakage current flow, a substrate bias generating circuit 4403 is added.

The substrate bias generating circuit 4403 is operated by the output signal of the circuit 4401 using the pass-transistor logic and the inverted signal which is obtained by the built-in inverter so that the substrate potential of the N-channel type MOS transistor 4407 having a low threshold voltage is changed.

If the output of the circuit 4401 using the pass-transistor logic has the signal value Hi and an output f which is an inverted signal has the signal value Lo, the substrate bias generating circuit 4403 applies a voltage having the signal value Lo to the substrate of the N-channel type MOS transistor 4407. If the output of the circuit 4401 using the pass-transistor logic has the signal value Lo and the output f which is the inverted signal has the signal value Hi, the substrate bias generating circuit 4403 applies a voltage to the substrate of the N-channel type MOS transistor 4407 having a low threshold voltage in such a manner that the threshold voltage is increased, that is, applies, to the same substrate, a voltage which is lower than the signal value Lo. Thus, the leakage current flow is suppressed.

Figure 42:
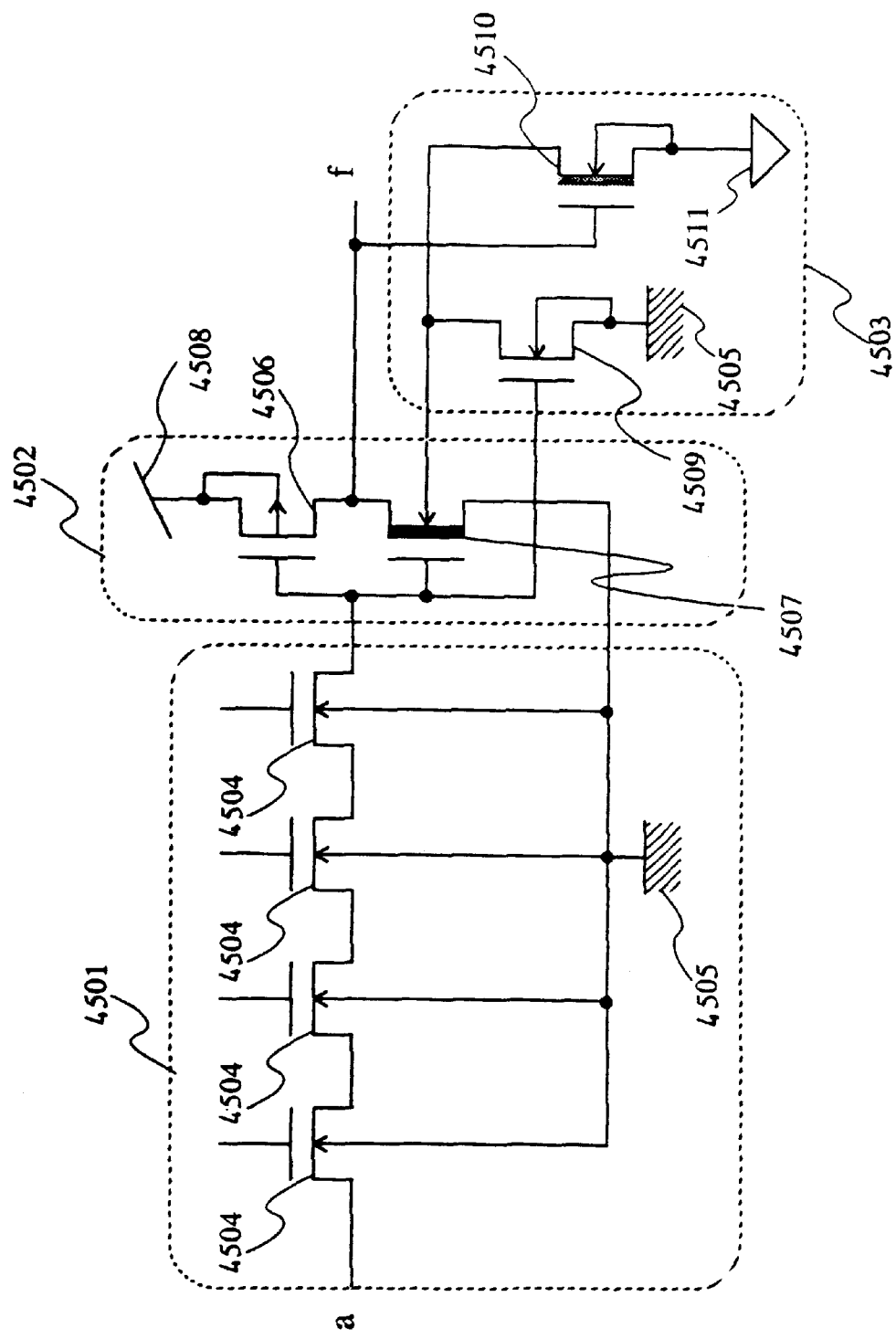
FIG. 42 is a diagram showing, in detail, a substrate bias generating circuit according to the eleventh embodiment of the present invention.

FIG. 42 shows an example of the substrate bias generating circuit. In FIG. 42, the reference numeral 4501 designates a partial circuit using the pass-transistor logic, the reference numeral 4502 designates a CMOS inverter for amplifying the output signal of the circuit 4501 using the pass-transistor logic, and the reference numeral 4503 designates a substrate bias generating circuit.

The circuit 4501 using the pass-transistor logic is formed by an N-channel type MOS transistor 4504. The reference numeral 4505 designates a reference voltage source having the signal value Lo. The reference numeral 4506 designates a P-channel type MOS transistor having a threshold voltage which is equal to that of the N-channel type MOS transistor 4504, the reference numeral 4507 designates an N-channel type MOS transistor having a threshold voltage which is lower than that of the N-channel type MOS transistor 4504, and the reference numeral 4508 designates a constant voltage source having the signal value Hi.

In the substrate bias generating circuit 4503, the reference numeral 4511 designates a constant voltage source having a voltage that is lower than the reference voltage of the signal value Lo which can produce the substrate bias effects capable of fully suppressing the leakage current for the N-channel type MOS transistor 4507 having a low threshold voltage. The reference numeral 4509 designates an N-channel type MOS transistor which is turned on with the signal value Hi and turned off with the signal value Lo when the reference potential is applied to a substrate and a source. The reference numeral 4510 designates an N-channel type MOS transistor which is turned off with the signal value Lo and turned on with the signal value Hi when the potential of the constant voltage source 4511 which is lower than a reference voltage is applied to a substrate and a source.

If the output of the circuit 4501 using the pass-transistor logic has the signal value Hi, the P-channel type MOS transistor 4506 is turned off and the N-channel type MOS transistors 4507 and 4509 are turned on. For this reason, the substrate potential of the N-channel type MOS transistor 4507 having a low threshold voltage is set to the reference potential 4505. Consequently, the MOS transistor 4507 acts as the N-channel type MOS transistor having a low threshold voltage. Thus, the response speed for the degraded signal value Hi is enhanced.

If the output of the circuit 4501 using the pass-transistor logic has the signal value Lo, the MOS transistor 4506 is turned on and the N-channel type MOS transistor 4509 is turned off so that the output potential has the signal value Hi. In the substrate bias generating circuit 4503, the MOS transistor 4510 is turned on with the output signal value Hi of the CMOS inverter 4502 for signal amplification so that the constant voltage of the constant voltage source 4511 is applied to the substrate of the N-channel type MOS transistor 4507. Consequently, the threshold voltage of the N-channel type MOS transistor 4507 is increased by the substrate bias effects. As a result, the leakage current flow is suppressed.

Although the present invention has fully been described by way of example with reference to the accompanying drawings, it is to be understood that various changes and modifications will be apparent to those skilled in the art.

Therefore, unless otherwise such changes and modifications depart from the scope of the invention, they should be construed as being included therein.

We claim:

1. A method for designing a semiconductor integrated circuit, comprising the steps of:
   storing, in advance, in a cell library a pass-transistor logic layout cell corresponding to a first circuit component in which at least one of the area, the delay and the consumed power thereof is less than that of a CMOS logic layout cell corresponding to the first circuit component;
   storing, in advance, in a cell library a CMOS logic layout cell corresponding to a second circuit component in which at least one of the area, the delay and the consumed power thereof is less than that of a pass-transistor logic layout cell corresponding to the second circuit component;
   inputting a net list from an outside source when designing a semiconductor integrated circuit; and
   arranging and wiring the pass-transistor logic layout cell and the CMOS logic layout cell together based on the input net list.

2. The method for designing a semiconductor integrated circuit of claim 1, wherein the pass-transistor logic layout cell corresponding to the first circuit component which is stored in advance is formed by a smaller number of transistors than in the CMOS logic layout cell corresponding to the first circuit component.

3. The method for designing a semiconductor integrated circuit of claim 1, wherein the pass-transistor logic layout cell corresponding to the first circuit component which is stored in advance has a smaller total value of channel widths of all transistors in the pass-transistor logic layout cell than in the CMOS logic layout cell corresponding to the first circuit component.

4. The method for designing a semiconductor integrated circuit of claim 1, wherein the pass-transistor logic layout cell corresponding to the first circuit component which is stored in advance has a smaller number of stages of transistors that are connected in maximum series in the pass-transistor logic layout cell than in the CMOS logic layout cell corresponding to the first circuit component.

5. The method for designing a semiconductor integrated circuit of claim 1, wherein the pass-transistor logic layout cell corresponding to the first circuit component which is stored in advance is an exclusive-OR circuit.

6. The method for designing a semiconductor integrated circuit of claim 1, wherein the pass-transistor logic layout cell corresponding to the first circuit component which is stored in advance is a half adder.

7. The method for designing a semiconductor integrated circuit of claim 1, wherein the pass-transistor logic layout cell corresponding to the first circuit component which is stored in advance is a full adder.

8. The method for designing a semiconductor integrated circuit of claim 1, wherein the pass-transistor logic layout cell corresponding to the first circuit component which is stored in advance is a selector.

9. The method for designing a semiconductor integrated circuit of claim 1, wherein each of the pass-transistor logic layout cell and the CMOS logic layout cell which are stored in advance has a power terminal and a ground terminal, and wherein the spacing between the power terminal and the ground terminal of the pass-transistor logic layout cell is set equal to the spacing between the power terminal and the ground terminal of the CMOS logic layout cell.

10. The method for designing a semiconductor integrated circuit of claim 9, wherein the pass-transistor logic layout cell and the CMOS logic layout cell are arranged between a power line and a ground line which extend in parallel with each other and along one line when performing arrangement and wiring.

11. A semiconductor integrated circuit in which a first circuit component is formed using a pass-transistor logic layout cell and a second circuit component is formed using a CMOS logic layout cell are provided together,
    wherein the first circuit component formed using the pass-transistor logic layout cell has a structure in which at least one of the area, the delay and the consumed power thereof is less than that of the first circuit component formed using CMOS logic, and
    wherein the second circuit component formed using the CMOS logic layout cell has a structure in which at least one of the area, the delay and the consumed power thereof is less than that of the second circuit component formed using pass-transistor logic,
    said pass-transistor logic layout cell and said CMOS logic layout cell being stored in advance in a memory cell library.

12. The semiconductor integrated circuit of claim 11, wherein the pass-transistor logic layout cell corresponding to the first circuit component which is stored in advance is formed by a smaller number of transistors than a CMOS logic layout cell corresponding to the first circuit component.

13. The semiconductor integrated circuit of claim 11, wherein the pass-transistor logic layout cell corresponding to the first circuit component which is stored in advance has a smaller total value of channel widths of all transistors in the pass-transistor logic layout cell than a CMOS logic layout cell corresponding to the first circuit component.

14. The semiconductor integrated circuit of claim 11, wherein the pass-transistor logic layout cell corresponding to the first circuit component which is stored in advance has a smaller number of stages of transistors that are connected in maximum series in the pass-transistor logic layout cell than a CMOS logic layout cell corresponding to the first circuit component.

15. The semiconductor integrated circuit of claim 11, wherein the pass-transistor logic layout cell corresponding to the first circuit component which is stored in advance is an exclusive-OR circuit.

16. The semiconductor integrated circuit of claim 11, wherein the pass-transistor logic layout cell corresponding to the first circuit component which is stored in advance is a half adder.

17. The semiconductor integrated circuit of claim 11, wherein the pass-transistor logic layout cell corresponding to the first circuit component which is stored in advance is a full adder.

18. The semiconductor integrated circuit of claim 11, wherein the pass-transistor logic layout cell corresponding to the first circuit component which is stored in advance is a selector.

19. The semiconductor integrated circuit of claim 11, wherein the first circuit component using the pass-transistor logic layout cell has a power line and a ground line which extend in parallel with each other with a transistor forming the circuit interposed therebetween,
    wherein the second circuit component using the CMOS logic layout cell has a power line and a ground line which extend in parallel with each other with a transistor forming the circuit interposed therebetween, and wherein the spacing between the power line and the ground line of the first circuit component using the pass-transistor logic layout cell is set equal to the spacing between the power line and the ground line of the second circuit component using the CMOS logic layout cell.

20. The semiconductor integrated circuit of claim 19, wherein the first circuit component using the pass-transistor logic layout cell and the second circuit component using the CMOS logic layout cell are provided between said power line and said ground line which extend in parallel with each other and along one line so as to implement a one-line layout.

21. The semiconductor integrated circuit of claim 20, wherein the one-line layout is arranged in a plurality of lines in the direction orthogonal to the direction where the power line and the ground line extend.

22. The semiconductor integrated circuit of claim 11, 12, 13, 14, 15, 16, 17, 18, wherein the circuit using the pass-transistor logic is formed by an N-channel type MOS transistor.

23. A method for designing a semiconductor integrated circuit, comprising the steps of:
   preparing, in advance, a basic pass-transistor logic layout cell including two pairs of transistors, each transistor pair having two transistors whose sources are connected to each other, and a CMOS logic layout cell including one or more transistors;
   arranging and wiring two or more basic pass transistor logic layout cells adjacently to each other to form a composite pass-transistor logic layout cell; and
   arranging and wiring the composite pass-transistor logic layout cell and the CMOS logic layout cell together to create a desired block layout.

24. The method for designing a semiconductor integrated circuit of claim 23, comprising the steps of:
   preparing, in advance, a wiring pattern layout cell including a necessary wiring pattern;
   arranging two or more basic pass-transistor logic layout cells adjacently to each other when creating the composite pass-transistor logic layout cell; and
   arranging and wiring the wiring pattern layout cell over a plurality of basic pass-transistor logic layout cells which are arranged adjacently to each other.

25. The method for designing a semiconductor integrated circuit of any of claims 1, 8, 23, and 24, wherein the pass-transistor logic layout cell is formed by a N-channel type MOS transistor.

26. A storage medium for storing a method for designing a semiconductor integrated circuit, wherein an instruction to be read in a computer and executed is stored,
   the storage medium storing, in advance, in a cell library,
      a pass-transistor logic layout cell corresponding to a first circuit component in which at least one of the area, the delay and the consumed power thereof is less than that of a CMOS logic layout cell corresponding to the first circuit component; and
      a CMOS logic layout cell corresponding to a second circuit component in which at least one of the area, the delay and the consumed power thereof is less than that of a pass-transistor logic layout cell corresponding to the second circuit component;
   the storage medium further storing the processings of:
      inputting a net list from an outside source when designing a semiconductor integrated circuit; and
      arranging and wiring the pass-transistor logic layout cell and the CMOS logic layout cell together based on the input net list.

27. A storage medium for storing a method for designing a semiconductor integrated circuit, wherein an instruction to be read in a computer and executed is stored,
   the storage medium storing, in advance, a basic pass-transistor logic layout cell including two pairs of transistors, each transistor pair having two transistors whose sources are connected to each other, and a CMOS logic layout cell including one or more transistors,
   the storage medium storing the processings of:
      arranging and wiring two or more basic pass transistor logic layout cells adjacently to each other to form a composite pass-transistor logic layout cell; and
      arranging and wiring the composite pass-transistor logic layout cell and the CMOS logic layout cell together to create sired block layout.

* * * * *